(12) United States Patent
Shah et al.

(10) Patent No.: US 10,570,032 B2
(45) Date of Patent: Feb. 25, 2020

(54) ELECTRODIALYSIS SYSTEMS AND METHODS FOR DESALINATION

(71) Applicant: Massachusetts Institute of Technology, Cambridge, MA (US)

(72) Inventors: Sahil Rajesh Shah, Edmonton (CA); Amos G. Winter, V, Somerville, MA (US); Natasha C. Wright, Wayzata, MN (US)

(73) Assignee: Massachusetts Institute of Technology, Cambridge, MA (US)

( * ) Notice: Subject to any disclaimer, the term of this patent is extended or adjusted under 35 U.S.C. 154(b) by 82 days.

(21) Appl. No.: 15/977,534

(22) Filed: May 11, 2018

(65) Prior Publication Data

US 2018/0362370 A1   Dec. 20, 2018

Related U.S. Application Data

(60) Provisional application No. 62/504,628, filed on May 11, 2017.

(51) Int. Cl.
*B01D 61/46* (2006.01)
*C02F 1/469* (2006.01)
(Continued)

(52) U.S. Cl.
CPC ............ *C02F 1/4693* (2013.01); *B01D 61/46* (2013.01); *B01D 61/54* (2013.01); *C02F 1/008* (2013.01); *B01D 2311/243* (2013.01); *B01D 2311/25* (2013.01); *B01D 2311/2649* (2013.01); *C02F 2103/08* (2013.01); *C02F 2201/46* (2013.01); *C02F 2209/05* (2013.01); *C02F 2301/046* (2013.01); *C02F 2303/04* (2013.01)

(58) Field of Classification Search
CPC ................ C02F 1/4693; C02F 2303/04; C02F 2301/046; C02F 2201/46; C02F 2103/08; C02F 2209/05; C02F 2103/06; C02F 2209/40; C02F 2209/10; C02F 2209/006; C02F 2209/001; C02F 2201/46135; C02F 2201/46115; C02F 1/4604; B01D 61/54; B01D 61/46; B01D 2311/2649; B01D 2311/25; B01D 2311/243
See application file for complete search history.

(56) References Cited

U.S. PATENT DOCUMENTS

2012/0118743 A1\* 5/2012 Liang ..................... B01D 61/48
   204/634
2016/0152492 A1   6/2016 Bhikhi et al.

FOREIGN PATENT DOCUMENTS

JP          S5799704          6/1982

OTHER PUBLICATIONS

Shah, S.R., "Cost-Optimal Design of a Household Batch Electrodialysis Desalination Device," Master of Science in Mechanical Engineering Thesis, Jun. 2017.
(Continued)

*Primary Examiner* — Arun S Phasge
(74) *Attorney, Agent, or Firm* — Elmore Patent Law Group, P.C.; Carolyn Elmore; Mahreen Hoda

(57) ABSTRACT

Described are improved electrodialysis (ED) desalination systems and methods comprising voltage regulation and/or improved stack geometries. The systems and methods provide product water concentrations suitable for drinking (having a total dissolved solids concentration of less than 500 mg/L or 500 ppm) and have a high product recovery ratio.

28 Claims, 40 Drawing Sheets

(51) Int. Cl.
  *B01D 61/54* (2006.01)
  *C02F 1/00* (2006.01)
  *C02F 103/08* (2006.01)

(56) References Cited

OTHER PUBLICATIONS

Shah, S. R., "In-Home Water Desalination in Urban India Using Electrodialysis to Improve Recovery," Tata Center Poster, 2015.
Nayar, K.G., et al., "Feasibility Study of an Electrodialysis System for In-Home Water Desalination and Purification in Urban India," Proceedings of the ASME 2015 International Design Engineering Technical Conferences and Computers and Information in Engineering Conference, Aug. 2015, Boston, MA.
Nayar, K., et al., "Feasibility Study of an Electrodialysis System for In-Home Water Desalination in Urban India," Development Engineering, 2, pp. 38-46 (2017).
Pilat, B., "Practice of Water Desalination by Electrodialysis," Desalination 139(, pp. 385-392 (2001).

* cited by examiner

ELECTRODIALYSIS SYSTEMS AND METHODS FOR DESALINATION

RELATED APPLICATION

This application claims the benefit of U.S. Provisional Application No. 62/504,628 filed May 11, 2017. The entire contents of the above application are incorporated herein by reference herein.

BACKGROUND OF THE INVENTION

Indian homes currently rely on domestic reverse osmosis (RO) systems to desalinate groundwater to a salt content with total dissolved solids (TDS) that is suitable for drinking (less than 500 mg/L [1]). However, these systems are inefficient, recovering only 25-40% [2] of the feed, and thereby stressing limited groundwater resources. Given that the concentration of the groundwater underlying a majority of India is under 2000 mg/L, electrodialysis (ED) can provide a higher recovery and more energy-efficient desalination compared to RO [3,4].

While ED appears to be a promising alternative for domestic groundwater desalination, limited work has been performed to characterize the design of a system that is appropriate for the given application. Pilat has provided some information regarding his system, which was piloted before 2001 [5]; however, cost and design details are not provided. More recently, Thampy et al. investigated a hybrid approach whereby ED was used to initially desalinate 2000-4000 mg/L water to 500 mg/L, and further desalination to 120 mg/L or lower thereafter was achieved using RO [6]. However, their small-scale system did not implement recirculation of product water, thereby recovering only 50-60% of the feed.

There remains a need in the art for improved water desalination systems and methods including, for example, systems and methods capable of providing product water concentrations suitable for drinking, having high product recovery ratios, and/or of low cost to consumers.

SUMMARY OF THE INVENTION

The present invention is directed to electrodialysis (ED) desalination systems and methods, suitable for domestic, community-level, and/or industrial use. The systems and methods described herein provide product water concentrations suitable for drinking (for example, having a total dissolved solids concentration of less than about 500 mg/L or about 500 ppm). The systems and methods are also characterized as having a have a high product recovery ratio (for example, at least about 80%).

In certain aspects, the invention is directed to an ED desalination system and method comprising a voltage regulator that regulates the voltage (or decreases the voltage over time as the concentration of ions in the diluate decreases) to maintain a current less than the limiting current density for the diluate. The invention encompasses a system or device for electrodialysis (ED)-based desalination and a method of desalinating feedwater using the electrodialysis (ED)-based desalination system comprising:
  i. an ED stack, wherein the stack comprises:
  i. a pair of electrodes
  ii. a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device or stack such that the AEMs and the CEMs alternate;
  iii. a plurality of diluate channels, wherein each diluate channel is formed between the CEM and the AEM of each ion exchange membrane pair, and wherein each diluate channel comprises a diluate channel inlet and a diluate channel outlet; and
  iv. a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet; and
  ii. a diluate tank fluidly connected to the diluate channel outlets and the diluate channel inlets;
  iii. a concentrate tank fluidly connected to the concentrate channel outlets and the concentrate channel outlets;
  iv. a diluate pump fluidly connected to and disposed between the diluate tank and the diluate channels; and
  v. a concentrate pump fluidly connected to and disposed between the concentrate tank and the concentrate channels;
  vi. a power supply connected to the pair of electrodes;
  vii. an optional conductivity sensing unit configured to measure the conductivity of the diluate; and
  viii. a voltage regulator that is configured to control the current density across the membranes;
wherein the method comprises:
  i. circulating a water stream comprising ions through the electrodialysis stack thereby creating a diluate and a concentrate;
  ii. optionally measuring the conductivity of the diluate; and
  iii. regulating voltage to maintain a current density less than the limiting current density for the diluate, wherein regulating the voltage comprises decreasing the voltage over time.

In yet additional aspects, the invention is directed to an ED desalination system and method wherein the ratio of length to width for each ion exchange membrane is between about 3.5 and about 6, and/or wherein the height of each channel is between about 0.3 and 0.33 mm.

The invention also encompasses an electrodialysis (ED)-based desalination system comprising:
  a. an ED stack, wherein the stack comprises:
  i. a pair of electrodes
  ii. a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device or stack such that the AEMs and the CEMs alternate;
  iii. a plurality of diluate channels, wherein each diluate channel is formed between the CEM and the AEM of each ion exchange membrane pair, and wherein each diluate channel comprises a diluate channel inlet and a diluate channel outlet; and
  iv. a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet; and wherein the ratio of length to width for each ion exchange membrane is between about 3.5 and 6; and/or wherein the height of each channel is between about 0.3 to about 0.33 mm b. a diluate tank fluidly connected to the diluate channel outlets and the diluate channel inlets;

c. a concentrate tank fluidly connected to the concentrate channel outlets and the concentrate channel outlets;

d. a diluate pump fluidly connected to and disposed between the diluate tank and the diluate channels; and e. a concentrate pump fluidly connected to and disposed between the concentrate tank and the concentrate channels; and f. a power supply connected to the pair of electrodes.

The invention also encompasses a method of desalinating feedwater, the method comprising introducing feedwater into the diluate tank and the concentrate tank at the start of the batch process of an ED system described herein and applying an electrical potential across the ion exchange membrane pairs.

The invention additionally includes an electrodialysis (ED)-based desalination system comprising:

a. an ED stack, wherein the stack comprises:
  i. a pair of electrodes
  ii. a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device or stack such that the AEMs and the CEMs alternate;
  iii. a plurality of diluate channels, wherein each diluate channel is formed between the CEM and the AEM of each ion exchange membrane pair, and wherein each diluate channel comprises a diluate channel inlet and a diluate channel outlet; and
  iv. a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet; and b. a diluate tank fluidly connected to the diluate channel outlets and the diluate channel inlets;

c. a concentrate tank fluidly connected to the concentrate channel outlets and the concentrate channel outlets;

d. a diluate pump fluidly connected to and disposed between the diluate tank and the diluate channels; and e. a concentrate pump fluidly connected to and disposed between the concentrate tank and the concentrate channels; and f. a power supply connected to the pair of electrodes.

wherein the improvement is that the product recovery ratio is at least about 60%, at least about 70%, at least about 80%, or at least about 90% and the system is suitable for in home use.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5A and FIG. 5B show that a small difference in total cost was obtained between designs optimized for producing 200 mg/L from 2000 mg/L at either minimum total cost (TC) or capital cost (CC) (FIG. 5A). This difference is negligible because CC dominates over OC for this domestic application (FIG. 5B).

FIG. 13A shows the complete ED stack. FIG. 13B shows an individual spacer, and an individual membrane.

DETAILED DESCRIPTION OF THE INVENTION

A description of preferred embodiments of the invention follows.

As used herein, the words "a" and "an" are meant to include one or more unless otherwise specified. For example, the term "a channel" encompasses both a single channel and a combination of two or more channels.

Figure 1:
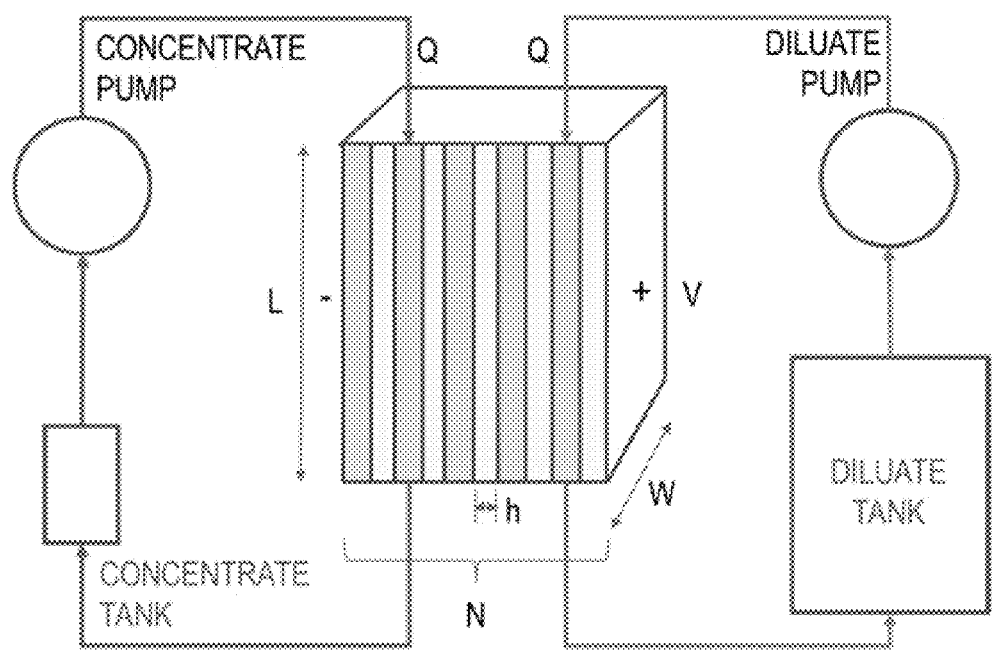
FIG. 1 is a schematic of batch ED showing recirculating diluate and concentrate streams and design variables considered for optimization.

The present invention describes the design of ED systems and methods for domestic, community, or industrial desalination, and specifically cost-optimal domestic ED systems and methods that have a high product recovery ratio. The systems and methods described herein are competitive with existing reverse osmosis (RO) products in terms of cost, power consumption, and production performance for domestic use in urban India. Nayar et al., the contents of which are expressly incorporated by reference herein, achieved 80% recovery by implementing ED in a batch configuration (FIG. 1) to desalinate from 3000 mg/L to 350 mg/L [7]. Furthermore, they demonstrated that the system cost was comparable to RO and could be packaged in a similar envelope; however, their stack design was not optimized for cost. With respect to domestic scale ED systems specifically, optimization differs from work conducted for larger operations because it requires that pumps be considered since they affect the cost, energy consumption, and performance of the ED system. For large-scale systems, which are typically operated in a continuous architecture, the pump cost and energy consumption are often neglected because they are low relative to cost of the ED stack and the energy consumed by desalination [8,9].

As described in more detail in the Examples, the pareto-optimal design of a system that relies on batch electrodialysis (ED) to provide a higher recovery of 90% but at production rates that are comparable to existing RO systems used in the home (9-15 L/hr) was investigated. The goal for production performance was to reduce the salt content as measured by total dissolved solids (TDS) from 2000 ppm to 100 ppm at 9 to 15 L/hr. Product water concentrations between 100-300 mg/L, within the suitable drinking range, were targeted from an input feed of 2000 mg/L. Length and width of the active area, number of cell-pairs, channel height, voltage, and recirculation flow-rates were considered as design variables. A multi-objective genetic algorithm was used to determine the designs that minimized total (capital and operating) cost while maximizing production rate. The capital cost was found to dominate over the operating cost for this application due to the small cost of electrical energy relative to equipment, and the low utilization of the system. The capital cost of the optimal system increased sharply for 100 mg/L: $141 vs. $93 and $79 for 200 mg/L and 300 mg/L systems, respectively averaged over production rates between 11.5 and 12.5 L/hr. The sharp increase in cost at the lowest concentration supports other work that has found ED to be an expensive process for producing low product concentrations. Pumps were an important consideration at this domestic scale, and present a potential avenue for further cost reduction, since they accounted for up to 46% of the capital cost, and 83% of the total energy consumption. The optimal voltage varied from 0.9 to 1.3 V per cell-pair for 100 to 300 mg/L systems, respectively, at 9 L/hr of production and decreased thereafter. Higher production was obtained primarily through increasing cell-pair area rather than the number of cell-pairs, which ranged between 36 and 46. Large cell-pair length-to-width aspect ratios (3.5:1 to 6:1) and small intermembrane channel heights (0.30-0.33 mm) were cost-optimal for the desired production targets. At the optimal volumetric flow-rates, we obtained linear velocities of 11-21 cm/s that exceeded suggestions found elsewhere in literature (4-10 cm/s) for similar concentrations. These results suggest that the development of domestic ED systems may benefit from additional research targeted at characterizing the effects of high linear velocities on scaling, fouling, and membrane life.

The invention encompasses ED systems and methods that provide a high product recovery ratio (for example, about 80% or greater, or about 85% or greater, or about 90% or greater) and provide product water having a total dissolved solids (TDS) concentration of less than about 500 mg/L. In certain aspects, the invention includes an ED system, or a method of use thereof, wherein the improvement is that the product recovery ratio is 90% and the system is suitable for in home use, community-level, or industrial use. In yet additional aspects, the invention is a system or method wherein the improvement is that the product recovery ratio is 90% and provides product water having a total dissolved solids (TDS) concentration of less than about 500 mg/L, or about 300 mg/L or less, or about 200 mg/L or less, or about 100 mg/L or less. While the embodiments specifically illustrated herein are particularly useful for batch processes, it is possible to modify the system to be a semi-continuous or continuous system. For example, a semi-continuous process may envision a series of the inventive ED systems to step-wise decrease the ion concentrations, recognizing that such a method may require an increased capital cost. Additionally, while certain embodiments described herein are particularly suited for home-scale water purification, the systems can be modified to further miniaturize the process, for example, to be useful on boats or other recreational vehicle or made on a larger scale to accommodate, for example, apartment or commercial buildings. Alternatively, the systems can be modified to a scale suitable for community-use (for example, for village-scale desalination system), or industrial use (for example, for use in a desalination plant).

In the ED system, a voltage is applied across the ED stack and fluid is recirculated through the stack until the desired (target) concentration is achieved in the diluate tank. Feed water is introduced into the diluate tank and the concentrate tank at the start of the batch process.

Feedwater can be any saltwater including, for example, brackish water. In certain aspects, the feedwater is ground water.

The product recovery ratio is the ratio of the volume of product water output per volume untreated feedwater input.

The production rate is the rate at which product water (output water that has the desired decreased salt to TDS concentration) is produced.

The flow rate is the rate at which water flows through the diluate and/or concentrate circuits.

The terms "voltage regulation" and "voltage control," and "voltage regulator" and "voltage controller" are used interchangeably herein.

The limiting current density is the current density above which water splitting occurs. The limiting current density decreases as the concentration of ions in the diluate decreases. Methods for calculating or estimating the limiting current density of an aqueous solution are known in the art. The limiting current density can be determined empirically for a given water stream, determined theoretically, and/or estimated by predicting the limiting current density of a typical water stream source of a consumer. For example, in a preferred embodiment, the graph in FIG. 23 can be used to determine the current limiting density by estimation. It is also understood that the limiting current density may differ based on the components of the feedstream and the particular ions. It will be understood that in commercializing the systems described herein that each system may not be individually adapted to each and every water source for each and every home and/or end user. Rather, the person of ordinary skill in the art would likely determine the typical current limiting densities that are likely to be encountered by users, and select an appropriate standard for use in the methods described herein. Additionally, or alternatively, the system can be configured to calculate the limiting current density based upon the data collected by the system from sensors incorporated into the system. It is appreciated that any one method can provide a different standard. Where necessary for an understanding of the delineation of the metes and bounds of a claim attached hereto, unless otherwise defined, the limiting current density is selected from the group consisting of the limiting current density shown in FIG. 23 and as estimated by the equation:

$$i_{lim} = \frac{C_{dil}^{bulk} zFk}{T-t} \quad (2)$$

wherein the variables are as defined further below.

Figure 10:
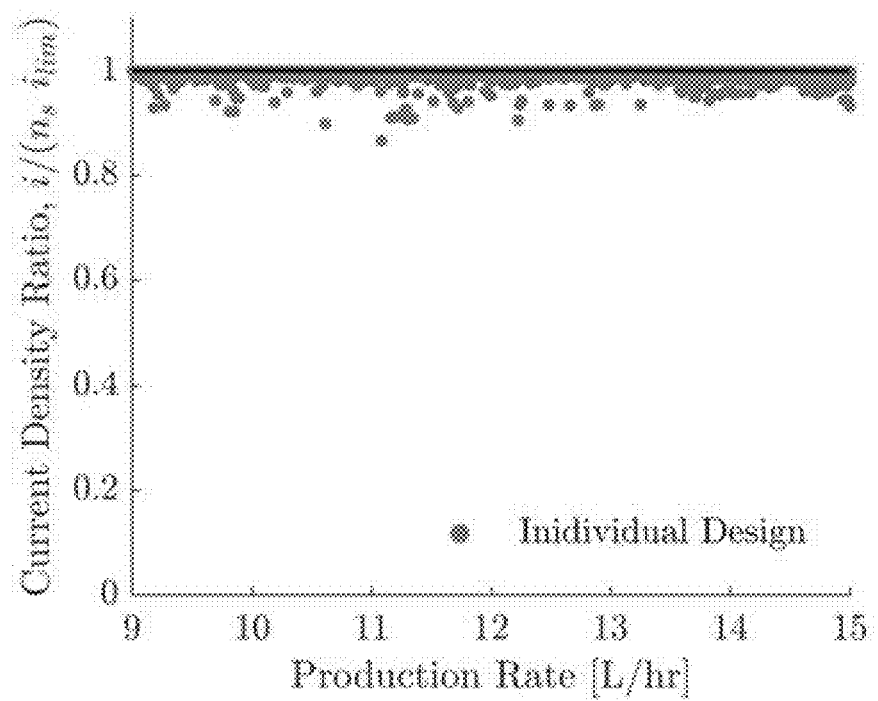
FIG. 10 shows the ratio of instantaneous applied current density i to limiting current density $i_{lim}$ at the end of the batch process approaches 1 for all optimum designs targeted at varying product concentrations (100-300 mg/L) and production rates (9-15 L/hr) from a 2000 mg/L feed at 90% recovery

The invention encompasses systems and methods including a voltage-regulation which decreases capital cost without sacrificing product water quality. Thus, in certain aspects, the system is a ED system (including, but not limited to, a batch system) wherein the improvement is that the system includes a voltage regulator that regulates the voltage to maintain a current density less than the limiting current density for the diluate, wherein the voltage regulation comprises decreasing the voltage over time. In certain additional aspects, the system is suitable for in home use. In other aspects, the system is suitable for community-level and/or industrial use. Increasing current density (i) will decrease membrane area which reduces capital cost. Therefore, maximizing the current density is cost-optimal. However, there is an upper bound based on the instantaneous diluate concentration and the flow properties (described in more detail in Example 2). FIG. 10 demonstrates that the applied current density approaches this limit at the end of each batch during conventional constant-voltage batch operation; however, it is also useful to examine the full duration where the applied current density is far lower than the limiting current density (see, for example, FIG. 25). For example, the optimal current trajectories during desalination for producing 100 mg/L and 200 mg/L product water at a rate of 10 L/hr are compared in FIG. 11 for constant-voltage batch operation. Since the limiting current density trajectories (solid lines) are similar and mostly dependent on the instantaneous diluate concentration, it is inferred that differences in flow characteristics played a small role. These upper bounds of applied current density are only approached at the end of the batch, but application of a constant voltage constrains the full applied current trajectory. Therefore, as is evident in FIG. 11, relaxation of the product water requirements allows designs to operate at higher current densities for the full batch process.

Figure 25:
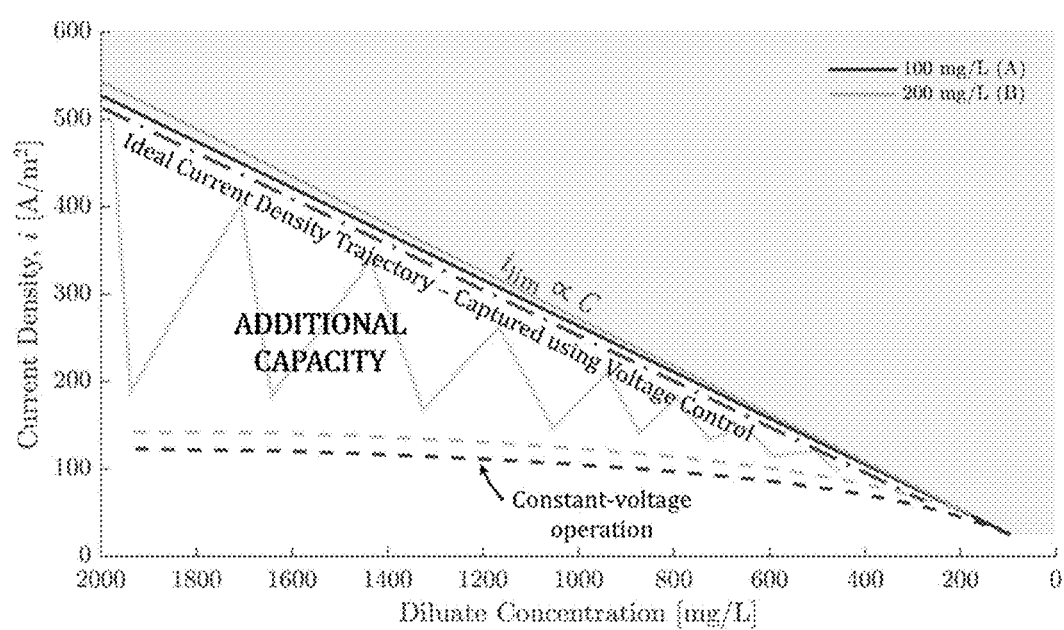
FIG. 25 is a graph of current density ($A/m^2$) as a function of diluate concentration for a product concentration of 100 mg/L and 200 mg/L. The dashed lines show the current density as a function of diluate concentration for a constant voltage operation for 100 mg/L and 200 mg/L product water. The area between the solid line and the dashed lines of the constant voltage operation represents a capacity to raise current density and decrease capital cost.

It has been discovered that including voltage regulation as described herein can decrease capital cost without relaxing product water requirements. Voltage regulation permits the system to operate at higher time-averaged current densities. Specifically, by analyzing FIGS. 11 and 20, the inventors discovered that the time-averaged applied current densities (i) can be increased with time-varying voltage regulation based on measured conductivity of the diluate stream. A high voltage can be applied at the start of the batch process and can be gradually decreased to maintain an instantaneous current density that is just under the limiting current density (FIG. 25).

The voltage-regulated ED systems and methods described herein comprise a voltage regulator that regulates the voltage to maintain a current density less than the limiting current density for the diluate. The limiting current decreases with decreasing ion concentration in the diluate, therefore during the ED process, the limiting current decreases over time. In a conventional system, a constant voltage is applied that achieves a current density which is below the limiting current at the end of the batch (see, for example, FIG. 11). The inventors have discovered that voltage regulation can be incorporated into the ED system in order to apply a high voltage at the start of the batch process and gradually decrease the voltage to maintain the instantaneous current density that is just under the limiting current density. Active voltage control, for example, based on diluate conductivity measurements, can allow operation just below the limiting current density throughout the process (for example, the batch duration) in order to achieve higher ion-transfer rates (as compared to a conventional process using constant voltage). This strategy can be used to either increase the production rate using a given membrane area, or decrease the required membrane area for a fixed production rate.

In certain aspects, voltage control or regulation comprises decreasing the voltage over time comprising:

iii-1. applying a first voltage that achieves a first current density in a diluate stream having a first diluate concentration thereby removing ions from the diluate stream, wherein said first voltage is less than that which would exceed the limiting current density of the diluate stream;

iii-2. applying a second voltage that achieves a second current density in the diluate stream having a second diluate concentration, wherein said second voltage and current density are less than the first voltage and current density, and wherein the second diluate concentration is less than the first diluate concentration, thereby removing ions from the diluate stream, wherein the second voltage is less than that which would exceed the limiting current of the diluate stream; and iii-3. optionally repeating step iii-2 one or more times, wherein each subsequent applied voltage and current density is less than the prior applied voltage and current density, and wherein each subsequent voltage is less than that which would exceed the limiting current density of the diluate stream.

Step iii-2 can optionally be repeated one or more times until the product water achieves the desired salt concentration; for example, the product water can have a total dissolved solids (TDS) concentration of 500 ppm or less, or 300 ppm or less, or 200 ppm or less, or 100 ppm or less.

The methods encompass decreasing voltage continuously as well as in a stepwise manner.

In additional aspects, decreasing the voltage over time comprises:

iii-1a. a first interval of applying a first voltage that achieves a first current density in a diluate stream having a first diluate concentration thereby removing ions from the diluate stream, wherein said first interval is terminated prior to reaching the limiting current density of the diluate stream;

iii-2b. a second interval of applying a second voltage that achieves a second current density in the diluate stream having a second diluate concentration, wherein said second voltage and current density are less than the first voltage and current density, and wherein the second diluate concentration is less than the first diluate concentration, thereby removing ions from the diluate stream, wherein the second interval is terminated prior to reaching the limiting current of the diluate stream; and iii-3c. optionally repeating step iii-2b one or more times, wherein each subsequent interval comprises applying a voltage that achieves a current density in the diluate stream that is less than the voltage and current density of the prior interval, and wherein each subsequent interval is terminated prior to reaching the limiting current density of the diluate stream.

In some cases, step ii-2 is repeated one or more times until the product water achieves the desired salt concentration; for example, the product water can have a total dissolved solids (TDS) concentration of 500 ppm or less, or 300 ppm or less, or 200 ppm or less, or 100 ppm or less.

As described above, the voltage is regulated (and gradually decreased) such that the current density is close to, but does not exceed, the limiting current during the process. For example, the voltage can be regulated to maintain a current density that is within about 60%, about 70%, about 80%, or about 90% of the limiting current density of the diluate stream. In this context, "within about 60%", for example, is intended to mean that the current density is within the range defined as a current density less than that which will actually result in water splitting and more than about 60% of the limiting current density value, as defined in more detail above.

Figure 21:
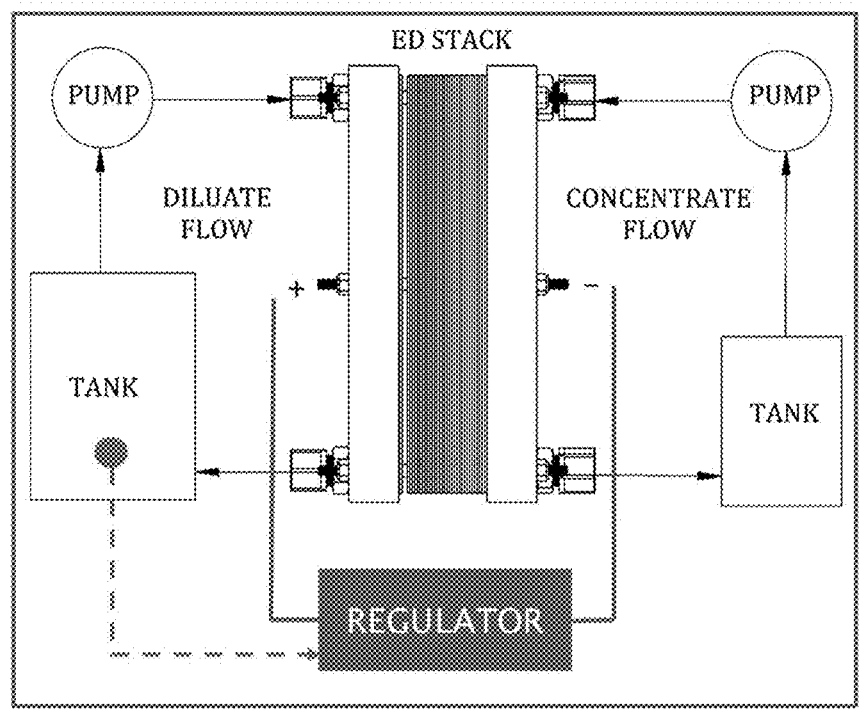
FIG. 21 is a schematic showing a voltage-regulated system. The box labelled "Regulator" designates the voltage regulator.

ED systems often already comprise diluate tank conductivity sensors in order to determine when the target concentration has been attained in the diluate. The voltage-regulated systems and methods described herein can further comprise a controller or voltage regulator that can administer an appropriate voltage to the ED stack based on the conductivity measurements (FIG. 21). In some cases, the ED system comprises a conductivity sensing unit configured to measure the conductivity of the diluate (for example, in the diluate tank) and the voltage regulator adjusts the voltage based on the conductivity measurement. In certain examples, a computer plays the role of a voltage regulator, and controls a variable voltage power-supply. The conductivity sensing unit can be a conductivity sensor or meter that is connected to (or configured to measure conductivity of) a diluate stream (for example, in the ED stack or in the diluate tank) and optionally connected to or in communication with the voltage regulator. Alternatively, or in addition, the ED stack can perform the conductivity sensing itself. For example, where a computer (computer system or computer processing unit) controls the voltage regulator or where the voltage regulator is a computer, the system can simply decrease the voltage (by sending an appropriate signal to the voltage regulator or the power supply) over time beginning from the time the power is applied to the electrodes and ending at a predetermined time that predicts the target ion, or salt, concentration is reached. For example, if the system is configured to reduce salt concentrations from 2,000 ppm to 100 ppm over 1 hour, then the computer can simply decrease the voltage essentially linearly (e.g., continuously) or stepwise (e.g., having 2, 3, 4, 5, 6, 7, 8, 9, or 10 or more steps) from a beginning voltage (e.g., 50 volts) to an ending voltage (0 volts) in an algorithm predicted to maintain the current density of the diluate stream below the target over time. For example, it may be suitable to program the computer to decrease the voltage of the system from 50 volts by 5 volts ever 0.1 hour. Preferably, however, the computer is configured to collect data from a conductivity sensor along the diluate stream (e.g., in the diluate tank) and use that data to determine the voltage required to maintain the current density of the system below the limiting current density until the desired conductivity is reached, indicating the desired water purity achieved. For example, the computer can be configured to collect conductivity data of the diluate stream and, as the diluate stream approaches a predetermined value indicating that the current density within the ED stack is approaching the limiting current density (or a value less than that to prevent accidental water splitting, or "tolerance value"), the computer can send a signal to the voltage regulator or to the power supply to decrease voltage by a predetermined value, such as 1, 2, 3,4, 5, 6, 7, 8, 9, or 10 volts (or a value in between). The computer, conductivity control and voltage regulator can be all within the same housing. Alternatively, each component can be in a separate housing. The computer can conveniently be operably connected to the conductivity sensors and/or voltage regulator and/or power supply wirelessly or by Bluetooth. The computer can also control other aspects of the water system, such as emptying and filling the tanks, monitoring water quality, managing the lifespan or efficiency of any filters, electrodes, membranes or other components, and retaining data from the system within its memory.

The voltage regulated ED systems and methods can have high product recovery ratios, for example, at least about 60%, at least about 70%, at least about 80%, or is at least about 85%, or at least about 90%.

The voltage regulated ED system can operate at a range of different production rates. For example, the production rate can be as high as hundreds or thousands of liters per hour. In certain aspects, the voltage regulated ED system has a production rate that is at least about 2 L/hr, or at least about 5 L/hr, or at least about 9 L/hr, or at least about 10 L/hr, or at least about 11 L/hr, or at least about 15 L/hr, or at least about 25 L/hr, or at least about 50 L/hr, at least about 100 L/hr, at least about 500 L/hr. In specific aspects, the production rate can be between about 9 and about 15 liters per hours, or between about 11 and 12 liters per hour.

The voltage-regulated ED systems and methods described herein can operate at a higher time-averaged current density than an identical system and method that applies a constant voltage (in other words, a constant voltage operation). The voltage-regulated ED system can have a current density that is closer to the limiting current density and/or having a higher production rate than that of a constant voltage system.

As described above, the voltage of the voltage-regulated ED system does not exceed that which would achieve a current density greater than the limiting current density. In addition, the voltage per cell pair of a voltage-regulated ED system should not exceed the operating limit of the ion exchange membrane pair. The operating limit is generally set by the manufacturer of the Cation Exchange Membranes and Anion Exchange Membranes. Alternatively or in addition, the operating limit can be set by the maximum current density that can be achieved by the electrodes, and is generally set by the manufacturer of the electrodes.

The area of the membranes, the channel geometry, the number of cell pairs, the volume of the diluate and/or concentrate tanks, can be tailored to the intended use and/or production rate and/or the product water sat content, and/or to the salinity or other characteristics of the feedwater. In certain specific embodiments, for example, when the system is for in home use, the area of the ion exchange membrane is relatively small; for example, the length of each ion exchange membrane can be between about 2 and about 30 cm and the width of each ion exchange membrane can be between about 2 and about 20 cm.

Including voltage regulation in the ED system permits the use of a lower total area of ion exchange membranes than that for a constant voltage system in order to obtain the same production rate or desalination time. In certain aspects, the number of ion exchange membrane pairs can between 10 and 100, 10 and 75, 10 and 50, 10 and 30, 10 and 28, 10 and 25 and 10 and 22. In yet additional aspects, the number of ion exchange membrane pairs is between 10 and 30, or between 10 and 28, or between 10 and 22.

In yet additional aspects, the invention is directed to a cost-optimal geometry for an ED system, for example, a batch ED and method for use; for example, in the home. It has been found that systems with large cell-pair length-towidth aspect ratios (for example, about 3.5:1 to about 6:1) and/or small intermembrane channel heights (for example, about 0.30 to about 0.33 mm) achieves high product recovery ratio and product water having a low TDS while reducing costs. In certain specific aspects, the system and methods comprises a voltage regulator as described above and has a large cell-pair length-to-width aspect ratios (for example, about 3.5:1 to about 6:1) and/or small intermembrane channel heights (for example, about 0.30 to about 0.33 mm).

The ratio of length to width for each ion exchange membrane can be selected from Table 1 below:

TABLE 1

| Row | Ratio of length to width |
| --- | --- |
| 1 | about 3.5 to about 6 |
| 2 | about 3.5 to about 5 |
| 3 | about 3.5 to about 4 |
| 4 | about 4 to about 6 |
| 5 | about 5 to about 6 |

In order to provide a size of the device or system suitable for point-of-use or domestic use, the membranes can have the ratio of length to width described in Table 1, wherein the length of each ion exchange membrane is between about 2 and about 30 cm and the width of each ion exchange membrane is between about 2 and about 20 cm. For example, in some cases, the ratio of length to width can be about 3.5 to about 6 (Row 1) wherein the length of each ion exchange membrane is between about 2 and about 30 cm and the width of each ion exchange membrane is between about 2 and about 20 cm.

In certain aspects, the intermembrane height of the channels can be between 0.3 and 1.00 mm. The intermembrane height of the channels also can be selected from those in Table 2:

TABLE 2

| Row | Intermembrane height of channel (h) |
| --- | --- |
| 1 | About 0.30 to about 0.35 mm |
| 2 | About 0.30 to about 0.33 mm |

The system can also have a length to width to width ratio selected from Table 1 and an intermembrane height of the channel selected from Table 2. For example, the system can have length to width ratio of the membrane from Row 1 of Table 1 and an intermembrane channel height from Row 2 of Table 2. In additional aspects, the length to width ratio and intermembrane channel height is selected from Table 3:

TABLE 3

| Row | Ratio of length to width | Intermembrane height of channel (h) |
| --- | --- | --- |
| 1 | about 3.5 and about 6 | About 0.30 to about 0.35 mm |
| 2 | about 3.5 and about 6 | About 0.30 to about 0.33 mm |
| 3 | about 3.5 and about 5 | About 0.30 to about 0.35 mm |
| 4 | about 3.5 and about 5 | About 0.30 to about 0.33 mm |
| 5 | about 3.5 and about 4 | About 0.30 to about 0.35 mm |
| 6 | about 3.5 and about 4 | About 0.30 to about 0.33 mm |
| 7 | about 4 and about 6 | About 0.30 to about 0.35 mm |
| 8 | about 4 and about 6 | About 0.30 to about 0.33 mm |
| 9 | about 5 and about 6 | About 0.30 to about 0.35 mm |
| 10 | about 5 and about 6 | About 0.30 to about 0.33 mm. |

In certain aspects, the number of ion exchange membrane pairs can between 10 and 100, 10 and 75, 10 and 50, 10 and 30, 10 and 28, 10 and 25 and 10 and 22. In yet additional aspects, the number of ion exchange membrane pairs is between 36 and 46, or between 36 and 46. In further aspects, the number of ion exchange membrane pairs is between 36 and 46 and the ratio of length to width and intermembrane channel height of the channels is selected from Table 3. For example, in one aspect, the number of ion exchange membrane pairs is between 36 and 46 and the ratio of length to width and intermembrane channel height is that of Row 1 of Table 3.

As described herein, the desalination systems and methods described herein have high product recovery ratios, for example, at least about 60%, at least about 70%, at least about 80%, at least about 85%, or at least about 90%. In certain aspects, the desalination system or method has product recovery ratio of at least about 85% and the ratio of length to width and intermembrane channel height of the channels is selected from Table 3. In an additional aspect, the desalination system has product recovery ratio of at least about 85% and the ratio of length to width and intermembrane channel height of the channels is selected from Table 3, and the number of ion exchange membrane pairs is between 36 and 46. In yet additional aspects, the desalination system has product recovery ratio of at least about 90% and the ratio of length to width and/or intermembrane channel height of the channels are selected from Tables 1, 2 or 3. In an additional aspect, the desalination system has product recovery ratio of at least about 90% and the ratio of length to width and/or intermembrane channel height of the channels is selected from Tables 1, 2, or 3, and the number of ion exchange membrane pairs is between 36 and 46.

The systems and methods can have production rate that is at least about 9 L/hr, or at least 10 L/hr, or at least about 11 L/hr, or at least about 15 L/hr, or at least about 25 L/hr, or at least about 50 L/hr. In further aspects, for example for in home use, the production rate of the system is between about 9 and about 15 liters per hour (L/hr). In further aspects, the production rate is between about 11 and 13 L/hr. In certain aspects, the production rate is between about 11.5 and about 12.5 L/hr. In certain aspects, the system has a production rate between about 9 and about 15 liters per hour (L/hr) and the ratio of length to width and/or intermembrane channel height is/are selected from Tables 1, 2, or 3, and optionally the number of ion exchange membrane pairs is between 36 and 46. In additional aspects, the system has a production rate between about 11.5 and about 12.5 L/hr and the ratio of length to width and/or intermembrane channel height is/are selected from Tables 1, 2, or 3 and optionally the number of ion exchange membrane pairs is between 36 and 46. In further aspects, the production rate is at least about 60%, at least about 70%, at least about 80%, at least about 85% or at least about 90%.

The flow rate of the systems can be between about 100 and about 300 L/hr, or about between about 200 and about 300 L/hr. In certain aspects, the flow rate is between about 200 and about 300 L/hr and the production rate is at least 85% or at least 90%. The ratio of length to width and/or intermembrane channel height is/are selected from Tables 1, 2, or 3, and optionally the number of ion exchange membrane pairs is between 36 and 46.

In certain aspects, for product water having a TDS concentration between about 100 mg/L and 300 mg/L, the flow velocity can be selected from Table 4 below:

TABLE 4

| Row | Flow velocity |
| --- | --- |
| 1 | About 10 and about 22 cm per second |
| 2 | About 18 and about 21 cm per second |
| 3 | About 15 and about 18 cm per second |
| 4 | about 11 and about 16 cm per second |

In yet additional aspects, the flow velocity and product water TDS concentration is selected from Table 4A below:

TABLE 4A

| Row | Product water TDS | Flow velocity |
| --- | --- | --- |
| 1 | About 300 mg/L | About 18 to about 21 cm/s |
| 2 | About 200 mg/L | About 15 to about 18 cm/s |
| 3 | About 100 mg/L | About 11 to about 16 cm/s |

The systems can have a flow velocity selected from Table 4 or 4A, and product recovery ratio of at least about 80% or at least about 85%. In yet additional aspects, the system can have a flow velocity selected from Table 4 or 4A, and product recovery ratio of at least about 90%. The ratio of length to width and/or intermembrane channel height can be selected from Tables 1, 2, or 3, and optionally the number of ion exchange membrane pairs is between 36 and 46. In certain aspect, the flow rate is between about 100 and about 300 L/hr, or about between about 200 and about 300 L/hr.

The ED systems comprising ED stacks of the specific geometries delineated above can further comprise a voltage regulator to maintain a current density less than the limiting current density for the diluate and optionally further comprising a conductivity sensing unit as described herein.

The ED systems described herein include a diluate tank and a concentrate tank. In batch systems, the volume of the diluate tank is generally higher than that of the concentrate tank, and the tanks can be of any volume suitable for the intended use of the system. The relative volumes of the diluate and concentrate tanks can be chosen based on the desired product recovery ratio being targeted. For example, for a 90% product recovery ratio, one can choose a 9 L diluate tank and 1 L concentrate tank. In certain embodiments, for example, for in home use, the volume of the diluate tank can, for example, be between about 1 and about 10 L, between about 2 and about 5 L, or between about 3 and about 4 L. The volume of the concentrate tank can be between about 0.1 and 9 L, between about 0.1 and about 5 L, between about 0.1 and about 3 L, between about 0.2 and about 2 L, or between about 0.2 and 0.6 liters.

The systems described herein can further comprise a storage tank fluidly connected to the diluate tank. The storage tank can be used, for example, to store potable (drinking) water. In certain aspects, the system is for in home use and weighs about 12 kg or less.

The ED systems used herein can further comprise a housing that contains the electrodes and the electrodialysis stack and includes passages for a diluate input line (which is in fluid communication with a diluate inlet), a concentrate input line (which is in fluid communication with a concentrate inlet), a diluate output line (which is in fluid communication with a diluate outlet), and a concentrate output line (which is in fluid communication with a concentrate outlet).

Figure 9A:
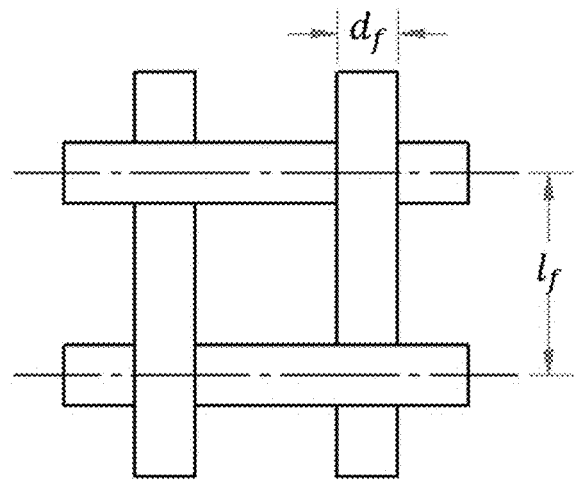
FIG. 9A is top view of woven mesh which is often used as a spacer and turbulence promoter in the flow channels.
Figure 9B:
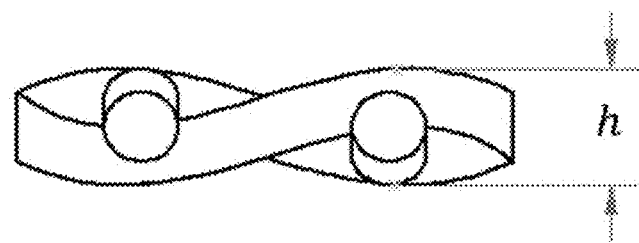
FIG. 9B is a cross-sectional view of the woven mesh show in FIG. 9A.

The ED stacks utilized herein can further comprise a plurality of spacers placed between each of the ion exchange membranes. The spacers can, for example, be woven mesh. Spacers can be turbulence-promoting support mesh used to create the compartments through which the solutions flow. Uniform flow distribution and prevention of internal leakage through spacer and gasket design can be important for system performance. A view of an exemplary spacer is shown in FIG. 9.

The desalination methods can further comprise introducing the feedwater into a compartment, for example, feedwater can be introduced into the diluate tank, or can be introduced into the diluate and concentrate tanks. In certain aspects, the feedwater is ground water such as Indian ground water. In additional aspects, the feedwater can have a TDS concentration of about 3000 mg/L or less, or a TDS concentration of about 2000 mg/L or less.

Where biological contaminants (e.g., microbiological and/or pathogenic organisms) are present in the feedwater, pre- and/or post-filtration systems (such as those currently used for existing in-home reverse osmosis water systems) can be required so that the product water is safe for drinking. ED removes charged particles and does not remove such biological contaminants. Pre- and post-filtration systems include, but are not limited, sediment filters, carbon filters and UV filters. For example, a sediment filter and/or carbon filter can be used for pre-filtration, and/or a carbon filter and UV filter can be used for post filtration. The pre-filtration system is, for example, upstream of and in fluid communication with the diluate and concentrate tanks. The post-filtration system is, for example, downstream of and in fluid communication with the diluate tank.

The invention also includes methods of desalinating feedwater comprising the use of a system as described herein. For example, the method can comprise introducing feedwater into a diluate channel and applying an electrical potential across the ion exchange membrane pairs. As described above, the feedwater can be any saltwater in need of desalination, for example, ground water. In certain aspects, the feedwater has a TDS concentration of about 3000 mg/L or less, or about 2000 mg/L or less. When the method is to provide drinking water, the TDS concentration is one that is palatable and/or within the government agency health standards; for example, the product water can have a TDS concentration of 500 mg/L or less. In yet additional aspects, the product water can have a TDS concentration between about 100 mg/L and about 300 mg/L, or about 300 mg/L (or 300 ppm) or less, or about 200 mg/L (or 200 ppm) or less, or about 100 mg/L (or 100 ppm) or less.

In some aspects, when the water in the diluate tank reaches a desired diluate concentration, the water drains into a storage tank. A user can obtain drinking water from the storage tank.

The invention is illustrated by the following examples which are not meant to be limiting in any way.

EXEMPLIFICATION

Example 1

Optimal Design of a Batch Electrodialysis System for Domestic Desalination

In this work, we used simulation to investigate how a domestic batch ED system could be designed to minimize cost while providing production rates and product water concentrations that are suitable for domestic use. In particular, we aimed to address the following:

1. How should a domestic ED system be configured to minimize cost?

2. How do production rate and concentration requirements affect the design?
3. What are the primary contributors to the cost?

II. System Description

The batch ED system (FIG. 1) proposed by Nayar et al. [7] and analyzed here consists of two primary flow circuits: one for the diluate, and the other for the concentrate. At the start of each batch process, both tanks hold feedwater at the same concentration. The relative volume of water in the diluate versus the concentrate circuits governs the recovery ratio of the process. During desalination, a voltage V is applied and fluid is recirculated through the stack at volumetric flowrates Q until the desired concentration is achieved in the diluate tank. Geometrical parameters including the length L, width W, number of cell pairs N, and the height of the channels h are expected to also affect the desalination performance and were considered for optimization.

The voltage and recirculation flowrates are held constant during the batch process, which is consistent with the treatment employed by others, both in simulation and practice [10-13]. An additional circuit may be required for the electrode rinse stream; however, its design is not considered here because it is not expected to strongly affect desalination performance.

III. Models

The models used in this analysis are derived primarily from the work of Ortiz et al. [13], Pawlowski et al. [14, 15], and Ponzio et al. [16]. Their work is not explained in detail here. Instead, a brief overview of the theory relevant to this optimization problem is presented herein to facilitate the reader's understanding of the work.

Following common practice, this work models desalination assuming a sodium-chloride solution. While production rates may vary for other ions, design insights obtained through this analysis are expected to remain relevant.

3.1 Mass Transfer and Limiting Current Density

Mass transfer was modeled using a similar approach as Ortiz et al. [17]. The full details are spared here. Instead, an analogous circuit (FIG. 2) is used to facilitate a discussion surrounding the principal terms affecting ion movement from the diluate to the concentrate channels.

Resistances of the membranes ($R_{CEM}$ and $R_{AEM}$ [Ohms-$m^2$]) are modeled using static manufacturer specifications, but those associated with the diluate and concentrate streams ($R_{dil}$ and $R_{conc}$) increase linearly with solution resistivity $\rho_s$ [Ohm-m] and channel height h [m] as per $$R = \rho_s h. \quad (1)$$

In addition, a back-potential develops across the membranes during desalination due to concentration polarization at the membranes: $E_{CEM}$ and $E_{AEM}$ [V]. Concentration polarization also bounds the maximum rate of ion transport since there exists a current density which will produce a zero ion concentration at the membrane surface in the diluate channel. This limiting current density $i_{lim}$ [A/m$^2$] plays an important role in the design of an ED stack, and is estimated using:

$$i_{lim} = \frac{C_{dil}^{bulk} zFk}{T-t} \quad (2)$$

where z is the valence of the ion, $T_{mem}$ is the transport number of the ion in the membrane, and t is the transport number of the ion in the bulk solution where the concentration is $C_{dil}^{bulk}$. The primary deviation of our mass transfer model from that of Ortiz et al. is related to the treatment of the boundary-layer mass transfer coefficient k [m/s]. Our approach captures its dependency on hydrodynamic factors because of the effect it has on the design of the ED channels and the selection of the pumps.

Figure 3:
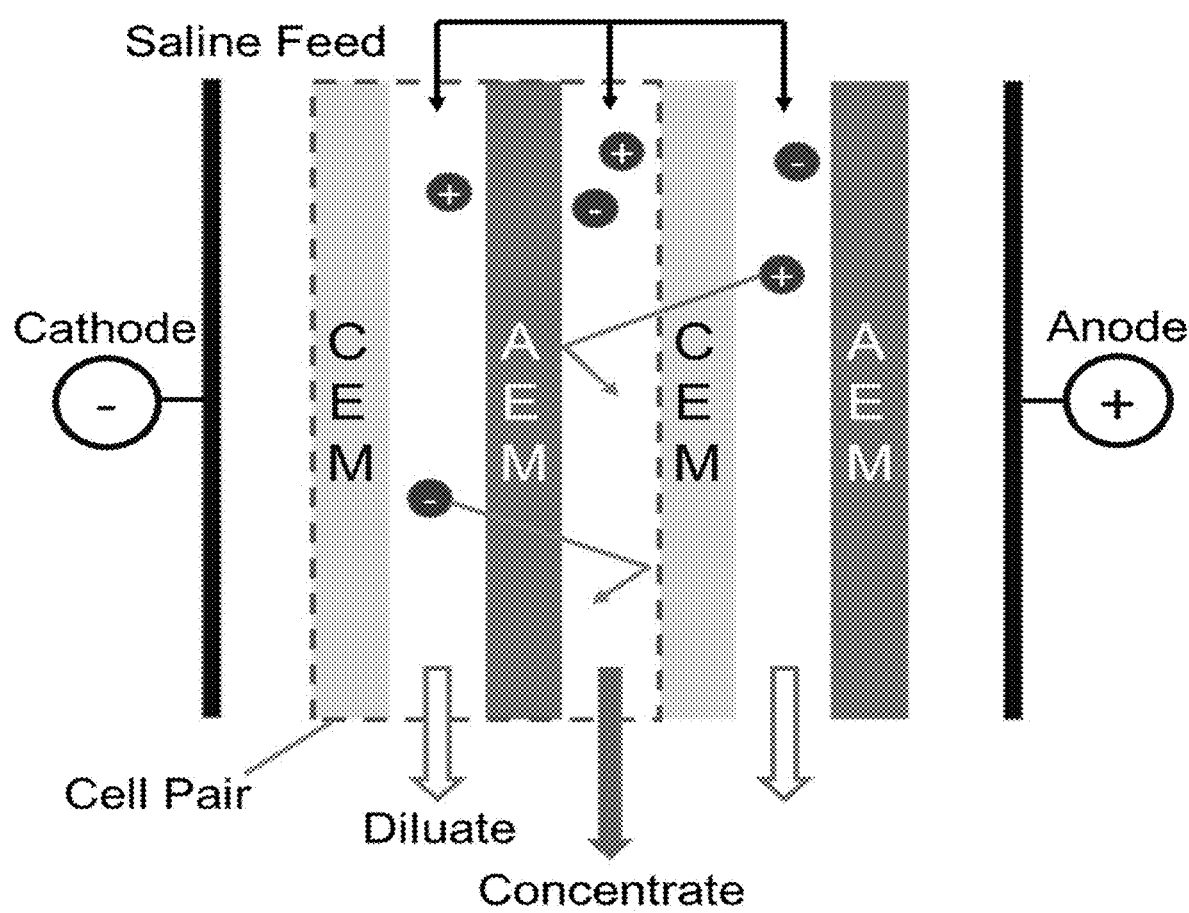
FIG. 3 is a schematic of an electrodialysis stack showing the anode, the cathode, and a cell pair consisting of a CEM, a diluate channel, an AEM, and a concentrate channel.

The dominant impedance in brackish water desalination using ED is the resistance of the diluate channels because the solution resistivity increases sharply (FIG. 3) at low concentrations. In addition, the high membrane potential and low limiting current were expected to drastically increase the cost of designs targeted at achieving the lowest product water concentrations.

3.2 Coupling Mass Transfer to Flow Properties

Mass transfer is correlated to flow properties via the Sherwood Number correlation given by $$Sh = 0.29 Re_d^{0.5} Sc^{0.33} [15] \quad (3)$$

where the Schmidt Number Sc is a material-dependent quantity, and $Re_d$ is Reynold's Number based on the spacer-filled velocity $u_{ch}$ and the hydraulic diameter $d_h$. The Sherwood Number characterizes the mass transfer in the boundary layer, and is related to k by $$k = \frac{ShD}{d_h}. \quad (4)$$

where D is the diffusion coefficient of the solution and the hydraulic diameter $d_h$ defined by Pawlowski et al. is:

$$d_h = \frac{4\epsilon}{\frac{2}{h} + (1-\epsilon)\left(\frac{8}{h}\right)} \quad (5)$$

where the void fraction $\epsilon$ is defined as the fraction of the channel that is not filled by the spacer.

From Eqns. 2-5, it is evident that a high linear flow velocity and a small channel thickness will produce an increase in the mass transfer coefficient and a corresponding increase in the limiting current density. Using optimization, we sought to balance these benefits with the cost associated with larger pressure drop.

3.3 Pressure Drop

The dominant source of pressure drop is the flow through the channels [14], modeled as $$\Delta p = K_p \rho f \frac{L}{h} u_v^2 \quad (6)$$

where $K_p = 0.75$ is an experimentally-determined coefficient, $\rho$ [kg/m$^3$] is the density of the fluid, L [cm] is the length of the channel's active area, and void channel velocity (assuming no spacer) $u_v$ [cm/s] is related to the volumetric flow in each circuit Q [L/hr] by $$u_v = \frac{Q}{WhN} \quad (7)$$

where W [cm] is the width of the active area and N is the number of cell-pairs. Then, using an alternative Reynolds Number Re definition based on $u_v$ and the channel height h, the friction factor f can be approximated from the results of Ponzio et al. [16] as being $$f=1500Re^{-1} \text{ for } Re<58, \text{ and}$$

$$f=116Re^{-0.37} \text{ for } Re\geq 58. \quad (8)$$

We acknowledge that accurate prediction of the pressure drop requires consideration of several other variables including the spacer orientation, spacing and angle between filaments, and whether they are woven or not. This level of detail was not deemed necessary for this analysis.

3.4 Flow Spacer

The presence of a spacer also decreases the area available for ion transport. This effect is accommodated by adjusting the exchange area by a porosity value η or 'shadow factor', calculated using $$\eta = \frac{(l_f - d_f)^2}{l_f^2} \quad (9)$$

assuming an orthogonal arrangement of filaments. The spacing $l_f$ [mm] and the diameter $d_f$ [mm] of filaments were related to the height of each channel by $$l_f = 1.5 \, h, \text{ and} \quad (10)$$

$$d_f = \frac{h}{2 \, cf}$$

using a compaction factor cf of 0.946 [19]. The spacing to height ratio of 1.5 in Eqn. 10 is based on a survey of product offerings from manufacturers of woven meshes. From these relationships, it is deduced that thinner spacers will provide lower open areas for ion-exchange.

IV. Optimization Formulation

The multi-objective optimization problem is defined as $$\min J(x, p)$$

$$s.t \; g(x, p) \leq 0$$

$$x_{lb} \leq x \leq x_{ub} \quad (11)$$

where x is the design vector to be optimized, p is the vector of constant model parameters, J(x, p) is the vector of objective functions, and g(x, p) is the inequality constraints. In this study, the design vector is bounded from below and above by $x_{lb}$ and $x_{ub}$, respectively.

4.1 Design Variables and Bounds

Each design permutation is defined by a design vector x consisting of the six individual variables (FIG. 1) listed in Table 1 with respective bounds. All variables were treated as continuous given the limitations of the algorithm implementation. In practice, the number of cell-pairs would be rounded to the nearest integer value. Pumps were not treated as variables. Instead, a pump was selected to provide the desired flow-rate for each design iteration.

TABLE 1-1

Design Variables and Respective Bounds

| Variables | Symbol | Bounds | Justification for Bounds |
|---|---|---|---|
| Length of Active Area | L | 2-30 cm | Proposed system should be packaged within similar |

TABLE 1-1-continued

Design Variables and Respective Bounds

| Variables | Symbol | Bounds | Justification for Bounds |
|---|---|---|---|
| Width of Active Area | W | 2-20 cm | envelope as existing domestic RO systems. |
| Number of Cell Pairs | N | 10-30 | |
| Channel Height | H | 0.30-1.00 mm | Size range of commonly available spacers |
| Volumetric Flow Rates | Q | 10-300 L/hr | Capacity of small-scale pumps |
| Voltage | V | 5-100 V | — |

4.2 Objective Function

The first objective in $J=[J_1, J_2]$ for this multi-objective optimization problem was to minimize the total cost of the proposed domestic ED system. Therefore, $J_1$ was the total cost TC of the system, which can be further broken down into the capital cost CC and operating cost OC components according to $$J_1=TC=CC+OC. \quad (12)$$

The capital cost was calculated using rates obtained from wholescale suppliers in order to best estimate the cost at large-scale production (Table 1-2). Mark-up on manufacturing cost is not considered here because it is affected by commercial factors that may vary one market to another.

TABLE 1-2

Unit Component Costs

| Variables | Cost | References |
|---|---|---|
| Electrodes | 2000/m² | [20] |
| Membranes | 40/m² | [21] |
| Spacers | 3/m² | [22] |

Since ED systems are not widely used at the domestic scale, it is currently difficult to estimate the maintenance cost and membrane replacement frequency. For this reason, the operating cost considered here is only a function of the energy consumption, and given by:

$$OC=V_p E_s r_E \quad (13)$$

where $V_p$ [L] is the total volume desalinated water produced for a household of five members consuming 3 L per person per day over the assumed product lifetime of 7 years, $E_s$ [J/L] is the specific energy consumption calculated for each design permutation, and the assumed specific cost of electrical energy $r_E$ is \$0.10/kWh.

The second objective $J_2$ is to maximize the rate of desalinated water production $Q_p$ [L/hr], hence:

$$J_2 = -Q_p = -\frac{V_b r}{t_b}, \quad (14)$$

where $V_b$ [L] is the size of each batch, r is the recovery ratio, and $t_b$ [hr] is the time to process each batch. The negative sign reflects the desire to maximize production rate.

4.3 Constraints

Designs were forced to operate under the limiting current density by imposing a limit on the duration $t_{lim}$ over which the applied current density exceeded 90% (safety factor) of the instantaneous current density. Furthermore, existing domestic RO products have set customer's expectations for the production rate of desalinated water. As such, we were interested in exploring ED system designs that provided similar production rates ($Q_p$) in the range of 9-15 L/hr [23].

$$g_1 = \frac{i_{lim}}{i_b} = -0.02 \quad (15)$$

$$g_2 = 9 \text{ L/hr} - Q_p$$

$$g_3 = Q_p - 15 \text{ L/hr}$$

4.4 Parameters

In addition to the parameters provided above, including the cost of components and energy, others related specifically to this problem are provided in Table 1-3. The relative sizes of the diluate and concentrate tanks were selected to yield a recovery ratio of 90%, while the actual volumes allowed them to be packaged within the envelope of existing RO systems.

TABLE 1-3

Design Variables and Respective Bounds

| Variables | Symbol | Values |
|---|---|---|
| Feed Concentration | $C_{feed}$ | 2000 mg/L |
| Product Concentration | $C_{prod}$ | 100, 200, and 300 mg/L |
| Diluate Tank Volume | $V_{dil}$ | 3.6 L |
| Concentrate Tank Volume | $V_{conc}$ | 0.4 L |
| Total Volume Produced | $V_p$ | 38 325 L |

The feed concentration is maintained at 2000 mg/L, based on the salinity of Indian groundwater, while the target product water concentration ranged between 100 to 300 mg/L. These concentrations conforms to the drinking water standards specified by WHO [24] and the Bureau of Indian Standards [1].

4.5 Simulation and Optimizer

Figure 33:
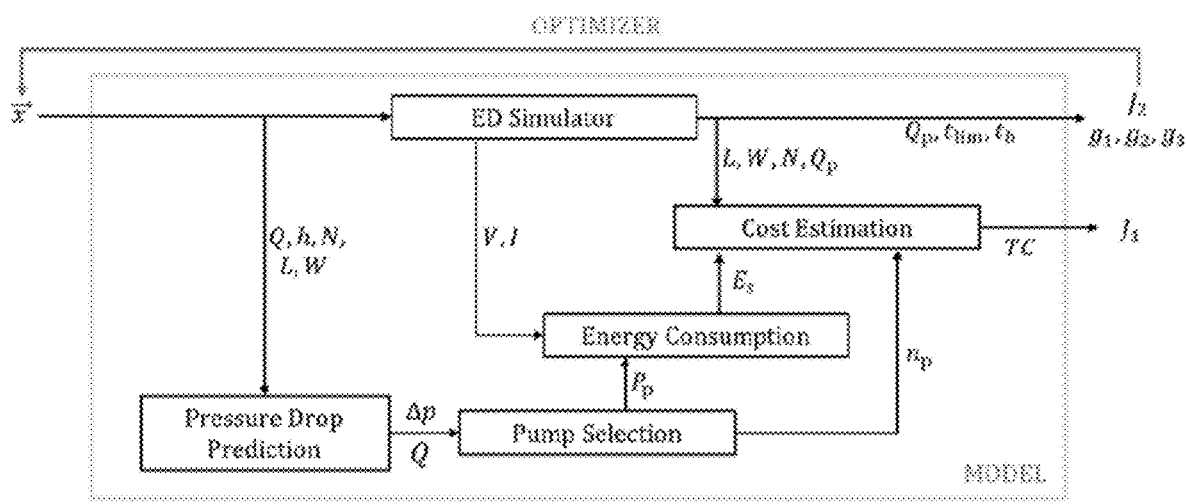
FIG. 33 is a block diagram that approximates the optimization process employed in the analysis described in Examples 1 and 2.

The block diagram in FIG. 33 approximates the optimization process employed in this analysis using MATLAB R2015. Conventional gradient-based algorithms could not be applied with this formulation because the discrete selection of pumps caused the solution to converge at local minima. Instead, the multi-objective problem described above was solved using the modified NSGA-II algorithm implementation in MATLAB.

V. Results and Discussion 5.1 Capital Cost Versus Operating Cost

Optimal designs that minimized total cost were similar in cost and design to those that minimized capital cost. For example, FIG. 5 compares the total cost for designs which produced 200 mg/L product water at varying production rates, optimized either for minimum total cost or for minimum capital cost. The former objective function did indeed provide a lower total cost compared to the latter, but the difference of $5 was negligible.

This result is explained by the operating cost being significantly lower than the capital cost FIG. 5 because the cost of electrical energy is smaller than equipment costs, and the system is utilized infrequently. In domestic applications, the system would only be used for 1-2 hours per day depending on the drinking water requirements of the household. Therefore, the design of an affordable domestic ED system is concerned with capital cost minimization.

5.2 Optimal Design Characterization

Since the capital cost is the dominant term, we expected that cost-optimal designs will aim to maximize the current density during operation [25]. We subsequently explored how this strategy affected the assignment of values to the design variables in order to establish design guidelines.

5.2.1 Linear Flow Velocity, $u_{ch}$

Rather than directly reporting the volumetric flow rate, the linear velocity is provided instead (FIG. 6A) since it is comparable across different scales. Optimal designs operated between 18-21 cm/s for 300 mg/L, 15-18 cm/s for 200 mg/L, and 11-16 cm/s for 100 mg/L product water. These results exceed values reported by other studies, including Lee et al. (7.5 cm/s) [26], Tanaka (10 cm/s) [10], and Kim et al. (4.24 cm/s) [27]. It is possible that higher linear velocities are not implemented in these cases, because managing the resulting pressures may pose difficulties at larger scales. As a result, little work has been performed to understand the effect of high flow velocities on desalination performance, fouling behavior, and membrane durability. This work suggests that further research in these areas is required for advancing the development of domestic ED systems.

The volume flow-rate per cell pair remained approximately constant at 5.1±0.1 L/hr for the 200/300 mg/L and 6.0±0.2 L/hr for mg/L, hence the linear velocity decreased as the width of the active area grew to satisfy higher production rates.

5.2.2 Voltage, V

Optimal voltage values, ranging between 0.7-1.3 V per cell-pair, agreed with other studies and manufacturer recommendations for concentration ranges similar to those investigated here [7, 10, 17, 28]. Furthermore, FIG. 6B agrees with the expectation that a lower applied voltage is required for designs that are targeted at lower product water concentrations given that the limiting current density decrease with concentration (Eqn. 2).

In Section 5.2.1, it is explained that the linear velocity decreases with production rate. Furthermore, based on the mass transfer correlations presented in Eqns. 2-4, it is understood that the limiting current density decreases with the linear velocity. Therefore, in order to avoid exceeding the limiting current density, the applied voltage observed for optimal designs also decreased at higher production rates.

5.2.3 Cell Pair Area, LW

Figure 6A:
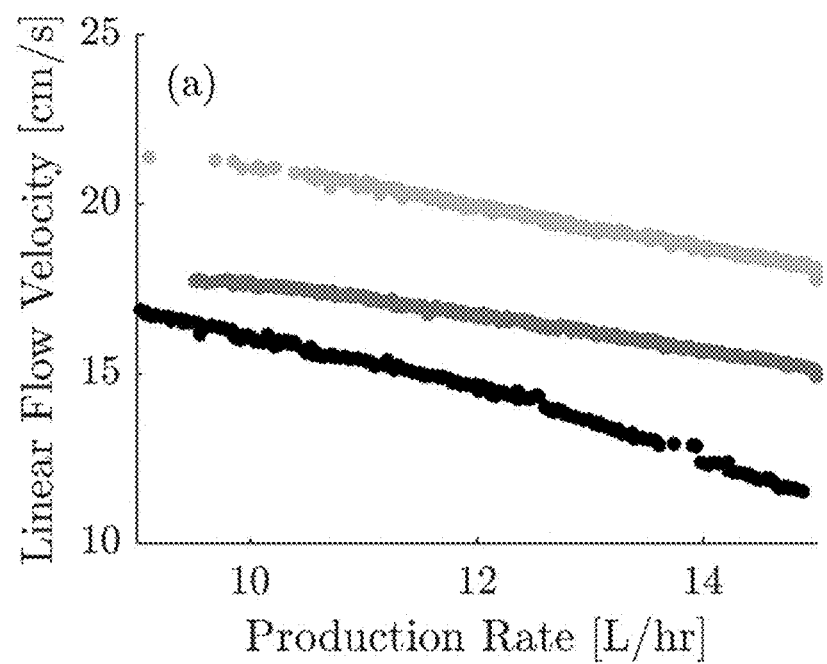
FIGS. 6A to 6F show optimal selection of design variables (linear flow velocity, voltage per cell pair, cell-pair area, aspect ratio, number of cell pairs, and capital cost) for domestic ED systems operating at 90% recovery with 2000 mg/L feed water and varying production rates and concentrations. All selected designs lie on pareto-optimal curves of total cost vs. production rate.
Figure 6B:
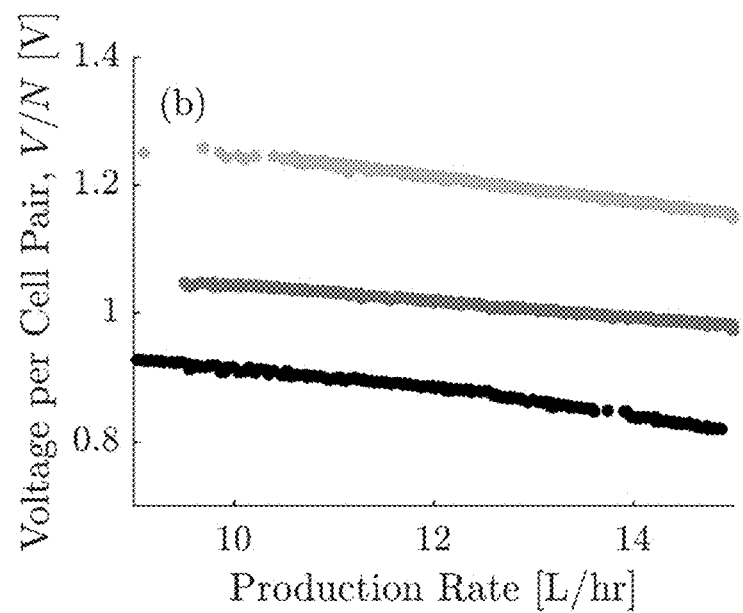
Figure 6C:
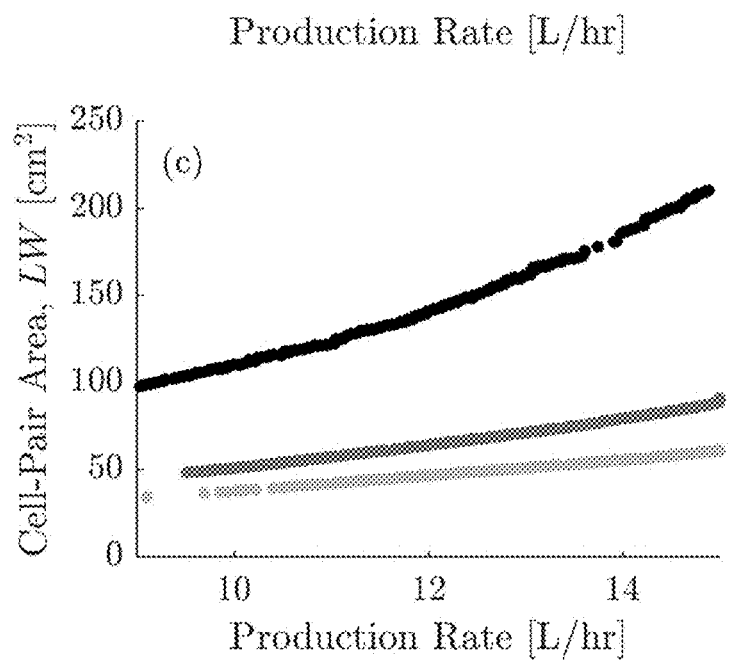
Figure 6D:
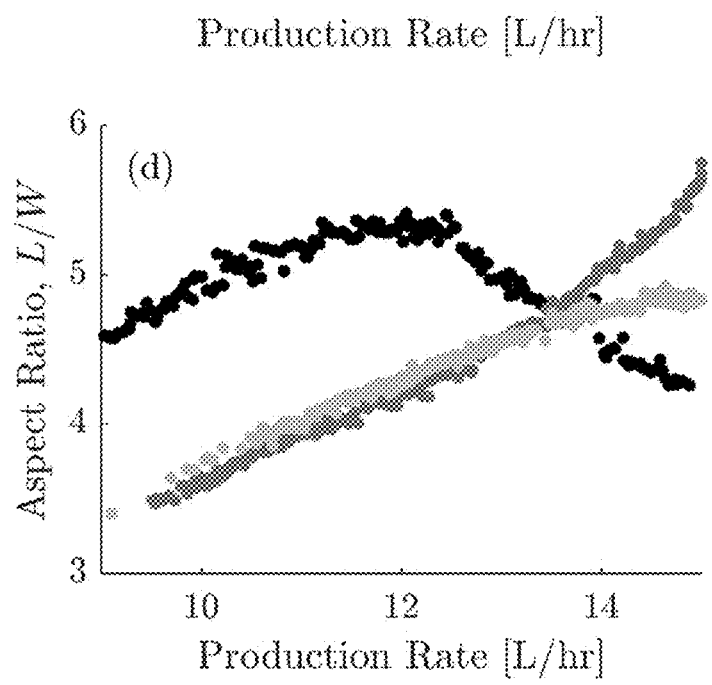

Larger cell-pair area are required to provide the required salt removal rate while compensating for the decrease in the applied voltage (and associated current density) at lower concentrations and higher production rates (FIG. 6C). Both length and width increased with production rate, but the former increased at a faster rate. Inspection of the aspect ratio, defined as L/W (FIG. 6D) indicated that leaner designs were better-performing. For the 100 mg/L case, a decrease in the aspect ratio was observed after 12 L/hr because the length was prevented from exceeding the upper bound of 30 cm.

5.2.4 Number of Cell-Pairs, N

Figure 6E:
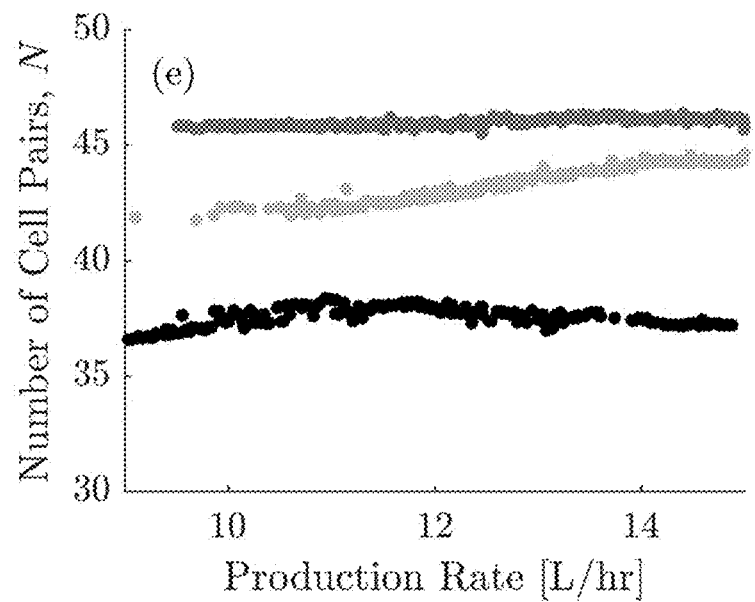

Implementing more cell-pairs to achieve a higher production rate is not necessarily cost-optimal at the domestic scale (FIG. 6E). Instead, it was found that the optimal number of cell-pairs was determined by the capacity of the selected pumps and the required linear flow velocity in the channels.

5.2.5 Capital Cost

Figure 6F:
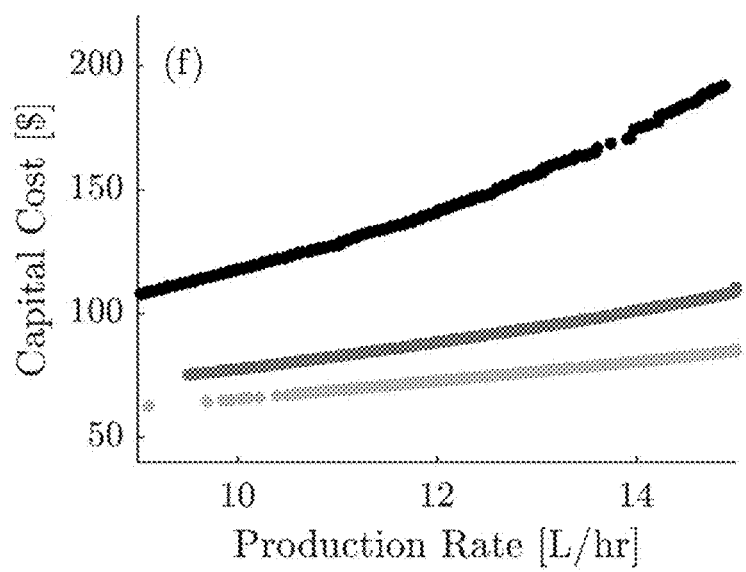

The capital cost increased drastically between systems designed for producing 200 mg/L vs. 100 mg/L (FIG. 6F). This increase in cost is associated with the additional area required to maintain the desired rate of salt removal while operating at a lower current density. These results agree with others that have found ED to be expensive process for producing ultra-pure water [29].

5.2.6 Channel Heights, h

Optimum heights ranged between 0.30-0.33 mm for the full spectrum of production rates and concentrations analyzed here. Hence, the cost of greater pressure drop incurred by reducing the channel height is justified by the enhanced mass transfer over the range of operation considered in this study.

5.3 Capital Cost and Energy Distribution

The component-level breakdown provided for optimal systems ranging between 11.5 and 12.5 L/hr of production indicated that pumps accounted for a significant fraction of the capital cost, particularly at 200 mg/L and 300 mg/L. A similar breakdown for energy consumption due to desalination and pumping also indicated that pumps accounted for as high as 83% of the total energy consumption.

Overall, this work has indicated that the development of low-cost and energy efficient pumps that are suitable for flow-rates ranging between 200 and 300 L/hr, while sustaining pressures up to 2 bar, will assist the commercialization of domestic ED systems. In addition, a more detailed investigation surrounding the optimal geometry of flow-spacers may provide similar or better mass transfer behavior at a lower pressure drop, thereby also reducing the pumping expense.

VI. Conclusion

Cost-optimal design of a batch ED system, that met the desalination requirements of a household, was investigated through the use of a multi-objective genetic algorithm. Production rates (9-15 L/hr) and product concentrations (100, 200, and 300 mg/L) that matched the expectations of existing RO customers were targeted at a fixed feed concentration of 2000 mg/L and 90% recovery.

Capital cost was found to dominate over the operating cost, while optimal designs targeted at 100 mg/L remained significantly more expensive than those targeted at 200 and 300 mg/L because they operated at lower current densities. Investigating the cost breakdown at a component level, it was found that pumps significantly affected the affordability of the proposed batch ED system.

To maximize the current density during operation, thin channels (0.30-0.33 mm), high aspect ratios (3.5-6), and cell-pair numbers that varied from 36 to 46 were recommended. Voltages applied to larger systems were found to be applicable at the domestic scale; however, optimal flow velocities (11-21 cm/s) were greater than reported in other literature. Other details, including the cell-pair area, have also been provided to guide the design of domestic ED systems.

The primary limitation of this work is the exclusion of membrane replacement expenses in the operating cost. Since the cost-optimal approach was to minimize cell-pair area, the corresponding membrane replacement cost would also be therefore minimized. However, operating at the suggested high linear flow velocities may negatively impact membrane life, and subsequently increase replacement frequency. Therefore, further experimental work to characterize membrane performance was also recommended.

Selection of Pumps Considered in Analysis

TABLE 1-4

| # | Manufacturer | Model | Power [W] | Cost [$] |
|---|---|---|---|---|
| a | Topsflo | B10H-B12 | 11 | 18 |
| b | Topsflo | B04H | 20 | 19 |
| c | Topsflo | B10-B24 | 31 | 19 |
| d | Topsflo | C01-B24 | 48 | 45 |
| e | Singflo | 100GRO | 24 | 14 |
| f | Singflo | FL-2401 | 22 | 16 |
| g | Singflo | FL-2403 | 24 | 16 |
| h | Singflo | FL-2402A | 31 | 18 |
| i | Ronda | DP-150 | 40 | 54 |
| j | Ronda | DP-130 | 15 | 53 |
| k | Singflo | FL-31 | 36 | 33 |
| l | Singflo | FL-34 | 60 | 34 |
| m | Singflo | FL-44 | 134 | 35 |

REFERENCES

1. Bureau of Indian Standards, 2012, *IS 10500—Drinking Water Specification*.
2. Comprehensive Initiative on Technology Evaluation, 2015, "Household Water Filter Evaluation," pp. 1-31.
3. Wright, N. C., and Winter, A. G., 2014, "Justification for Community-Scale Photovoltaic-Powered Electrodialysis Desalination Systems for Inland Rural Villages in India," Desalination, 352, pp. 82-91.
4. Pilat, B., 1991, "A Case for Electrodialysis," Int. Water Irrig., 7, pp. 195-225.
5. Pilat, B., 2001, "Practice of Water Desalination by Electrodialysis," Desalination, 139(1-3), pp. 385-392.
6. Thampy, S., Desale, G. R., Shahi, V. K., Makwana, B. S., and Ghosh, P. K., 2011, "Development of Hybrid Electrodialysis-Reverse Osmosis Domestic Desalination Unit for High Recovery of Product Water," Desalination, 282 (1418), pp. 104-108.
7. Nayar, K. G., Sundararaman, P., Schacherl, J. D., O'Connor, C. L., Heath, M. L., Gabriel, M. O., Shah, S. R., Wright, N. C., and Winter V., A. G., 2016, "Feasibility Study of an Electrodialysis System for In-Home Water Desalination in Urban India," Dev. Eng., 2, pp. 38-46.
8. McGovern, R. K., Zubair, S. M., and Lienhard V, J. H., 2013, "Design and Optimization of Hybrid ED-RO Systems for the Treatment of Highly Saline Brines," *International Desalination Association World Congress*, Tianjin, China.
9. Lee, H. J., Sarfert, F., Strathmann, H., and Moon, S. H., 2002, "Designing of an Electrodialysis Desalination Plant," Desalination, 142(3), pp. 267-286.
10. Tanaka, Y., 2009, "A Computer Simulation of Batch Ion Exchange Membrane Electrodialysis for Desalination of Saline Water," Desalination, 249(3), pp. 1039-1047.
11. Uche, J., Círez, F., Bayod, A. A., and Martínez, A., 2013, "On-Grid and off-Grid Batch-ED (Electrodialysis) Process: Simulation and Experimental Tests," Energy, 57, pp. 44-54.
12. Banasiak, L. J., Kruttschnitt, T. W., and Schäfer, A. I., 2007, "Desalination Using Electrodialysis as a Function of Voltage and Salt Concentration," Desalination, 205(1-3), pp. 38-46.
13. Ortiz, J. M., Sotoca, J. a., Expósito, E., Gallud, F., García-García, V., Montiel, V., and Aldaz, a., 2005, "Brackish Water Desalination by Electrodialysis: Batch Recirculation Operation Modeling," J. Memb. Sci., 252 (1-2), pp. 65-75.

14. Pawlowski, S., Crespo, J. G., and Velizarov, S., 2014, "Pressure Drop in Reverse Electrodialysis: Experimental and Modeling Studies for Stacks with Variable Number of Cell Pairs," J. Memb. Sci., 462, pp. 96-111.
15. Pawlowski, S., Sistat, P., Crespo, J. G., and Velizarov, S., 2014, "Mass Transfer in Reverse Electrodialysis: Flow Entrance Effects and Diffusion Boundary Layer Thickness," J. Memb. Sci., 471, pp. 72-83.
16. Ponzio, F. N., Tamburini, A., Cipollina, A., Micale, G., and Ciofalo, M., 2017, "Experimental and Computational Investigation of Heat Transfer in Channels Filled by Woven Spacers," Int. J. Heat Mass Transf., 104, pp. 163-177.
17. Ortiz, J. M., Sotoca, J. a., Expósito, E., Gallud, F., García-García, V., Montiel, V., and Aldaz, A., 2005, "Brackish Water Desalination by Electrodialysis: Batch Recirculation Operation Modeling," J. Memb. Sci., 252 (1-2), pp. 65-75.
18. Kortüm, G., 1965, *Treatise on Electrochemistry*, Elsevier.
19. Johannink, M., Masilamani, K., Mhamdi, A., Roller, S., and Marquardt, W., 2015, "Predictive Pressure Drop Models for Membrane Channels with Non-Woven and Woven Spacers," Desalination, 376, pp. 41-54.
20. Baoji City Changsheng Titanium Corporation Ltd, 2014, *Titanium Mesh Electrode, ASTM B265-GR*1, Baoji City, China.
21. Hangzhou Iontech Environmental Technology Corporation Ltd, 2014, *IONSEP Ion Exchange Membrane*, Hangzhou, China.
22. Weihai Cortec International Trade Co. Ltd., 2015, "Plastic Spacer for RO Membrane Rolling."
23. KENT RO Systems Ltd, *Kent Supreme RO*, Noida 201309, Uttar Pradesh, India.
24. WHO/UNICEF Joint Monitoring Programme for Water Supply and Sanitation, 2012, *Progress on Drinking Water and Sanitation*.
25. McGovern, R. K., Zubair, S. M., and Lienhard V, J. H., 2014, "The Cost Effectiveness of Electrodialysis for Diverse Salinity Applications," Desalination, 348, pp. 57-65.
26. Lee, H.-J., Sarfert, F., Strathmann, H., and Moon, S.-H., 2002, "Designing of an Electrodialysis Desalination Plant," Desalination, 142(3), pp. 267-286.
27. Kim, Y., Walker, W. S., and Lawler, D. F., 2011, "Electrodialysis with Spacers: Effects of Variation and Correlation of Boundary Layer Thickness," Desalination, 274(1-3), pp. 54-63.
28. Min, J.-H., and Kim, H.-S., 2013, "Effect of Operating Conditions on the Treatment of Brackish Groundwater by Electrodialysis," Desalin. Water Treat., 51(January 2015), pp. 5132-5137.
29. McGovern, R. K., Zubair, S. M., and Lienhard V, J. H., 2014, "The Cost Effectiveness of Electrodialysis for Diverse Salinity Applications," Desalination, 348, pp. 57-65.

Example 2

Cost-Optimal Design of a Batch Electrodialysis System For Domestic Desalination of Brackish Groundwater This study presents the pareto-optimal design of a domestic point-of-use batch electrodialysis (ED) system. Specifically, the optimal geometry, flow-rates, and applied voltage for total cost minimization were explored for varying production rate (9-15 L/hr) and product concentration (100-300 mg/L) requirements, while feed concentration and recovery ratio were maintained at 2000 mg/L and 90%, respectively. Capital cost dominated over energetic cost; hence, optimal designs maximized current density. Capital cost was significantly higher for 100 mg/L systems, than 200 and 300 mg/L: $141 vs. $93 and $79, at 12±0.5 L/hr of production. Pumps were an important consideration, contributing up to 46% of the total cost. Large membrane length-to-width aspect ratios (3.5:1 to 6:1) and thin channels (0.30-0.33 mm) promoted high current densities, and 11-21 cm/s velocities optimized mass transfer against pressure drop. Optimal voltages were 0.9-1.3 V/cell-pair at 9 L/hr, and decreased at higher rates. Lastly, higher production was obtained primarily by increasing cell-pair area rather than number of cell-pairs (36-46). It was additionally observed that active area increased linearly with feed concentration (1500-2500 mg/L), while recovery (60-90%) minimally affected design. This work also suggests that voltage control during the batch process, and less expensive pumps, can further reduce cost.

In this work we investigated the pareto-optimal design of the proposed domestic batch ED system considering production rate, product water concentration, and cost using simulation. Prior design and optimization work has been performed for large-scale systems which are typically operated in a continuous architecture for industrial applications. For these systems, the pump cost and energy consumption are often neglected because they are low relative to cost of the ED stack and the energy consumed by desalination. Optimization at the domestic scale presents a different scenario where the pumps were found to strongly affect the cost, energy consumption, and performance of the ED system.

In addition, minimization of operating costs is often the most important consideration in industrial applications whereby the energy consumption cannot be neglected. In the present study, it was found that capital cost was the dominant factor affecting the affordability of the domestic system.

System Description

The batch ED system (FIG. 16) proposed by Nayar et al. and analyzed here consists of two primary flow circuits: one for the diluate, and the other for the concentrate. At the start of each batch process, both tanks hold feedwater at the same concentration. The relative volume of water in the diluate versus the concentrate circuits governs the recovery ratio of the process. During desalination, a voltage is applied and fluid is recirculated through the stack until the desired concentration is achieved in the diluate tank. The voltage and recirculation flowrates are held constant during this batch process, which is consistent with the work of others, both in simulation and practice, and would facilitate the simplest commercial product.

An additional circuit may be required for the electrode rinse stream; however, its design is not considered here because it is not expected to strongly affect desalination performance. Furthermore, for the hybrid ED-RO system investigated by Thampy et al., the RO reject was used to rinse the ED electrodes. It may therefore be possible to integrate the rinse with the concentrate circuit to eliminate a third pump.

Models

The models used in this analysis have been thoroughly described and validated by Wright et al. However, a brief overview of the theory relevant to this optimization problem is presented herein to facilitate the reader's understanding of the work. For a more detailed description of the mass transfer processes in electrodialysis, Ortiz et al., Strathmann, and Tanaka also are recommended. Following common practice, this work models desalination assuming a sodium-chloride solution. While production rates may vary for other ions, design insights obtained through this analysis are expected to remain relevant.

i. Mass Transfer

Figure 2:
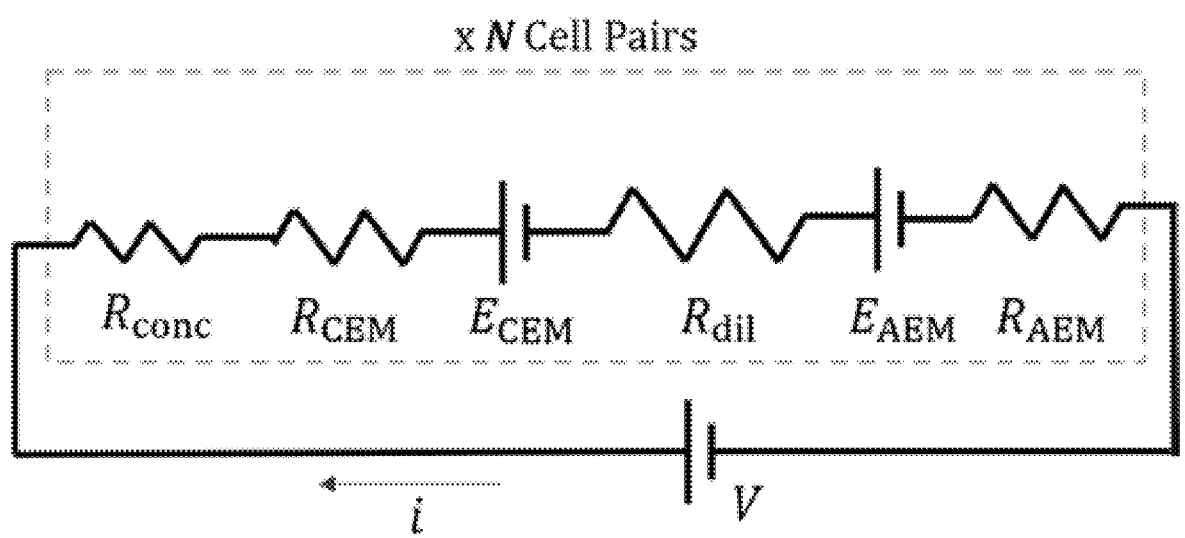
FIG. 2 is a schematic showing that in ED, an applied voltage V drives the movement of ions, represented by an equivalent current density i [A/m$^2$], through a series of diluate and concentrate channels separated by alternating cation (CEM) and anion (AEM) exchange membranes.

Mass transfer was modeled using a similar approach as Ortiz et al. The full details are spared here. Instead, an analogous circuit (FIG. 2) is used to facilitate a discussion surrounding the principal terms affecting ion movement from the diluate to the concentrate channels. In FIG. 2, ED is represented by an analogous circuit whereby ion transport is modeled by a current i due to the application of a voltage V over N cell-pairs. Exchange membranes (AEM and CEM) and channels (diluate and concentrate) are modeled using effective resistances R and back-potentials E.

An applied voltage V drives the movement of ions, represented by an equivalent current density i [A/m2], through a series of diluate and concentrate channels separated by alternating cation (CEM) and anion (AEM) exchange membranes with static resistances $R_{CEM}$ and $R_{AEM}$ [Ω-m2], respectively. Other ohmic resistance terms are associated with the diluate and concentrate streams ($R_{dil}$ and $R_{conc}$). They increase with solution resistivity $\rho_s$ [Ω-m] and channel height h [m] as per:

$$R = \rho_s h. \quad (1)$$

Figure 8:
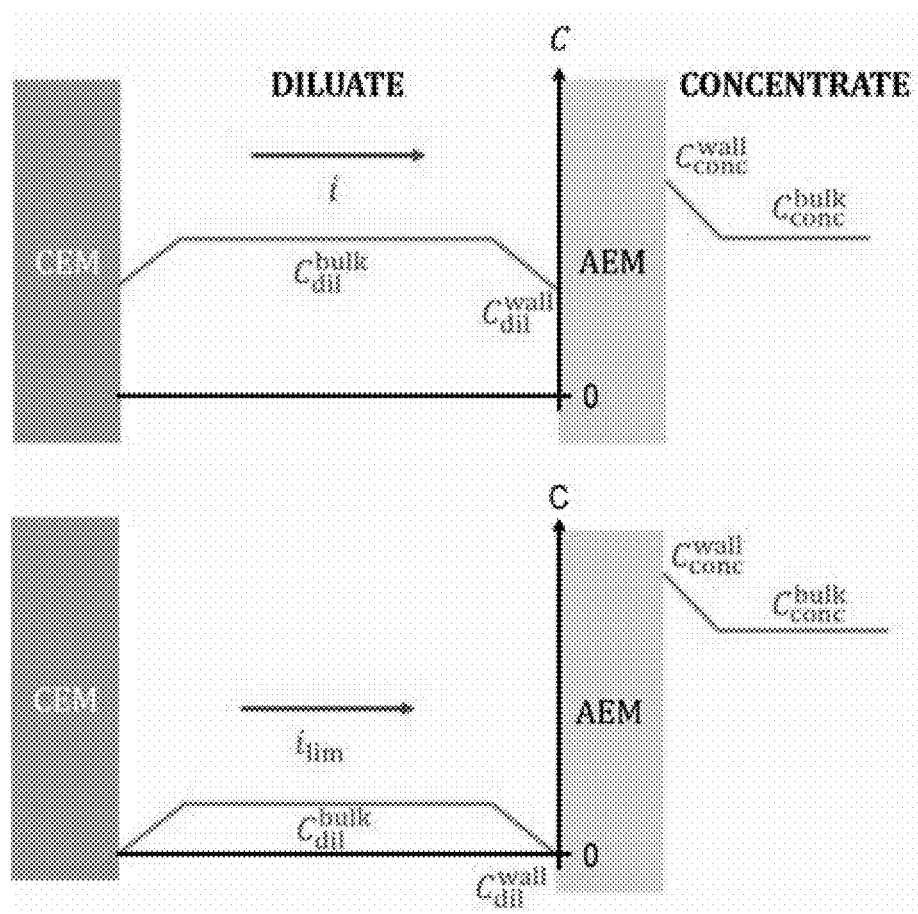
FIG. 8 shows ion transfer number differences in the bulk solution and membrane produces a polarization effect, hence the concentration at the wall $C^{wall}$ differs from the bulk $C^{bulk}$ under an applied current density i (top). The limiting current density $i_{lim}$ produces a zero Cwalldill, and is a function of the Cbulkdil (bottom).

Finally, a back-potential develops across the membranes due to salinity differences in alternating channels and concentration polarization (FIG. 8). These terms ($E_{CEM}$ and $E_{AEM}$) [V] are each modeled as:

$$E_{mem} = \frac{RT}{F} \ln\left(\frac{a_{conc}^{wall}}{a_{dil}^{wall}}\right), \quad (2)$$

assuming perfect ion-selective membranes, where R is the gas constant (J/mol-K), F is Faraday's constant [C/mol], T [K] is the temperature of the solution, and the activities $a_{dil}^{wall}$ and $a_{conc}^{wall}$ are related to the wall concentrations. FIG. 8 shows Ion transfer number differences in the bulk solution and membrane produces a polarization effect, hence the concentration at the wall $C^{wall}$ differs from the bulk $C^{bulk}$ under an applied current density i (top). The limiting current density $i_{lim}$ produces a zero $C_{dil}^{wall}$, and is a function of $C_{dil}^{bulk}$ (bottom).

Figure 4:
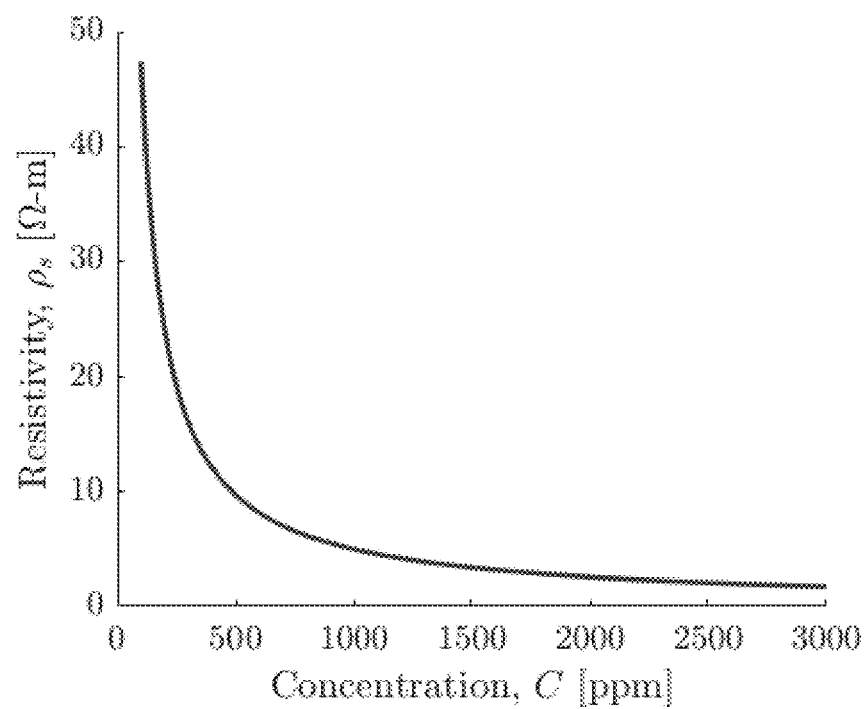
FIG. 4 is a graph showing the resistivity of a NaCl solution modeled using Falkenhagen equation.

The dominant impedance in brackish water desalination using ED is the resistance of the diluate channels because the resistivity increases sharply at low concentrations (FIG. 4). In addition, the high membrane potential and low limiting current were expected to drastically increase the cost of designs targeted at achieving the lowest product water concentrations.

ii. Limiting Current Density

A concentration boundary layer evolves at the interface between the fluid in the channels and the membranes when a voltage is applied. As a result, the maximum rate of ion transport is bounded by a current density which produces a zero ion concentration at the membrane surface in the diluate channel (FIG. 8). This limiting current density $i_{lim}$ [A/m²] which plays an important role in the design of an ED stack, is estimated using:

$$i_{lim} = \frac{c_{dil}^{bulk} zFk}{T_{mem} - t}, \quad (3)$$

where z is the valence of the ion, $T_{mem}$ is the transport number of the ion in the membrane, and t is the transport number of the ion in the bulk solution where its concentration is $C_{dil}^{bulk}$. The boundary-layer mass transfer coefficient k [m/s] is dependent on hydrodynamic factors such as the flow-velocity, which in-turn is affected by the geometry of the ED stack and the choice of pump.

iii. Coupling Mass Transfer to Flow

By definition, the Sherwood Number Sh is related to k by $$k = \frac{ShD}{d_h}. \quad (4)$$

D is the diffusion coefficient of the solution, and the hydraulic diameter $d_h$ defined by Pawlowski et al. is:

$$d_h = \frac{4\varepsilon}{2/h + (1-\varepsilon)(8/h+)}. \quad (8)$$

The void fraction ε is the fraction of the channel that is not occupied by the flow-spacer. The mass transfer is then correlated to the flow properties via:

$$Sh = Re_d^{0.5} Sc^{0.33} \quad (6)$$

where the Schmidt Number Sc is a material-dependent, non-dimensional quantity, and the Reynolds Number $Re_d$ which characterizes the flow is defined as:

$$Re_d = \frac{\rho u_{ch} d_h}{\mu}, \quad (7)$$

where ρ [kg/m3] is the density of the solution, μ [Pa-s] is the viscosity of the solution, and the velocity in the spacer-filled channel $u_{ch}$ is calculated using Eqn 14.

From Eqns. 3-7, it is evident that a high linear flow velocity in the channels will produce an increase in the mass transfer coefficient and a corresponding increase in the limiting current density. Using optimization, we sought to balance these benefits against costs associated with larger pressure drops.

iv. Pressure Drop

A model derived from the computational fluid dynamics (CFD) simulations conducted by Ponzio et al. was used to predict the pressure drop for each ED system permutation. This was the only model, among those evaluated by Wright et al., that captured the nonlinear variation of friction factor at high velocities. Here it is sufficient to recognize that the dominant source of pressure loss is the flow through the channels, modeled as $$\Delta p = C_p \frac{\rho f L u_v^2}{4h}, \quad (8)$$

where $C_p = 3$ is a fitting coefficient to accommodate the difference between Ponzio et al.'s predictions, and the pressure drop measured on a bench-scale stack of similar size and proportions to the designs generated for the present application. L [cm] is the length of the channel's active area, and the void channel (without spacer) velocity $u_v$ [cm/s] is related to the volumetric flow in each circuit Q [L/hr] by $$u_v = \frac{Q}{WhN}, \quad (9)$$

where W [cm] is the width of the active area and N is the number of cell-pairs. Then, using an alternative Reynolds Number Re definition based on the void channel velocity, $$Re = 2\frac{\rho u_v h}{\mu}, \quad (10)$$

the friction factor f is approximated from the results of Ponzio et al. using the correlations f=1400/Re for Re<61, and f=104.5/Re$^{0.37}$ for Re≥61. (11)

v. Flow Spacer

In addition to inducing a greater pressure drop, a thinner spacer will also provide a lower area for ion transport because its filaments tend to be more closely woven. This effect is accommodated by adjusting the area by a porosity value η or 'shadow factor', calculated as $$\eta = \frac{(l_f - d_f)^2}{(l_f)^2} \quad (12)$$

assuming an orthogonal arrangement of filaments (FIG. 9). The spacing $l_f$ [mm] and the diameter $d_f$ [mm] of filaments are related to the height of each channel (spacer thickness) by $$l_f = 1.5h, \text{ and} \quad (13)$$

$$d_f = \frac{h}{2cf}$$

using a compaction factor cf of 0.946. A conservative factor of 1.5 in Eqn. 13 was applied after surveying the product offerings from manufacturers of woven meshes. FIG. 9 is a detail view of woven mesh which is often used as a spacer and turbulence promoter in the flow channels.

Due to the presence of a flow-spacer, the actual linear flow velocity $u_{ch}$ in the spacer is approximated from the void channel flow velocity (Eqn. 9) using $$u_{ch} = \frac{u_v}{\varepsilon} \quad (14)$$

where the void fraction ε is defined as $$\varepsilon = 1 - \frac{\pi d_f^2}{2l_f h}. \quad (15)$$

We acknowledge that accurate prediction of the pressure drop and mass transfer requires consideration of several other variables including the spacer orientation, spacing and angle between filaments, and whether they are woven or not. This level of detail was not deemed necessary for this analysis, but several studies have aimed to characterize these relationships. Their results could be implemented for more detailed design deliberation in the future.

Optimization

The optimization problem of identifying the geometry and operating parameters which provided the lowest-cost system is presented in the following section. In the primary investigation described in Sections 4.1-4.5, the feed concentration and recovery ratio are maintained at 2000 mg/L and 90%, respectively. The sensitivity to these parameters is then explored separately in a second problem formulation, which is described thereafter in Section 4.6.

i. Problem Formulation

Using standard notation, the multi-objective optimization problem is denoted as:

$$\begin{aligned} \min_x \quad & J(x, p) \\ \text{s.t.} \quad & g(x, p) \leq 0 \\ & h(x, p) = 0 \\ & x_{lb} \leq x \leq x_{ub}, \end{aligned} \quad (16)$$

where x is the design vector to be optimized, p is the vector of constant model parameters, J(x) is the vector of objective functions, and g(x) and h(x) are the inequality and equality constraints respectively. In this study, the design vector is bounded from below and above by $x_{lb}$ and $x_{ub}$, respectively.

ii. Variables and Bounds

Each design permutation is defined by a design vector x consisting of the six individual variables listed in the Table below and illustrated in FIG. 6. The bounds for dimensional variables (L, W, and N) ensure that the proposed system could be packaged within the same envelope as existing domestic RO systems.

Channel heights (h) could vary within the size range of commonly available flow spacers. While thinner mesh thicknesses are available, they are expected to produce pressures (>2 atm) that exceed the capacity of commercially available small-scale pumps in the desired range of flow-rates.

Following the industry-standard operating procedure, equal flow-rates (Q) were prescribed for the diluate and concentrate circuits so that the effects of transmembrane pressure differences could be neglected in this analysis. Then, for equal diluate and concentrate channel dimensions, identical pumps could be used for both streams.

Pumps were not treated as variables. Instead, a pressure drop was calculated for each design iteration. Then, the pump (among the selection provided in Appendix A) that most closely provided the desired flow-rate served as a reference for power and cost estimation.

TABLE 2-1

Design Variables and Respective Bounds

| Variable | Symbol | Bounds |
|---|---|---|
| Length of Active Area | L | 2-30 cm |
| Width of Active Area | W | 2-20 cm |
| Number of Cell Pairs | N | 10-50 |
| Channel Height | h | 0.30-1.00 mm |
| Flow Rate | Q | 10-300 L/hr |
| Voltage | V | 5-100 V |

All variables, including the number of cell-pairs, were treated as continuous due to the limitations of the algorithm implementation (see Section below). In practice, the number of cell-pairs would be rounded up to the closest integer from the value recommended by the optimizer.

iii. Objective Function

In this multi-objective optimization problem, the first objective in J=[$J_1$ $J_2$] was to minimize the total cost of ownership for the proposed domestic ED system. Therefore, $J_1$ was defined as the total cost TC of the system, given by:

$$J_1 = TC = CC + OC \tag{17}$$

where CC is the capital cost, and OC is the operating cost. While the quoted unit costs of materials assumed in this analysis likely included a profit-margin for the suppliers, the final vendor's mark-up on manufacturing cost was not considered because it is affected by commercial factors that may vary one market to another.

Since ED systems are not widely used for domestic desalination, the fouling characteristics and associated maintenance costs are not well-understood. For this reason, the operating cost considered here is only a function of the energy consumption, and given by $$OC = \mathbb{V} E_s r_E \tag{18}$$

where $\mathbb{V}$ [L] is the total volume desalinated water produced over the assumed product lifetime of 7 years, $E_s$ [J/L] is the specific energy consumption calculated for each design permutation, and the specific cost of electrical energy $r_E$ is approximated at \$0.10/kWh.

The capital cost is calculated using the rates provided in Table 2-2 below. These rates were obtained from wholesale suppliers in order to best estimate the cost at large-scale production.

TABLE 2-2

Unit Cost of ED Stack Components

| Component | Cost | Reference |
|---|---|---|
| Electrodes | $2000/m² | [33] |
| Membranes | $40/m² | [34] |
| Spacers | $3/m² | [35] |

Figures 13A, 13B:
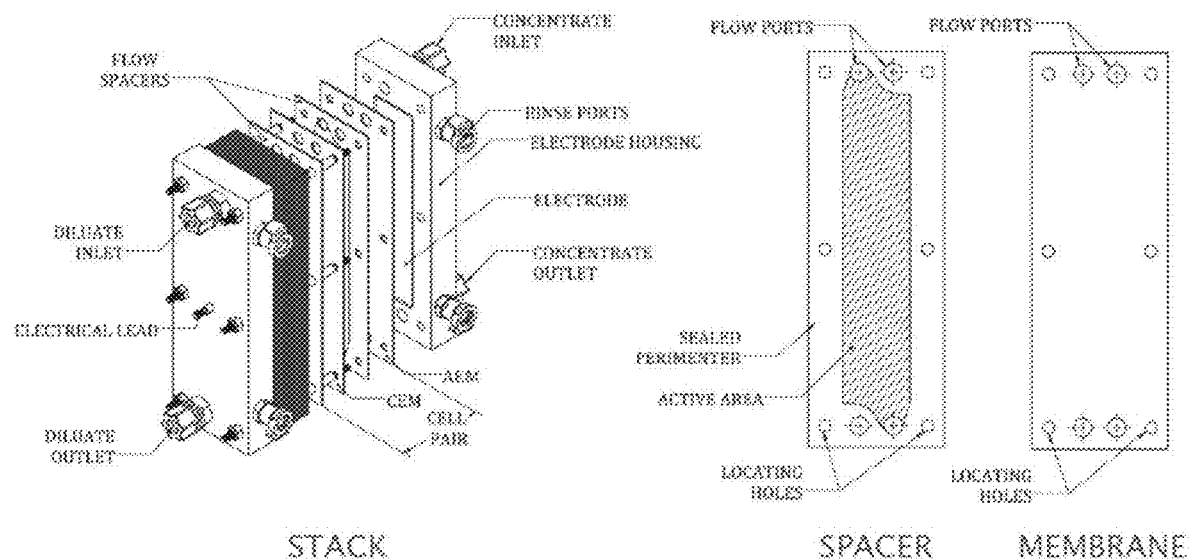
FIGS. 13A and 13B are schematics showing the design of a prototype.
Figure 14:
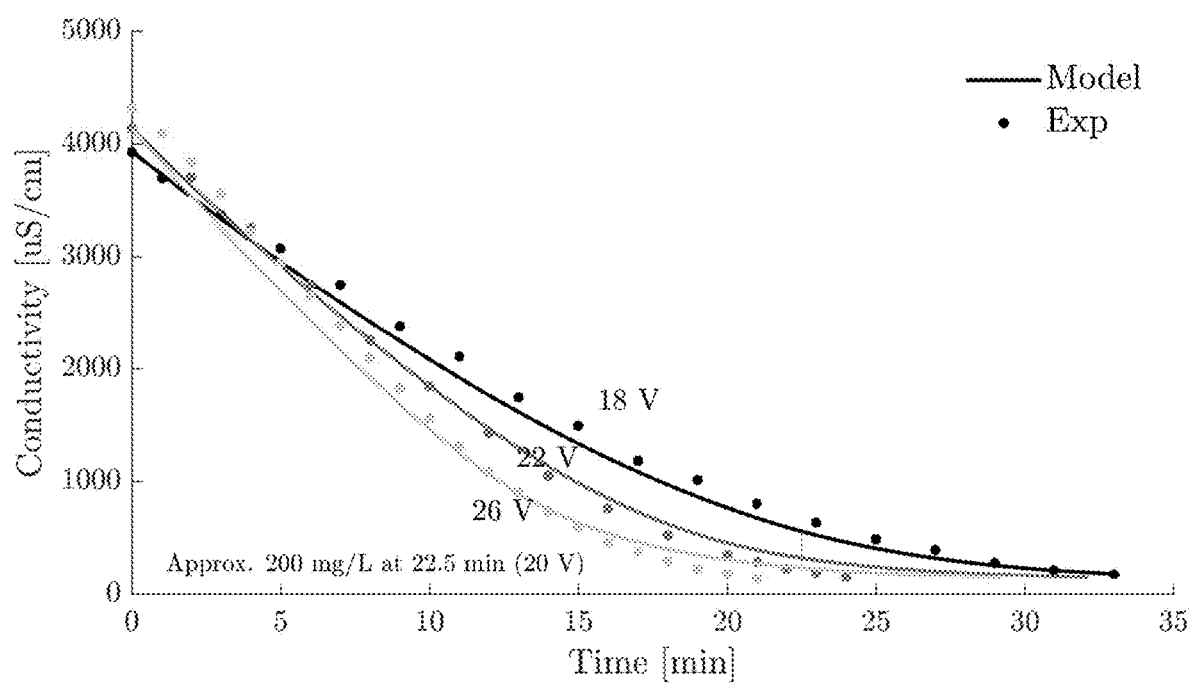
FIG. 14 is a graph showing conductivity (uS/cm) as a function of time (min) for a prototype (model and experiment). As shown in the figure, the applied voltage was 18 V and 1.8 L was treated at 86% recovery from 2000 ppm to 100 ppm NaCl. Model-predicted diluate conductivity profile was compared against the measured diluate conductivity through time, obtained with the prototype and by varying applied voltages. At the design voltage of 20 V, the concentration of 200 mg/L would be achieved in approximately 22.5 minutes.
Figure 15:
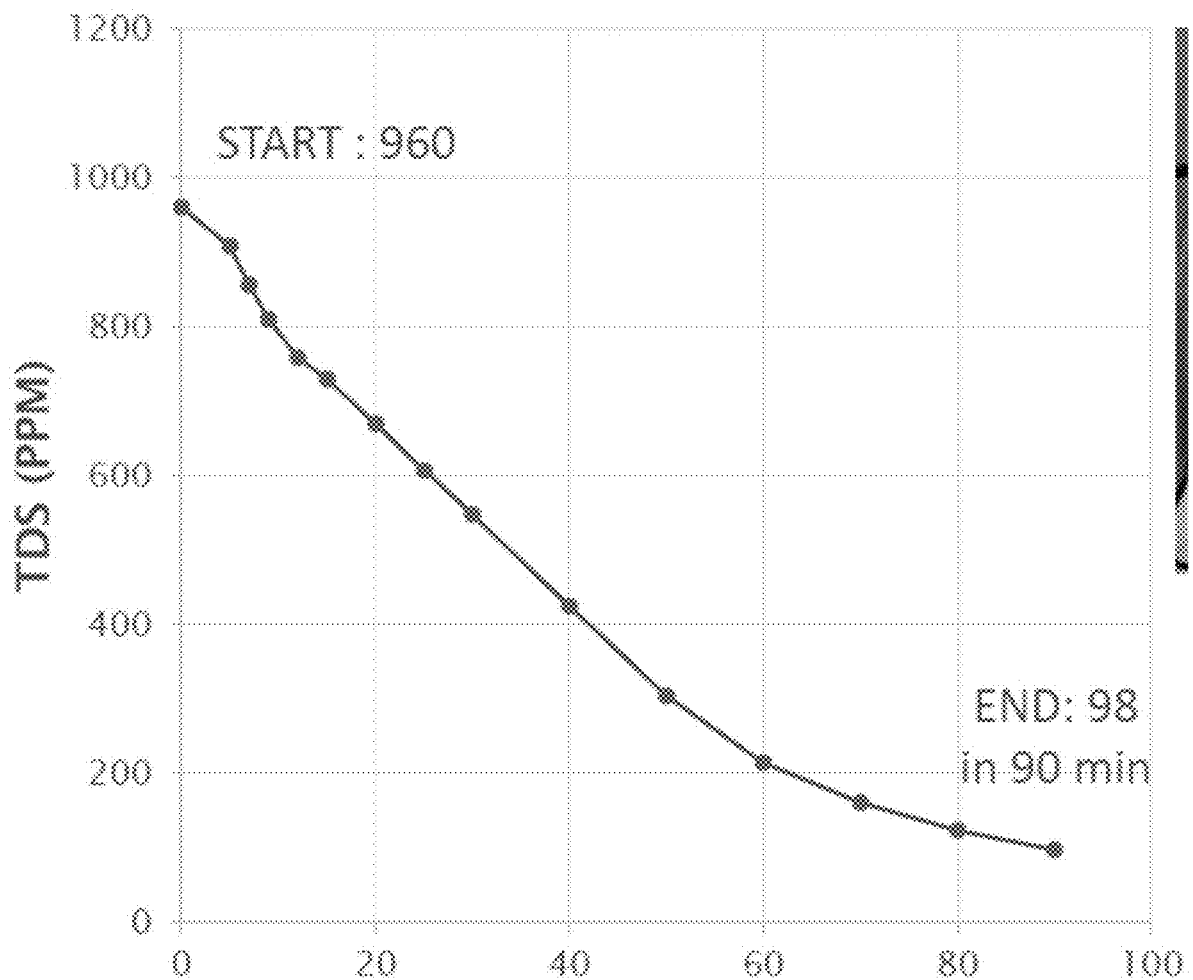
FIG. 15 is a graph of Total Dissolved Solids (TDS) (ppm) versus time (minutes) during desalination of 7.7 L of untreated bore well water in Bangalore, India using a prototype system. The prototype recovery was 89% of the feed water, at a production rate of 5.9 L/hr (LPH). The TDS of the diluate, treated by the prototype, was measured against time.

We intended to capture the minimum active area that satisfied the target production rate and concentration performance. Therefore, the material forming the sealed perimeter (FIG. 13) which isolates the diluate and concentrate streams and prevents leakage, was not factored into the cost because the thickness of the seal is affected by other design and manufacturing considerations. For example, placing the tie-rods externally to the membranes may allow a thinner seal to be used.

The second objective $J_2$ is to maximize the rate of desalinated water production $Q_p$ [L/hr], calculated from:

$$J_2 = -Q_p = -\frac{V_b r}{t_b}, \tag{19}$$

where $V_b$ [L] is the volume in the diluate tank for each batch, r is the recovery ratio, and $t_b$ [hr] is the time to process each batch. The negative sign reflects the desire to maximize production rate.

For most simulations, the product water concentration was treated as a fixed parameter for calculating production rates of design permutations. However, some additional runs were also performed with the product concentration treated as a third objective where:

$$J_3 = C_{prod}, \tag{20}$$

in order to draw generalizations regarding the effect of product water concentration $C_{prod}$ [mg/L] on cost-optimal design.

iv. Constraints

During the batch simulation, the duration $t_{lim}$ over which the applied current density exceeded 90% (safety factor) of the instantaneous limiting current density was tracked. To ensure that designs operated under the limiting current density, the first inequality constraint in g=[$g_1$ $g_2$ $g_3$]≤0 to be imposed is:

$$g_1 = \frac{t_{lim}}{t_b} - 0.02, \tag{21}$$

implying that the safety factor-adjusted limiting current density could not be exceeded for more than 2% of the batch period.

Existing domestic RO products have set expectations for the production rate of desalinated water. As such, we were interested in exploring ED system designs that provided similar production rates ($Q_p$) in the range of 9-15 L/hr. Therefore, $g_2 = 9$ L/hr$-Q_p$ and $$g_3 = Q_p - 15 \text{ L/hr.} \tag{22}$$

Lastly, no equality constraints h were required in this formulation, making the problem easier to solve numerically.

v. Parameters

Parameters pertaining to the model are provided in Wright et al. Others corresponding to the cost of components and energy have been provided in Table above. In Table below, we provide the remaining parameters relevant to simulation.

TABLE 2-3

Simulation Parameters for Primary Investigation

| Parameter | Value |
|---|---|
| Feed Concentration, $C_{feed}$ | 2000 mg/L |
| Product Concentration, $C_{prod}$ | 100-300 mg/L |
| Recovery Ratio, r | 90% |
| Diluate Tank Volume, $\mathbb{V}_{dil}$ | 3.6 L |
| Concentrate Tank Volume, $\mathbb{V}_{conc}$ | 0.4 L |
| Total Volume Produced, $\mathbb{V}$ | 38 325 L |

The relative sizes of the diluate and concentrate tanks were selected to yield a recovery ratio of 90%, while the actual volumes allowed them to be packaged within the envelope of existing RO systems. The recovery ratio is maintained at 90% in the primary investigation because the purpose of the proposed device is to conserve water; however, the sensitivity to varying the recovery ratio between 60-90% is also independently explored (Section below).

Solution resistivity was demonstrated to be highly sensitive to concentration changes below approximately 500 mg/L (FIG. 4); therefore, it was anticipated that the design of an ED system would be more affected by the product water requirements than the feedwater concentration. As such, the feed concentration is held fixed at 2000 mg/L, based on the salinity of Indian groundwater, while the product concentration target is varied from 100 to 300 mg/L in the primary investigation. The latter range not only satisfies the specifications for water considered suitable for drinking according to the Bureau of Indian Standards, but also conforms to the palette of those who are accustomed to drinking RO-filtered water. We then explore the sensitivity to the feedwater concentration separately while maintaining the product concentration at the mid-range value of 200 mg/L.

$\mathbb{V}$ is calculated over the assumed product ownership lifetime of seven years, based on existing domestic RO device usage, at an average daily drinking water consumption rate of 3 L/day per person for a household of five members.

vi. Simulation and Optimizer

The block diagram in FIG. 33 approximates the optimization process, which was implemented in MATLAB. Conventional gradient-based algorithms could not be applied with this formulation because the discrete selection of pumps caused the solution to converge at local minima. Instead, the problem described above was solved using a multi-objective genetic algorithm, specifically the modified NSGA-II algorithm implementation in MATLAB. The solution is a set of non-dominated Pareto optimal solutions with respect to the problem objective functions. The difference between the original NSGA-II and the modified version is that the modified version adds an extra tuning parameter, Pareto Fraction(PF$\in$ (0,1)), to control the number of elite members in each population that progress to the next generation. By testing different PFs, we determined that values between 0.5 to 0.75 provided non-dominated solutions without sacrificing convergence speed.

Results and Discussion

In this section, cost-optimal designs obtained for varying production rate and product concentration requirements are first discussed at a fixed feed concentration and recovery ratio of 2000 mg/L and 90%, respectively.

i. Capital Cost vs Total Cost

Figure 5A:
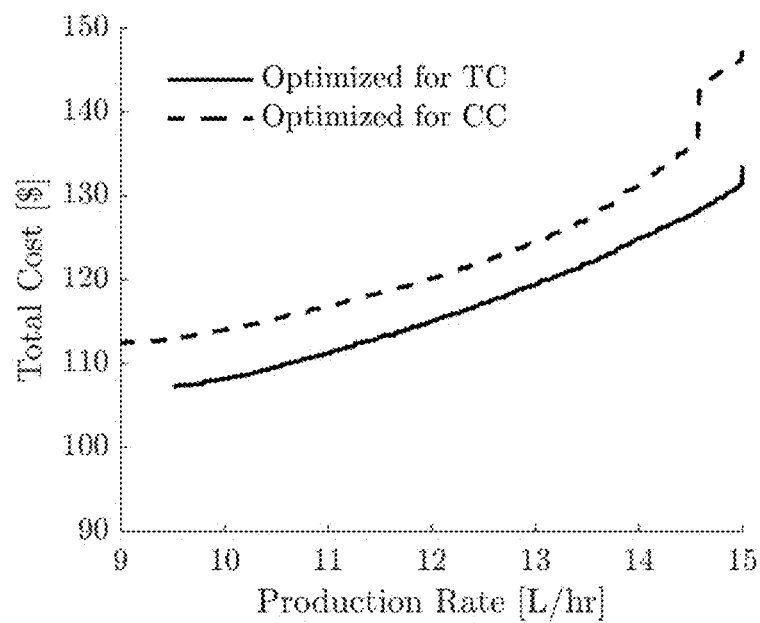
FIG. 5A is a graph of total cost (U.S. dollars) as a function of production rate (L/hr) optimized for designs optimized for minimum total cost (TC) or minimum capital cost (CC).

Optimal designs that minimized total cost were similar in cost and design to those that minimized capital cost. For example, FIG. 5A compares the total cost for designs which produce 200 mg/L product water at varying production rates, optimized either for minimum total cost or for minimum capital cost. The former objective function did indeed provide a lower total cost compared to the latter, but the difference of ~$5 was negligible. FIG. 5 shows that designs optimized for minimum capital cost (CC) had similar total costs to those optimized for minimum total cost (TC) for varying production rates at 200 mg/L product concentration.

Figure 5B:
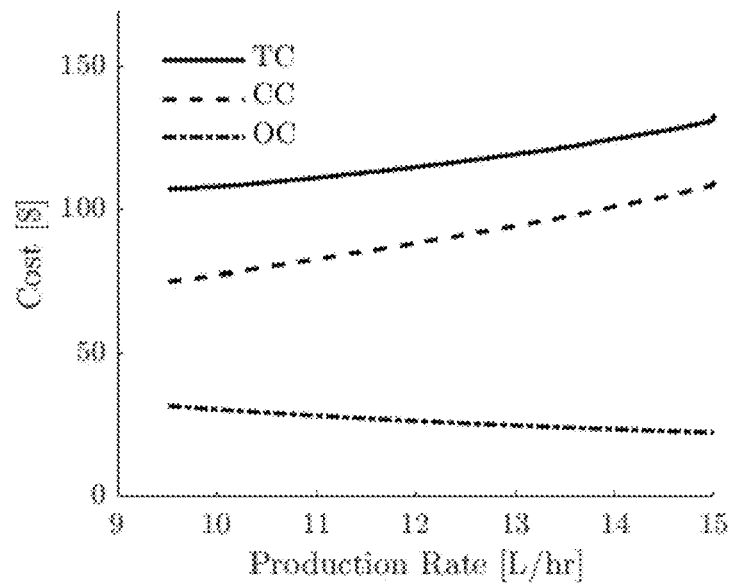
FIG. 5B is a graph of cost (U.S. dollars) as a function of production rate (L/hr) for total cost, capital cost or operational cost (OC).

This result is explained by comparing the contributions from the operating and the capital cost (FIG. 5B). The operating cost is significantly lower than the capital cost because the cost of electrical energy is small compared to equipment costs, and the system is utilized infrequently. In domestic applications, the system will only be used for 1-2 hours per day depending on the drinking water requirements of the household.

The design of an affordable domestic ED system is therefore concerned with capital cost minimization. The reader is reminded that this result was obtained even without the inclusion of a mark-up on the capital cost of the system.

ii. Current Density

The increasing capital cost, and decreasing operating cost, with production rate (FIG. 5) are explained by examining the current density during the operation of the cost-optimized designs.

a. Maximization of Current Density

It was established in the section above that in brackish water electrodialysis, the dominant resistance is associated with diluate channels. Since this term is ohmic in nature, the power consumption at a fixed ion removal rate is expected to increase approximately with $i^2$, where i is the current density. Subsequently, to the first order:

$$OC \alpha\ i^2. \tag{23}$$

However, the required cross-sectional area at the same ion removal rate decreases as:

$$CC \alpha\ 1/i. \tag{24}$$

Since it has been established that the capital cost—which scales primarily with active area (Table 2-2 above)—is the dominant term in the total cost, optimal domestic ED designs are therefore expected to maximize current density. To verify this hypothesis, we examined the ratio of the applied current density to the limiting current density (adjusted by the safety factor $n_s$=0.9) when the desired product water concentration was achieved (FIG. 10). This ratio approaches 1 for all optimal designs over the range of product water concentrations (100-300 mg/L), thereby confirming the aforementioned expectation. FIG. 10 shows the ratio of instantaneous applied current density i to limiting current density $i_{lim}$ at the end of the batch process approaches 1 for all optimum designs targeted at varying product concentrations (100-300 mg/L) and production rates (9-15 L/hr).

These results agree with McGovern et al. and Chehayeb et al.'s findings that maximization of current density is cost-optimal for brackish water ED desalination at high equipment-to-energy cost ratios.

b. Limiting Current Density Implications

Maximizing the current density is cost-optimal, but there is an upper bound based on the instantaneous diluate concentration and the flow properties (Section 3.2). FIG. 10 demonstrates that the applied current density approaches this limit at the end of each batch; however, it is also useful to examine the full duration.

Figure 11:
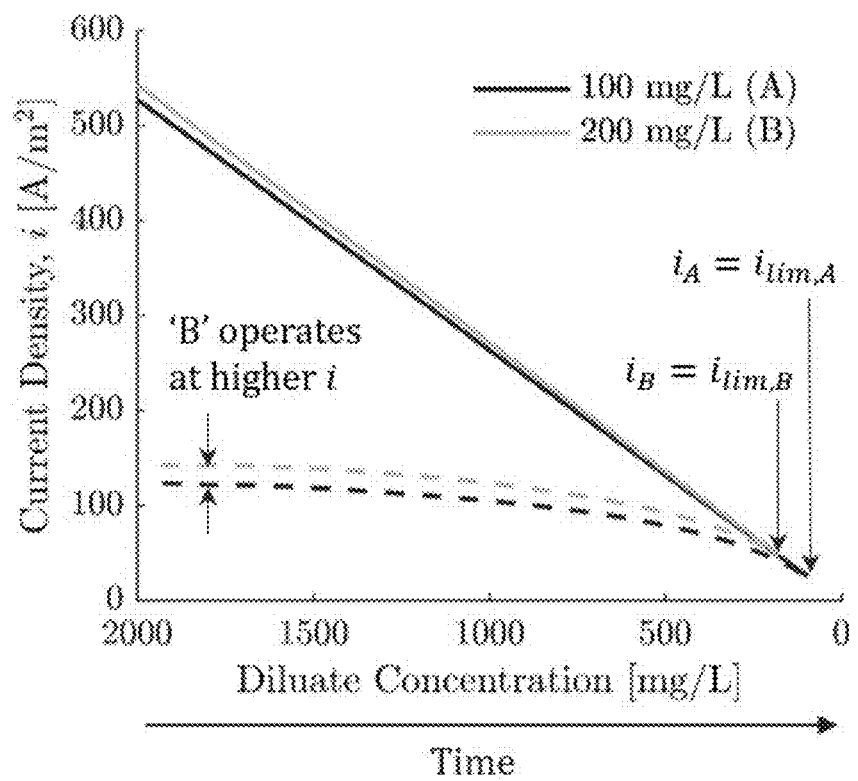
FIG. 11 shows the simulated applied (dashed lines) and limiting (solid) current densities through desalination for designs optimized to produce 200 and 100 mg/L product water from 2000 mg/L feed water at 10 L/hr.

For example, the optimal current trajectories during desalination for producing 100 mg/L and 200 mg/L product water at a rate of 10 L/hr are compared in FIG. 11. Since the limiting current density trajectories (solid lines) are similar and mostly dependent on the instantaneous diluate concentration, it is inferred that differences in flow characteristics play a small role here. These upper bounds are only approached at the end of the batch, but application of a constant voltage constrains the full applied current trajectory. Therefore, as is evident in FIG. 11, relaxation of the product water requirements allows designs to operate at higher current densities for the full batch process.

Figure 20:
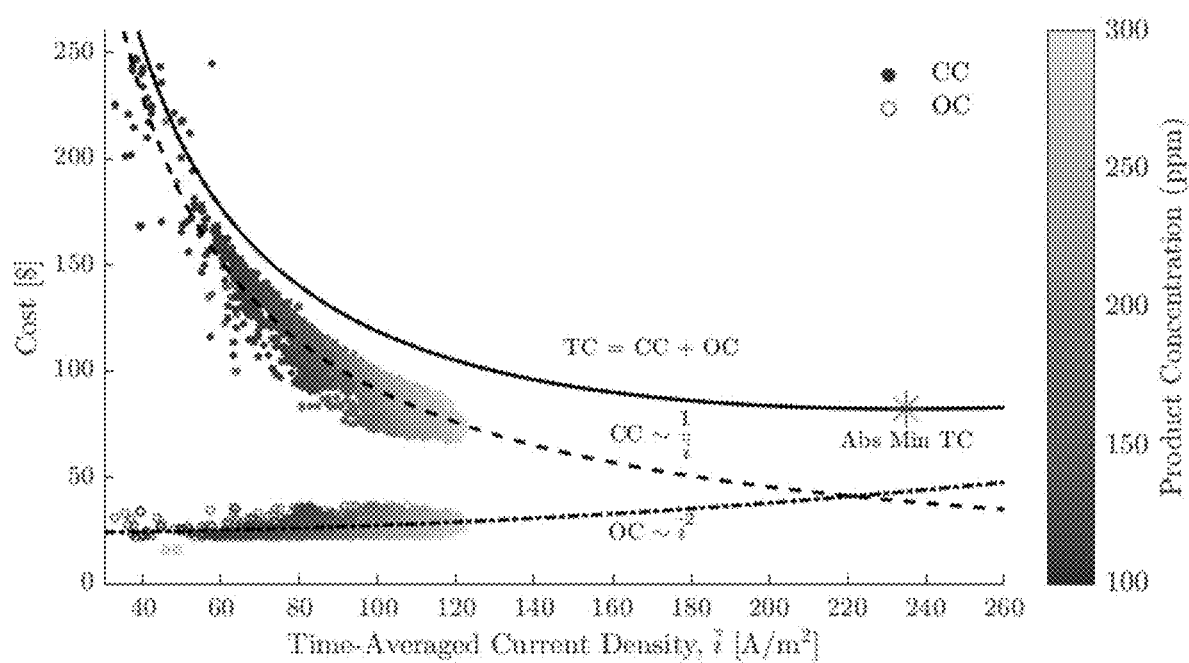
FIG. 20 is a graph showing the cost (in U.S. dollars) as a function of time averaged current density for all conventional constant voltage batch ED systems optimized to produce between 100-300 mg/L product from 2000 mg/L feed, at 90% recovery. Increasing current density (i) will decrease membrane area, reducing capital cost. To increase current density requires tolerating higher product concentration with conventional voltage operation.

To further understand the implications of this behavior on cost, we examined the time-averaged applied current densities $\bar{i}$ during the operation of optimal designs (FIG. 20). The following insights were obtained:

With the exception of a few outliers, optimized designs agree with the approximate scaling relationships for the capital cost CC and operating cost OC presented in Eqns. 23 and 24. The y-intercept for the OC trend-line approximates the energetic cost of pumping.

By extrapolating the CC and OC trend-lines beyond the optimization data, it is speculated that a time-averaged current density $\bar{i}$ of approximately 235 A/m$^2$ will yield an absolute minimum total cost, which in turn is a function of the specific material and energy costs.

Despite the use of optimization, designs targeted at the product concentrations of 100-300 mg/L, at the production rates of interest, lie in the capital cost-dominated region. Hence, the absolute minimum cost could be achieved by relaxing the product water concentration requirements.

Due to the upper bound on $\bar{i}$ imposed by $i_{lim}$, designs targeted at lower concentrations $C_{prod}$ are further from the absolute minimum cost. Therefore, relaxing the product water requirements allows operation at higher current densities, hence lowering total cost.

Scatter in the data about the trend-lines represents varying production rate requirements. The gradient indicates that increasing the production rate requirements $Q_p$ from 9 to 15 L/hr also forces operation at lower $\bar{i}$, albeit to a lesser extent than decreasing the product water concentration requirement from 300 to 100 mg/L. As a result, achieving higher production rates also requires an increase in cell-pair area, thereby increasing capital cost. This increase in capital cost exceeds the decrease in operating cost obtained by operating at a lower current density; therefore, total cost increases with production rate.

The ability to produce low product water concentrations that are comparable to RO (100 mg/L) comes at a significant economic cost. It may be worthwhile to investigate if users would accept product water at higher salinities of 200 to 300 mg/L, which is still suitable for drinking but decreases the system cost significantly.

In order to further improve affordability of the proposed batch domestic ED system, the two options are to decrease the unit cost of the components (shifting the CC line down), or to find methods for operating at higher time-averaged current densities (shifting points to the right).

By analyzing FIGS. 11 and 20, we discovered that $\bar{i}$ can be increased with time-varying voltage regulation based on measured conductivity of the diluate stream. A high voltage can be applied at the start of the batch process and be gradually decreased to maintain an instantaneous current density that is just under the limiting current density (see FIG. 11). Since this strategy has the potential to provide significant cost reductions, it is an avenue of ongoing work for our team.

iii. Optimal Design Characterization

In order to minimize capital and total cost of a domestic ED system, it has been shown that the optimal strategy is to maximize the applied current density. We explored how this strategy affected the choice of variable values in order to provide design guidance.

a. Linear Flow Velocity, $u_{ch}$

The linear velocity is reported instead of the volumetric flow rate because it is more directly applicable to design, and comparable between different scales of production. Optimal designs operated at 18-21 cm/s for 300 mg/L, 15-18 cm/s for 200 mg/L, and 11-16 cm/s for 100 mg/L product water (FIG. 6A). These results exceed typical values used by others in both experimental and theoretical studies, including Lee et al. (7.5 cm/s), Tanaka (10 cm/s), and Kim et al. (4.24 cm/s). However, they agree well with Chehayeb et al. who calculated an optimum velocity of 16-18 cm/s for ED desalination from 3000 mg/L to 350 mg/L in a continuous system. We postulate that the suggested high linear velocities are not implemented in practice, because the resulting pressures may be difficult to manage for larger systems. Furthermore, a lower velocity may be desirable for continuous systems in order to increase the residence time of the solution and provide greater concentration reduction. As a result, little work has been performed to understand the effect of high flow velocities on desalination performance, fouling behaviour, and membrane durability. This work suggests that the development of domestic ED systems may benefit from characterization of these effects.

The decrease in the linear flow velocity with the production rate is explained by the increase in the cell-pair area. The volume flow-rate per cell pair remained approximately constant at 5.1±0.1 L/hr for the 200/300 mg/L and 6.0±0.2 L/hr for 100 mg/L, utilizing the maximum capacity of the small-scale pumps used in this investigation. Then, as the width of the active area grew to satisfy higher production rates, the linear velocity decreased.

b. Voltage, V

In order to avoid exceeding the limiting current density at the end of the batch, the applied voltage was smaller for designs that targeted lower product water concentrations (FIG. 6B). Furthermore, the decrease in the applied voltage observed at higher production rates is explained by the decreasing linear flow velocities. Optimal voltage values, ranging between 0.7-1.3 V per cell-pair, agreed with other studies and manufacturer recommendations for concentration ranges similar to those investigated here.

c. Cell-Pair Area, LW

Larger cell-pair area is required to provide the required salt removal rate while compensating for the decrease in the applied voltage (and associated current) at lower concentrations and higher production rates (FIG. 6C). Both length and width increased with production rate, but the former increased at a faster rate. Inspection of the aspect ratio, defined as L/W (FIG. 6D), indicates that leaner designs are better-performing because they supply a higher linear flow velocity for a given cell-pair area, thereby facilitating operation at higher current densities, provided that the pumps can sustain the resulting pressure drop. For the 100 mg/L case, a decrease in the aspect ratio was observed after 12 L/hr because the length was prevented from exceeding the upper bound of 30 cm.

Recall that the membrane and spacer material contribution to the seal is not factored into the cost. In practice, implementation of a thick seal will decrease the optimum L/W aspect ratio.

d. Capital Cost, CC

Capital cost of optimal systems increased nonlinearly with decreasing product water concentration. The difference between 200 mg/L and 100 mg/L systems was greater than from 300 mg/L to 200 mg/L (FIG. 6F). The sharp increase in the diluate resistance paired with the decrease in the limiting current density with decreasing concentration explains this result. Thus, ED stack architectures targeted at low product concentrations are forced to operate at low current densities applied over larger surface areas to maintain the desired rate of salt removal. These results agree with other work that has found ED to be expensive process for producing ultra-pure water [42,45].

e. Number of Cell-Pairs, N

Implementing more cell-pairs to achieve a higher production rate is not necessarily cost-optimal at the domestic scale (FIG. 6E). Instead, it was found that the optimal number of cell-pairs was determined by the capacity of the selected pumps and the required linear flow velocity in the channels.

f. Channel Heights, h

Smaller intermembrane channel heights decrease the electrical resistance of the channels (Eqn. 1) and increase the mass transfer coefficient (Eqns. 4-6]. Optimum heights approached the lower bound of the variable, ranging between 0.30-0.33 mm for the full spectrum of production rates and concentrations analyzed in this study, and agrees with the channel height minimization observed by Chehayeb et al. in their optimization study, which also acknowledges the important role of pumping in brackish water ED. This result signifies that the enhanced mass transport provided by thin channels justified the cost of greater pressure drop over the design space and range of operation considered for this application.

iv. Cost & Energy Breakdown

Figure 7A:
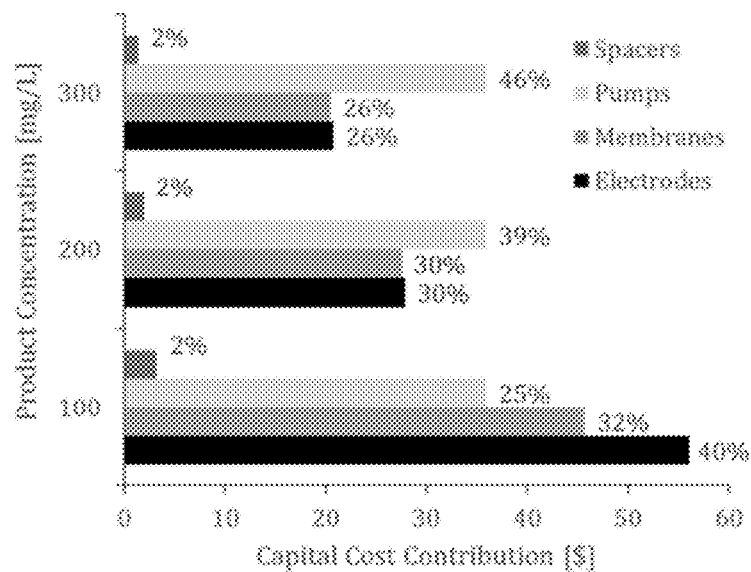
FIG. 7A is a graph showing estimated component-level break down of capital cost for a household ED desalination system for all optimal household ED systems producing 12±0.5 L/hr at different product concentrations.

FIG. 7A distributes the capital cost of optimal systems providing between 11.5 and 12.5 L/hr of production into average contributions from components. Pumps accounted for a significant fraction, particularly at 200 and 300 mg/L. The remainder was balanced between electrodes and membranes.

Comparison across the concentrations indicates that there is a significant economic penalty for producing water at the lowest salinity of 100 mg/L. Again, this observation suggests that it may be prudent to reassess user's reception toward 300 mg/L water and whether their preference for 100 mg/L justifies the significant cost addition.

Figure 7B:
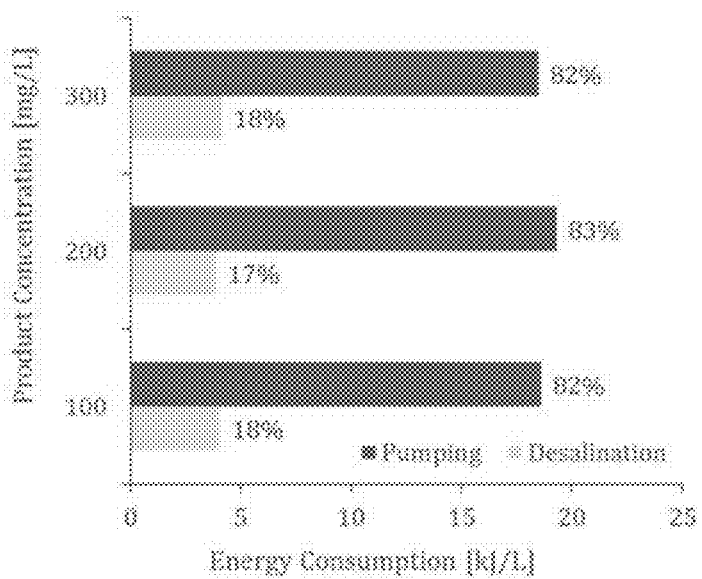
FIG. 7B is a graph showing simulated contributions from desalination and pumping to total energy consumption for all optimal household ED systems producing 12±0.5 L/hr at different product concentrations.

A similar breakdown is provided for energy consumption due to desalination and pumping (FIG. 7B). Here, pumps accounted for as high as 83% of the total energy consumption. In addition, the contribution from desalination did not vary significantly with product concentration, hence mirroring the slow growth of OC with $\bar{i}$ in FIG. 20.

Overall, this work has indicated that the development of low-cost and energy efficient pumps that are suitable for flow-rates ranging between 200 and 300 L/hr, while sustaining pressures up to 2 bar, will assist the commercialization of domestic ED systems. In addition, a more detailed investigation surrounding the optimal geometry of flow-spacers may provide similar or better mass transfer behavior at a lower pressure drop, thereby also reducing the pumping expense.

Conclusions

Cost-optimal designs of batch ED systems targeted at production rates of 9-15 L/hr and product concentrations of 100-300 mg/L, from a fixed feed concentration of 2000 mg/L at 90% recovery, were first investigated. Voltage and flow-rates were held constant during the batch desalination process for each design.

In all cases, capital cost was found to dominate over the operating cost due to the upper-bound on the ion removal rate imposed by the limiting current density. Furthermore, capital cost was found to be sensitive to the target product water concentration such that while batch ED can be used to produce 100 mg/L water, the respective optimal designs were significantly more expensive than alternatives targeted at 200 and 300 mg/L.

Thin channels (0.30-0.33 mm), high aspect ratios (3.5-6), and cell-pair numbers that varied from 36 to 46 were recommended to minimize cost. Voltages applied to larger systems were found to be applicable at the domestic scale; however, optimal flow velocities (11-21 cm/s) were greater than reported in other literature.

Evaluating the sensitivity of the cost-optimal parameters at a fixed 200 mg/L product and 12±0.5 L/hr production rate, it was found that the active area scaled linearly with feed concentration (1500-2500 mg/L) while recovery ratio (60-90%) had minimal effect on the design and total cost.

By analyzing the limits of the optimized designs we have also identified three directions that can further increase affordability to facilitate commercialization: voltage regulation during the batch process, development of inexpensive pumps suited to this application, and a detailed investigation on optimal spacer geometry.

The primary limitation of this work is the exclusion of membrane replacement expenses in the operating cost. Since the cost-optimal approach was to minimize cell-pair area, the corresponding membrane replacement cost would also be therefore minimized. However, operating at the suggested high linear flow velocities may negatively impact membrane life, and subsequently increase replacement frequency. Therefore, further experimental work to characterize membrane performance is also recommended.

Appendix A: Pump Selection

Figure 12:
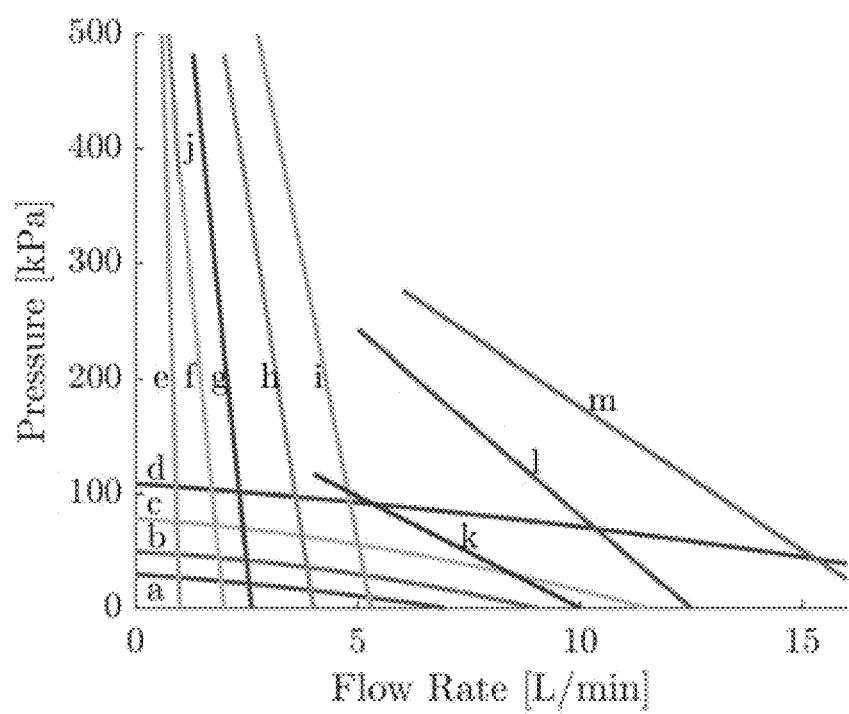
FIG. 12 is a graph showing the pressure-flow relationship of pumps considered in the analysis of Example 2.

A system pressure-flow curve was produced for each design iteration and compared to 13 DC pump curves (FIG. 12). With the exception of a-d which are centrifugal pumps, the remainder are diaphragm pumps. The pump, whose intersection point with the system curve most closely provided the design flow-rate, was used for estimating the cost and energy consumption. The pumps were assumed to be operating at their rated power consumption through the full batch duration.

Pressure-flow relationship of pumps considered in this analysis. See Table below for specifications and cost.

Cost and Power Specifications for Pumps

| # | Manufacturer | Model | Power [W] | Cost [$] |
|---|---|---|---|---|
| a | Topsflo | B10H-B12 | 11 | 18 |
| b | Topsflo | B04H | 20 | 19 |
| c | Topsflo | B10-B24 | 31 | 19 |
| d | Topsflo | C01-B24 | 48 | 45 |
| e | Singflo | 100GRO | 24 | 14 |
| f | Singflo | FL-2401 | 22 | 16 |
| g | Singflo | FL-2403 | 24 | 16 |
| h | Singflo | FL-2402A | 31 | 18 |
| i | Ronda | DP-150 | 40 | 54 |
| j | Ronda | DP-130 | 15 | 53 |
| k | Singflo | FL-31 | 36 | 33 |
| l | Singflo | FL-34 | 60 | 34 |
| m | Singflo | FL-44 | 134 | 35 |

References

[1] B. of Indian Standards, "Indian Standard: Drinking Water Specification (second revision)," p. IS 10500, 2012.

[2] Comprehensive Initiative on Technology Evaluation, "Household Water Filter Evaluation," pp. 1-31, 2015

[3] KENT RO Systems Ltd, *Supreme RO,* 2016.

[4] EurekaForbes, *Aquaguard Geneus,* 2016.

[5] Transparency Market Research, "Water Purifier Market—India Industry Analysis, Size, Share, Growth, Trends and Forecast 2016-2024," tech, rep., Albany, N.Y., 2016.

[6] N. C. Wright and A. G. Winter, "Justification for community-scale photovoltaic-powered elec-trodialysis desalination systems for inland rural villages in India," *Desalination,* vol. 352, pp. 82-91, 2014.

[7] B. Pilat, "A Case for Electrodialysis," *Interna-tional Water & Irrigation,* vol. 7, pp. 195-225, 1991.

[8] R. W. Consortium, "Low energy solutions for drinking water production by a revival of elec-trodialysis systems," 2016.

[9] B. Pilat, "Practice of water desalination by electrodialysis," *Desalination,* vol. 139, no. 1-3 pp. 385-392, 2001.

[10] S. Thampy, G. R. Desale, V. K. Shahi, B. S. Makwana, and P. K. Ghosh, "Development of hybrid electrodialysis-reverse osmosis domestic desalination unit for high recovery of prod-uct water," *Desalination,* vol. 282, no. 1418, pp. 104-108, 2011.

[11] K. G. Nayar, P. Sundararaman, J. D. Schacherl, C. L. O'Connor, M. L. Heath, M. O. Gabriel, S. R. Shah, N. C.

Wright, and A. G. Winter V., "Feasibility Study of an Electrodialysis Sys-tem for In-Home Water Desalination in Urban India," *Development Engineering*, vol. 2, pp. 38-46, 2016.

[12] R. K. McGovern, S. M. Zubair, and J. H. Lien-hard V, "Design and Optimization of Hybrid ED-RO Systems for the Treatment of Highly Saline Brines," in *International Desalination Association World Congress*, (Tianjin, China), 2013.

[13] H. J. Lee, F. Sarfert, H. Strathmann, and S. H. Moon, "Designing of an electrodialysis desalination plant," *Desalination*, vol. 142, no. 3, pp. 267-286, 2002.

[14] F. S. Rohman and N. Aziz, "Optimization of batch electrodialysis for hydrochloric acid recovery using orthogonal collocation method," *Desalination*, vol. 275, no. 1-3, pp. 37-49, 2011.

[15] Y. Tanaka, "A computer simulation of batch ion exchange membrane electrodialysis for desalination of saline water," *Desalination*, vol. 249, no. 3, pp. 1039-1047, 2009.

[16] J. Uche, F. Círez, A. A. Bayod, and A. Martínez, "On-grid and off-grid batch-ED (electrodialysis) process: Simulation and experimental tests," *Energy*, vol. 57, pp. 44-54, 2013.

[17] L. J. Banasiak, T. W, Kruttschnitt, and A. I. Schäfer, "Desalination using electrodialysis as a function of voltage and salt concentration," *De-salination*, vol. 205, no. 1-3, pp. 38-46, 2007.

[18] J. M. Ortiz, J. a. Sotoca, E. Expósito, F. Gallud, V. García-García, V. Montiel, and a. Al-daz, "Brackish water desalination by electrodialysis: Batch recirculation operation modeling," *Journal of Membrane Science*, vol. 252, no. 1-2, pp. 65-75, 2005.

[19] N. Wright, S. Shah, and A. G. Winter, "Modeling of Electrodialysis and Validation at Small and Large Scales (In Preparation)," *Desalination*, 2017.

[20] H. Strathmann, "Electrodialysis, a mature technology with a multitude of new applications," *Desalination*, vol. 264, no. 3, pp. 268-288, 2010.

[21] Y. Tanaka, *Ion Exchange Membrane Electrodialysis: Fundamentals, Desalination, Separation*. Nova Science Publishers, 2010.

[22] G. Kortum, *Treatise on Electrochemistry*. Elsevier Publishing Company, 1965.

[23] S. Pawlowski, J. G. Crespo, and S. Velizarov, "Pressure drop in reverse electrodialysis: Experimental and modeling studies for stacks with variable number of cell pairs," *Journal of Mem-brane Science*, vol. 462, pp. 96-111, 2014.

[24] F. N. Ponzio, A. Tamburini, A. Cipollina, G. Micale, and M. Ciofalo, "Experimental and computational investigation of heat transfer in channels filled by woven spacers," *International Journal of Heat and Mass Transfer*, vol. 104, pp. 163-177, 2017.

[25] M. Johannink, K. Masilamani, A. Mhamdi, S. Roller, and W. Marquardt, "Predictive Pres-sure drop models for membrane channels with non-woven and woven spacers," *Desalination*, vol. 376, pp. 41-54, 2015.

[26] CONWED Global Netting Solutions, Minneapolis, USA, *Reverse Osmosis Feed Spacers*, 2016.

[27] Industrial Netting, Minneapolis, USA, *Woven Nylon, Polyester, or Polypropylene Plastic Mesh*, 2016.

[28] G. Belfort and G. A. Guter, "Hydrodynamic Studies for Electrodialysis," tech. rep., McDonnell Douglas Corporation, Newport Beach, Calif., 1969.

[29] G. Schock and A. Miquel, "Mass transfer and pressure loss in spiral wound modules," *Desalination*, vol. 64, no. C, pp. 339-352, 1987.

[30] C. P. Koutsou, S. G. Yiantsios, and A. J. Karabelas, "Direct numerical simulation of flow in spacer-filled channels: Effect of spacer geometrical characteristics," *Journal of Membrane Science*, vol. 291, no. 1-2, pp. 53-69, 2007.

[31] L. Gurreri, A. Tamburini, A. Cipollina, G. Micale, and M. Ciofalo, "Flow and mass transfer in spacer-filled channels for reverse electrodialysis: a CFD parametrical study," *Journal of Membrane Science*, vol. 497, pp. 300-317, 2016.

[32] Reliance Energy, "MERC Multi Year Tariff Order for FY 2016-17 to FY 2019-20," tech. rep.

[33] Baoji Changli Special Metal Co. Ltd., Shaanxi, China, *Platinized Titanium Anode*, 2014.

[34] Hangzhou Iontech Environmental Co. Ltd., Zhejiang, China, *IONSEP Membranes*, 2014.

[35] Weihai Cortec International Trade Co. Ltd., Shandong, China, *Plastic Spacer for RO Mem-brane Rolling* 2015.

[36] World Health Organization, *Guidelines drinking-water quality, Vol. 1, Recommendations*. 3rd ed., 2008.

[37] P. Gleick, "Basic Water Requirements for Hu-man Activities: Meeting Basic Needs. Water International," *Water International*, vol. 21, pp. 83-92, 1996.

[38] MATLAB, version 8.6.0 (R2015b). Natick, Mass., 2010.

[39] K. Deb and T. Goel, "Controlled Elitist Non-dominated Sorting Genetic Algorithms for Bet-ter Convergence," in *Lecture Notes in Computer Science*, pp. 67-81, Springer Berlin Heidelberg.

[40] M. Srinivas and L. Patnaik, "Adaptive probabilities of crossover and mutation in genetic algorithms," *IEEE Transactions on Systems, Man, and Cybernetics*, vol. 24:4, pp. 656-667, 1994.

[41] K. Deb, A. Pratap, A. S., and T. Meyarivan, "A Fast and Elitist Multiobjective Genetic Algorithm: NSGA-II," *IEEE Transactions on Evolutionary Computation*, vol. 6:2, pp. 182-197, 2002.

[42] R. K. McGovern, S. M. Zubair, and J. H. Lien-hard V, "The cost effectiveness of electrodialysis for diverse salinity applications," *Desalination*, vol. 348, pp. 57-65, 2014.

[43] Y. Kim, W. S. Walker, and D. F. Lawler, "Electrodialysis with spacers: Effects of variation and correlation of boundary layer thickness," *Desalination*, vol. 274, no, 1-3, pp. 54-63, 2011.

[44] J.-H. Min and H.-S. Kim, "Effect of operating conditions on the treatment of brackish groundwater by electrodialysis," *Desalination and Water Treatment*, vol. 51, no. January 2015, pp. 5132-5137, 2013.

[45] M. A. Anderson, A. L. Cudero, and J. Palma, "Capacitive deionization as an electrochemical means of saving energy and delivering clean water. Comparison to present desalination practices: Will it compete?," *Electrochimica Acta*, vol. 55, no. 12, pp. 3845-3856, 2010.

Example 3

Increasing the Speed of Brackish Water Batch Electrodialysis Desalination Using Open-Loop Voltage Control Several studies have been performed on the design and optimization of batch ED systems for brackish water desalination. Most authors suggest operating at high current densities i to reduce the membrane area required for a given salt removal rate. Since the capital cost CC scales with the membrane area requirement, $CC \sim 1/i$.

Therefore, the capital cost of the system can be decreased by increasing current density. However, few have suggested controlling the voltage control to maximize the current density as a function of diluate concentration. As a result, controller descriptions and experimental comparisons with standard operation are lacking. We speculate that at least for large-scale systems, this solution is often neglected because:

Cost and difficulty of implementation when dealing with high power.

Industrial operations are often more concerned about the energetic cost of the process, where maximizing current density has strong negative consequences on the power consumption (P), since due to ohmic losses, $$P \sim i^2$$

given a fixed system size.

In Example 1 and Example 2, we also investigated the optimal design of a small-scale batch ED system for point-of-use desalination of brackish groundwater using simulation. For the production performance being targeted, 2000 mg/L to 100-300 mg/L at 9-15 L/hr, the capital cost of the products outweighed the energetic cost. Therefore, increasing the current density was expected to decrease the capital cost of the system. Furthermore, the calculated peak desalination power was low (<50 W); therefore, designing an inexpensive voltage-controller for this application is feasible.

Considering first small-scale systems consisting of short flow-paths, in this work we:

1. conceptually detailed the voltage-control strategy and the potential benefit that it can provide;
2. implemented a bench-scale controller to implement the proposed strategy;
3. and experimentally demonstrated the decrease in batch duration that can be reliably achieved.

The Concept of Voltage-Controlled Batch

Figure 16:
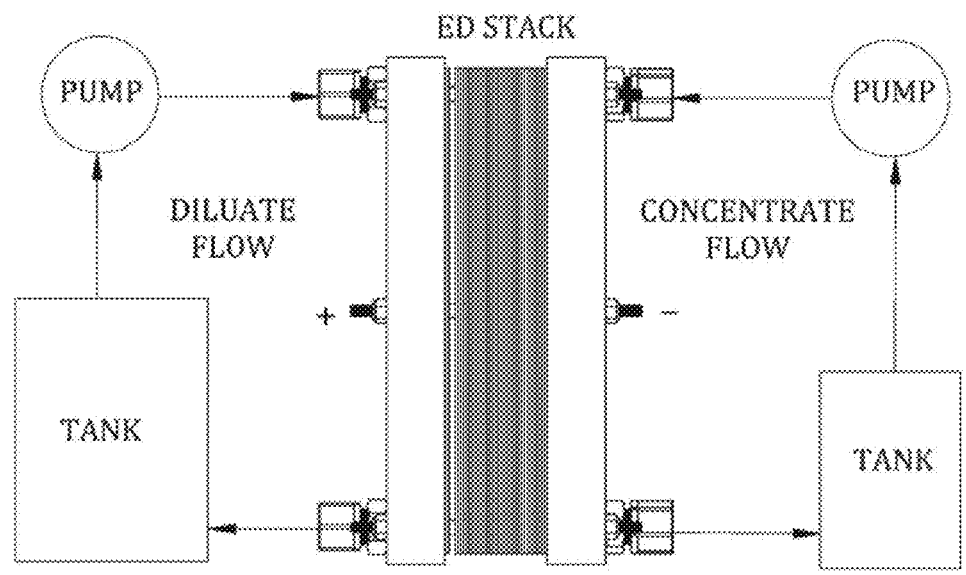
FIG. 16 is a schematic showing a conventional batch system.
Figure 17:
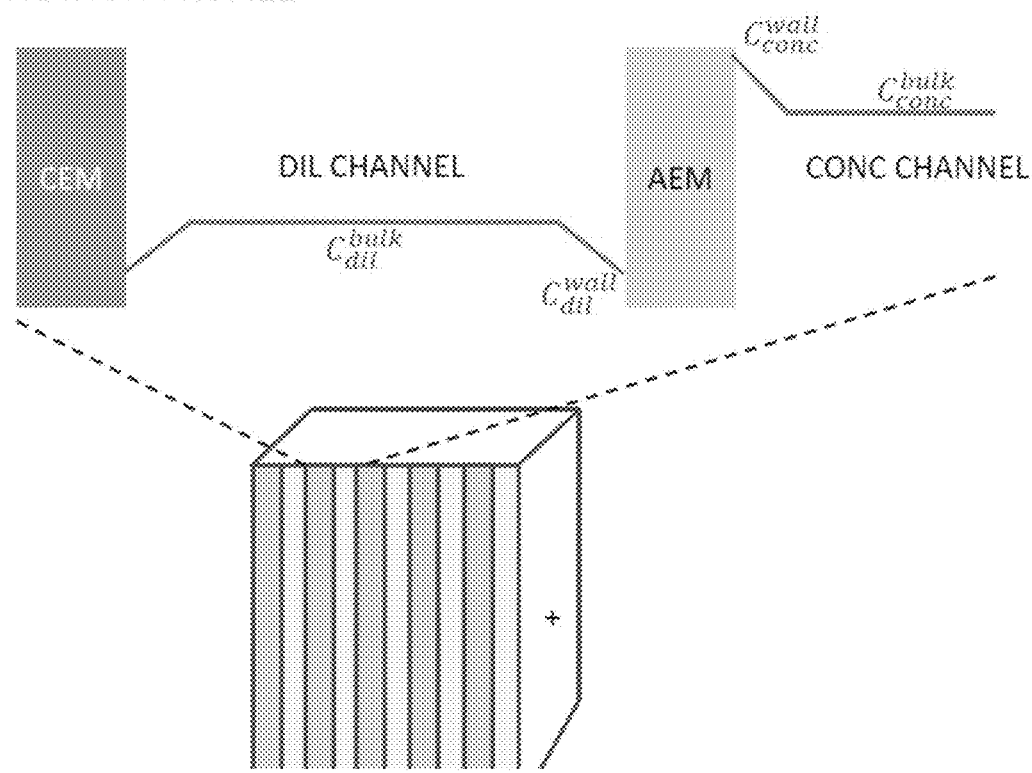
FIG. 17 is a schematic showing the concentration profile for the diluate channel and the concentrate channel. Due to concentration polarization, the ion-depletion at the diluate-membrane interface results in a lower concentration than the bulk diluate concentration. At the concentrate-membrane interface, the concentration is higher than the bulk concentrate concentration.
Figure 18:
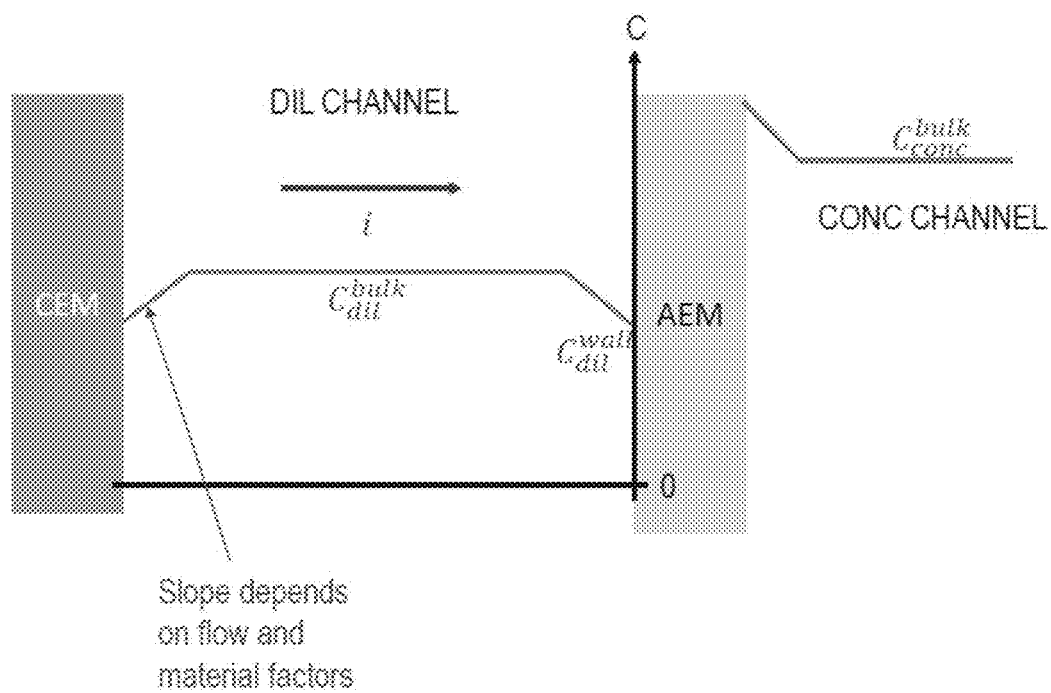
FIG. 18 is a schematic showing the concentration profile of the diluate channel and the concentrate channel at the boundary layer. The difference between the bulk and wall diluate concentrations is greater under high applied current densities, and low channel flow velocities.
Figure 19:
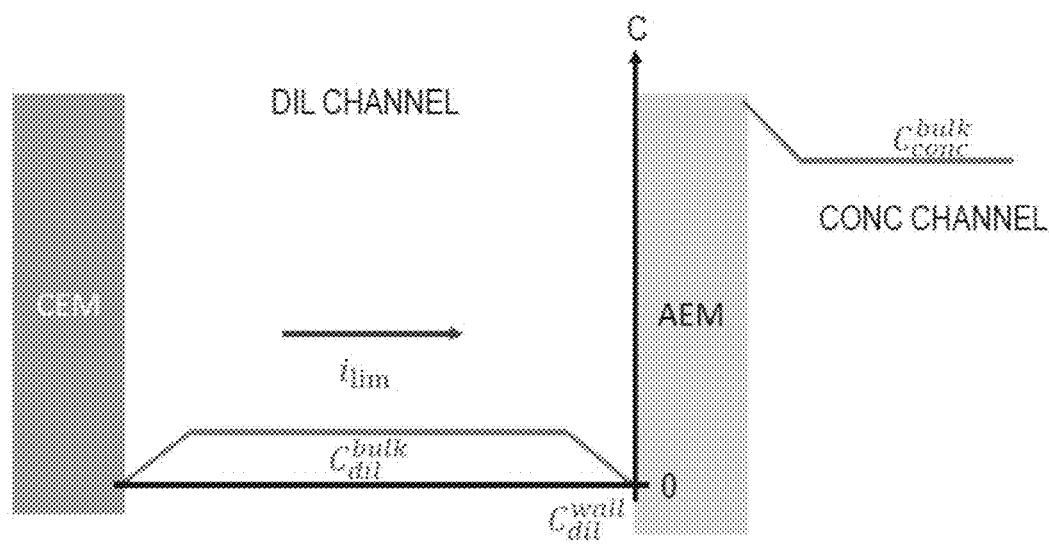
FIG. 19 is a schematic showing the limiting current density in the diluate channel. The limiting current density is the current density which produces a zero wall concentration at the diluate-membrane interface.

A conventional batch process is shown in FIG. 16. In batch ED, an initial feedwater volume is separated at the desired recovery ratio into two circuits, one for the diluate and the other for the concentrate. During desalination, the fluid is recirculated through the stack and a voltage is applied until the desired concentration is achieved in the diluate tank. Both in simulation and practice, the voltage and recirculation flowrates are conventionally held constant during this batch process. An additional third circuit, not shown here, may also be required to rinse the electrodes.

Figure 22:
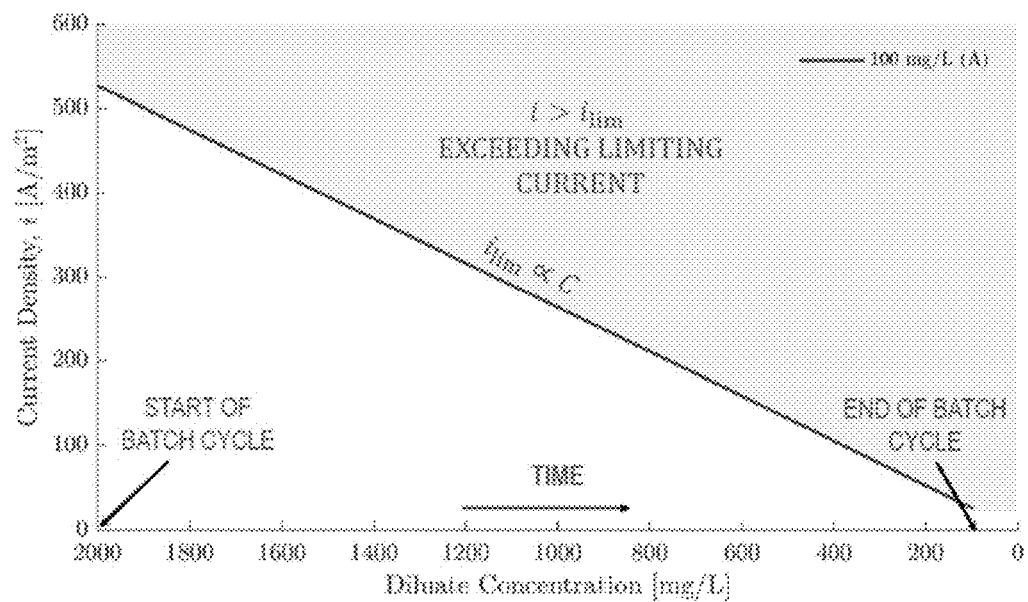
FIG. 22 is a graph of current density ($A/m^2$) as a function of diluate concentration for a product concentration of 100 mg/L.
Figure 23:
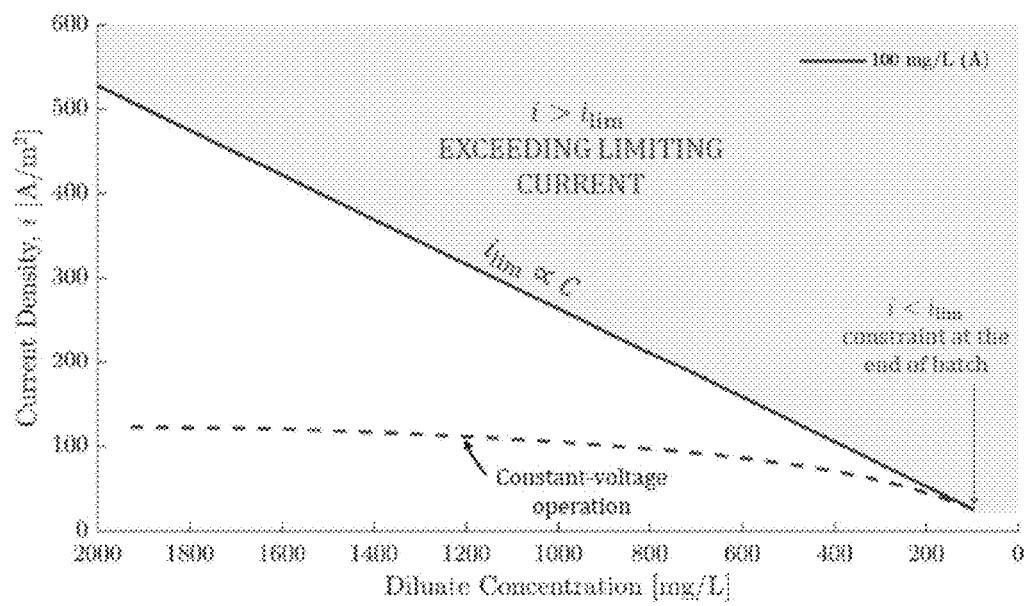
FIG. 23 is a graph of current density ($A/m^2$) as a function of diluate concentration for a product concentration of 100 mg/L from 2000 mg/L at 10 L/hr and 90% recovery. The dashed line shows the current density as a function of diluate concentration for a constant voltage operation. Water splitting, increase in pH and degradation of the membrane occurs at a current density over the limiting current density, which is represented by the solid black line.

To prevent water-splitting (which occurs when the limiting current density is exceeded), and affecting the pH of the water produced, it is required to not exceed the limiting current density during the batch desalination cycle. Assuming a short flow-path and neglecting the spatial concentration variations within the stack, the limiting current density is plotted against the diluate concentration from the start to the end of one batch cycle (FIG. 22). When a constant voltage is applied, the corresponding current density trajectory is as shown for a sample point-of-use design optimized to desalinate to 100 mg/L at 10 L/hr from our previous work (FIG. 23). By requiring that the instantaneous current density always remain below the limiting current density, the end-point of the trajectory—which corresponds to our final product water concentration—determines the maximum voltage that can be applied. However, since the voltage is constant, this single constraint determines the full current density trajectory. As shown, this mode of operation results in a significant duration where the instantaneous current density is far below the limiting current density, thereby leaving the membranes under-utilized.

Figure 24:
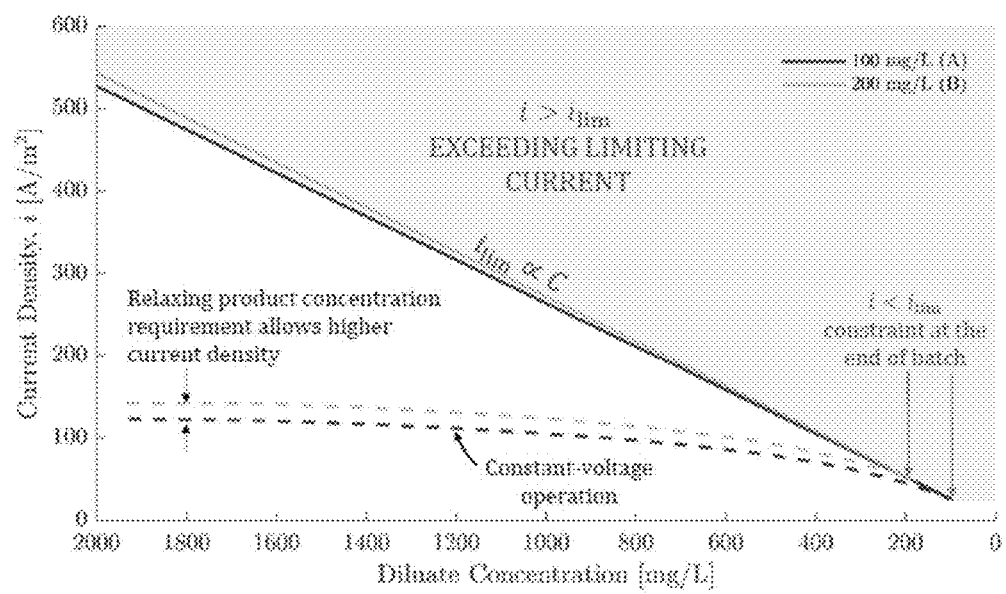
FIG. 24 is a graph of current density ($A/m^2$) as a function of diluate concentration for two optimal designs targeted at producing 100 mg/L and 200 mg/L from 2000 mg/L at 10 L/hr and 90% recovery, respectively. The dashed lines show the simulated current density achieved by the designs through one batch cycle.

To achieve a higher current density using the same ED stacks and pumps operated in conventional constant-voltage batch operation, a higher product water concentration must be tolerated. For example, if 200 mg/L product is targeted instead of 100 mg/L, a higher current density can be achieved because the limiting current density constraint has shifted to a higher value (FIG. 24).

Figure 27:
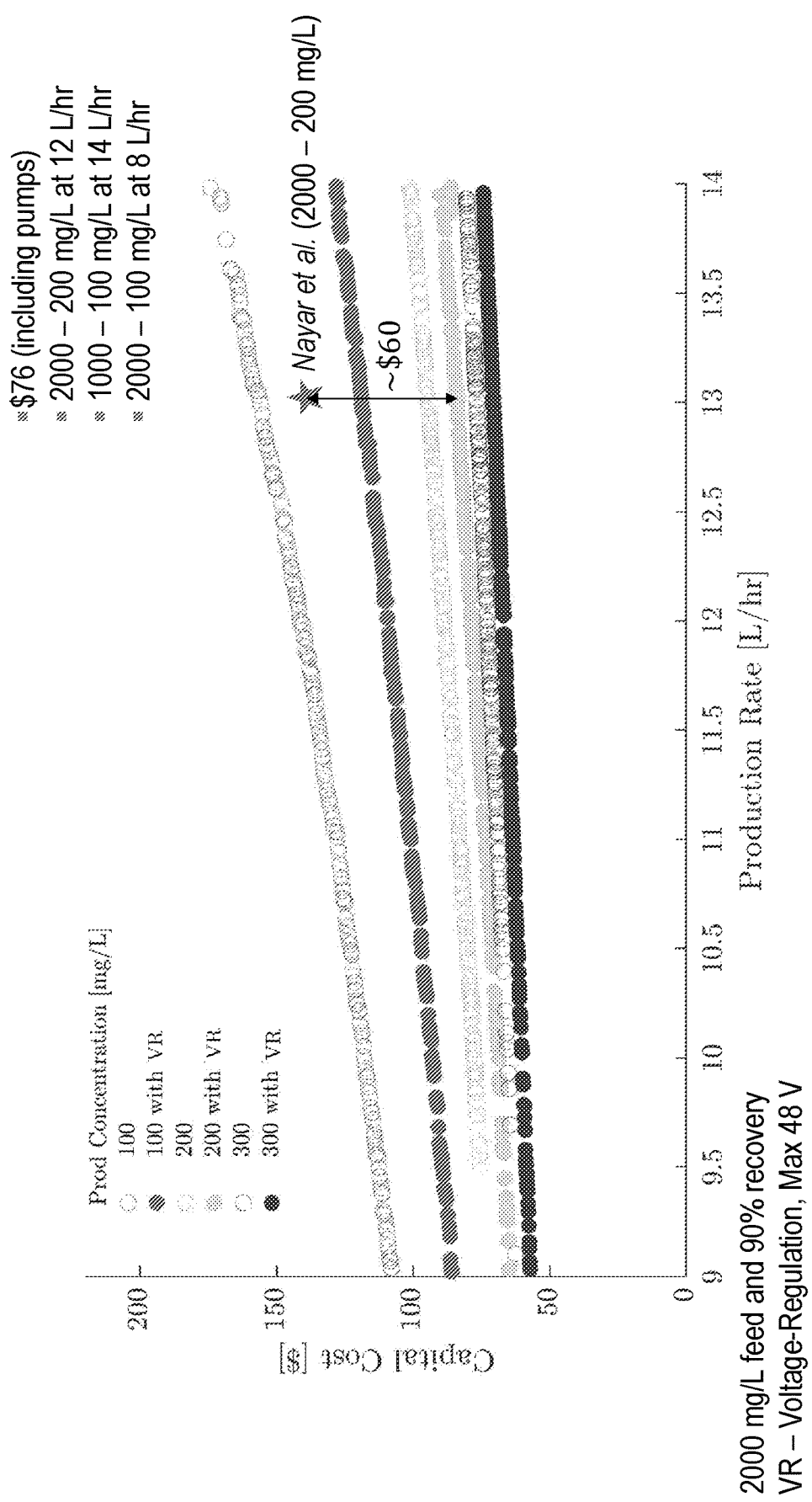
FIG. 27 is a graph showing simulated cost reduction for a voltage-controlled batch operation versus conventional constant-voltage operation. Capital cost (U.S. dollars) is shown as a function of production rate (L/hr).

FIG. 21 is a schematic showing a voltage-regulated batch process. The addition of controller allows voltage-controlled operation, based on diluate conductivity measurements. Active voltage control, based on diluate conductivity measurements, can allow operation just below the limiting current density throughout the batch duration to achieve higher ion-transfer rates (FIG. 25) without tolerating higher product water concentrations. This strategy can be used to either increase the production rate using a given membrane area, or decrease the required membrane area for a fixed production rate. Following the optimization procedure in our previous work (Example 2), and re-optimizing with simulated voltage-control (max 48 V), we find that the cost of systems targeted at producing 100, 200, and 300 mg/L of product water from 2000 mg/L at 90% recovery is decreased (FIG. 27). Furthermore, compared to the system used in the initial feasibility study performed by Nayar et. al. [Reference [11] from Example 2], the cost of the optimized voltage-controlled system is decreased by $60.

Figure 34:
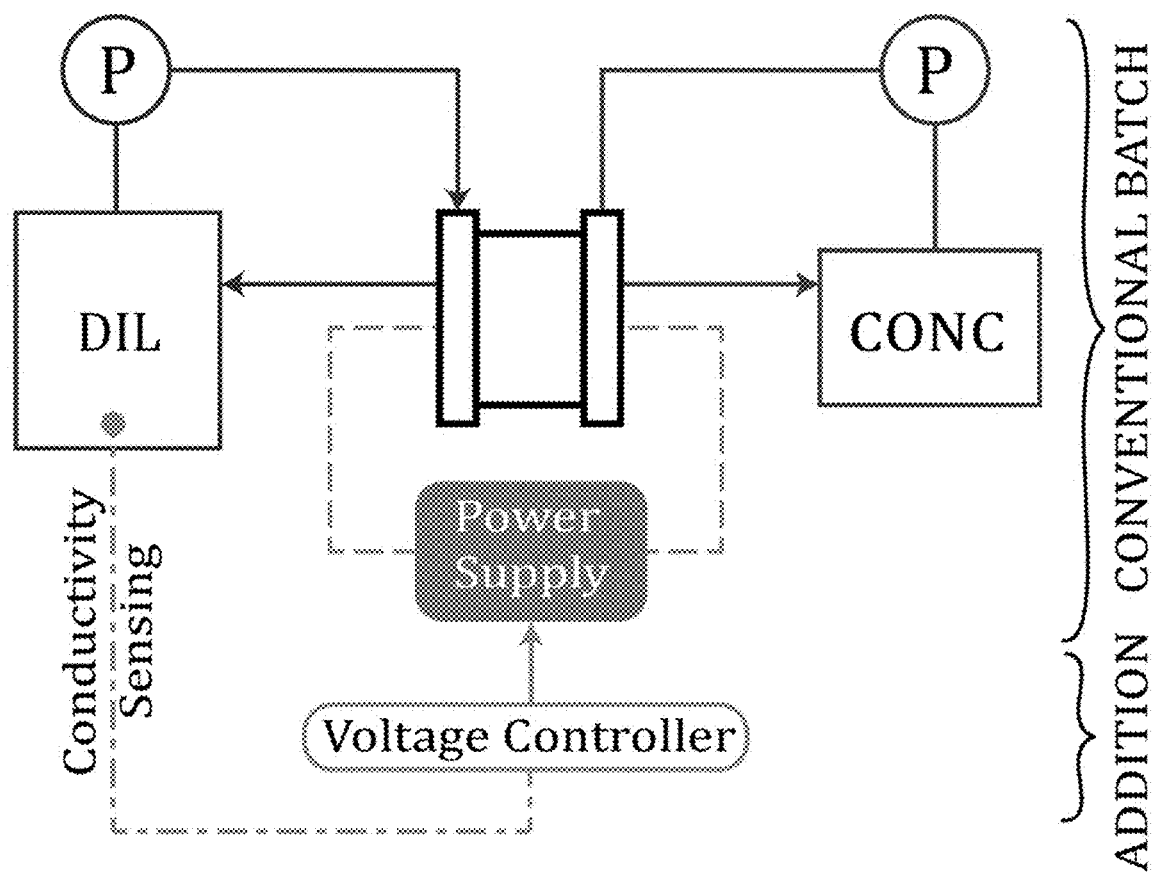
FIG. 34 is a schematic showing the voltage regulated system with optional conductivity sensing.

In order to implement voltage control, no additional sensing is required since diluate tank conductivity is already measured in a batch process to detect when the target concentration has been attained. Instead, the only addition required to a conventional batch configuration is a controller that can administer an appropriate voltage to the ED stack based on the conductivity measurements (FIG. 34). The power supply should also be capable of delivering a variable voltage.

Figure 28:
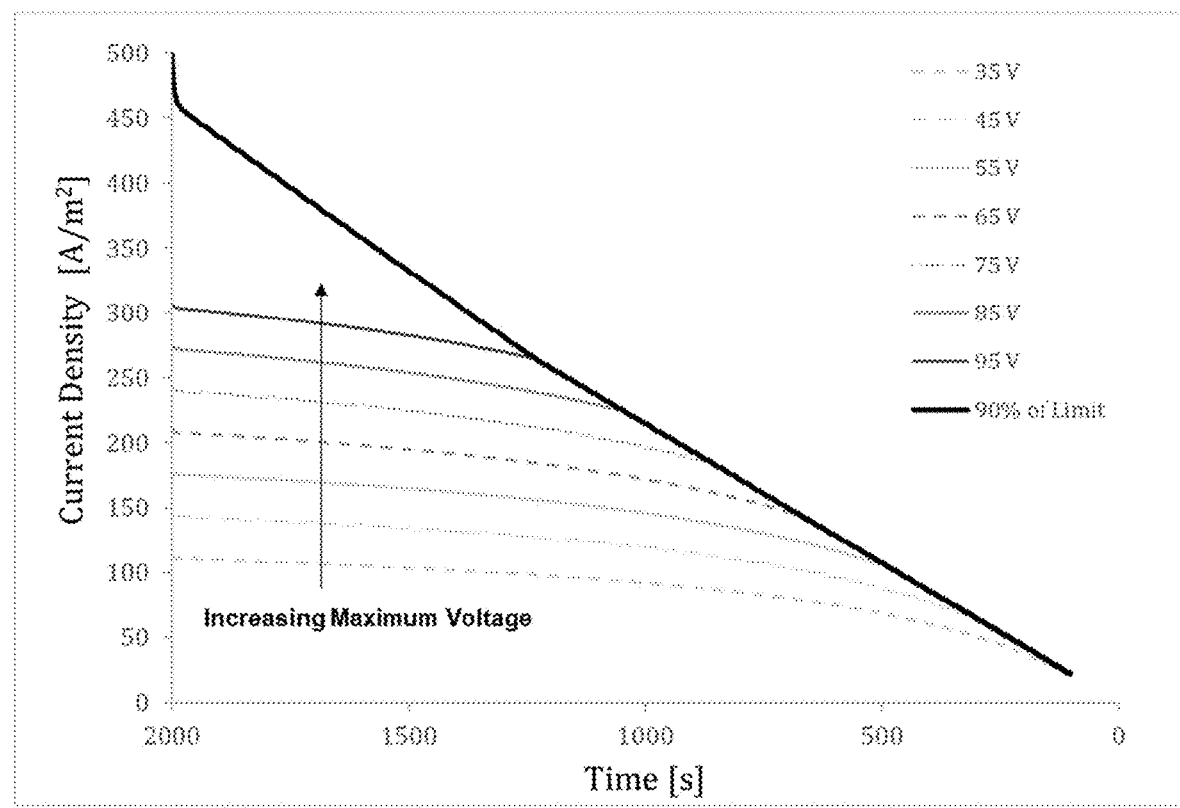
FIG. 28 is a graph of simulated current density (A/m2) as a function of diluate tank concentration (ppm) for 35, 45, 55, 65, 75, 85, and 95 V and for limiting current density (90% of limit).
Figure 29:
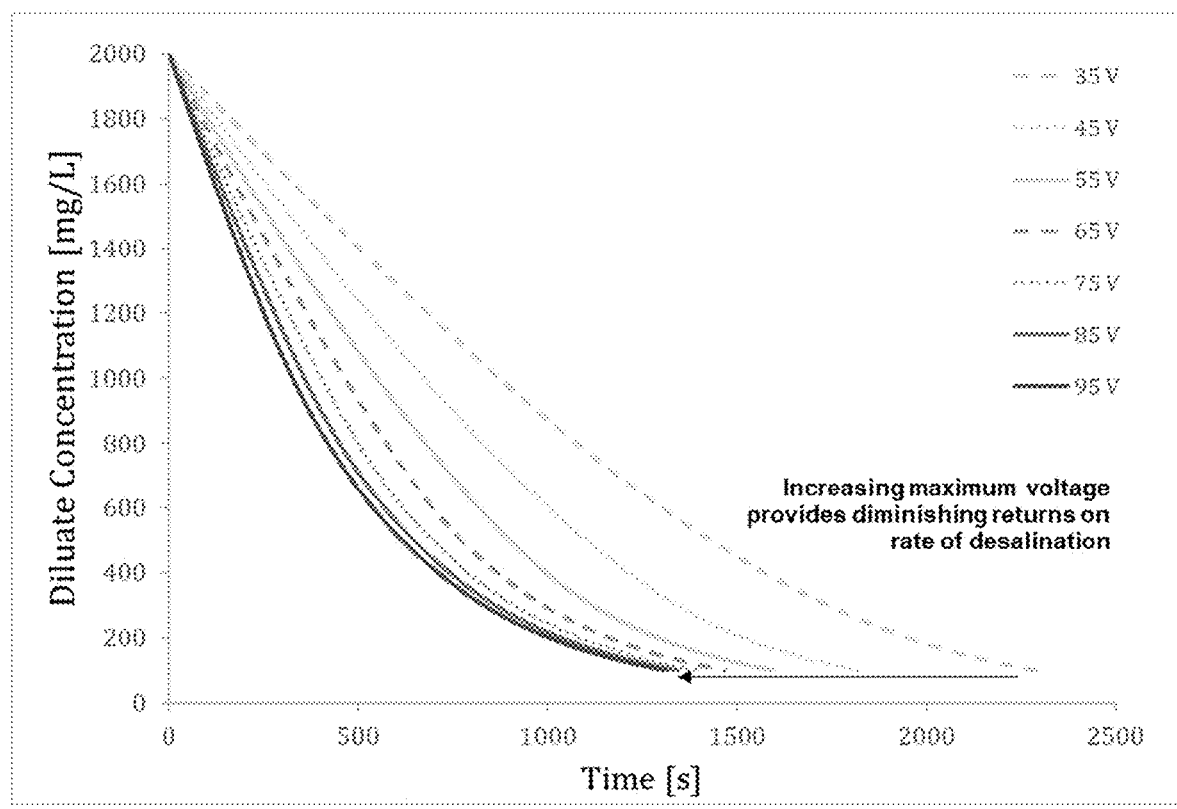
FIG. 29 is a graph of diluate tank concentration (ppm) over time (seconds) for 35, 45, 55, 65, 75, 85, and 95 V. The desalination rate increased from 8.0 to 10.5 L/hr with diminishing returns.

Voltage control can be used to track the limiting current density either through the full batch cycle, or partially by setting a maximum system voltage. FIGS. 28 and 29 simulate the effect of operating a sample ED system at different maximum voltages, ranging between 35 to 95 V. As shown (FIG. 28), a higher maximum voltage increases the duration over which the system can be operated close to 90% of the limiting current density. While increasing the maximum voltage increases the rate at which water is desalinated, incremental increases in voltage produce diminishing returns. In FIG. 29, it is observed that increasing the maximum voltage from 85 to 95 V provides negligible decrease in the time to desalinate from 2000 mg/L to 100 mg/L. As a result, a high maximum voltage is not required to yield significant reductions in the batch duration. In the example shown, by changing the mode of operation from constant-voltage at 35 V, to voltage-controlled with a maximum of 55 V, the production rate can be decreased by over 30% (FIG. 29).

Models

In order to experimentally demonstrate voltage-controlled batch and maximize i, subject to $i < i_{lim}$, we focus on modelling only the limiting and applied current densities here to facilitate the reader's understanding of the core work. The models applied below have been previously proposed and validated, and we additionally only consider the simple case of desalinating a sodium chloride solution in this study.

i. Limiting Current Density

Assuming that the ion-exchange membranes are perfectly ion-selective, the limiting current density is given as a function of the bulk diluate concentration $C_d^b$ by:

$$i_{lim} = \frac{C_d^b zFk}{1-t^{+/-}}.$$

The charge number of either ion z=1 for sodium chloride, F is the Faraday constant (96 485 C/mol), and $t^{+/-}$ is taken to be the minimum of the the cation and anion transport numbers in the bulk solution.

The boundary-layer mass transfer coefficient k is generally expressed in terms of the non-dimensional Sherwood number Sh, $$Sh = \frac{kd_h}{D_{aq}},$$

where $D_{aq}$ is the diffusion coefficient of the ions in the aqueous solution, and $d_h$ is the hydraulic diameter.

The Sherwood Number, which characterizes the mass-transfer, is correlated to the flow behavior and material properties using expressions of the form $$Sh = aRe^b Sc^c,$$

where the Reynolds Re and Schmidt Sc numbers are respectively defined as:

$$Re = \frac{u_{ch}d_h}{\nu} \text{ and } Sc = \frac{\nu}{D_{aq}}.$$

In this study, we use the coefficients a=0.29, b=0.50, and c=0.33 based on the work of Pawlowski et al. These coefficients were previously found to provide a good match with the limiting current density measurements on the same ED stack that is used in the following experiments (Section below). This correlation relies on the following definitions of the hydraulic diameter $d_h$ and linear flow velocity $u_{ch}$:

$$d_h = \frac{4\epsilon}{2/h + (1-\epsilon)(8/h)} \text{ and}$$

$$u_{ch} = \frac{Q}{\epsilon WhN},$$

where h is the thickness of the channel, W is the width of the channel, Q is the volumetric flow rate of diluate through the ED stack, N is the number of cell-pairs, and $\epsilon$ is the void fraction of the spacer occupying the channel.

Note that the diffusivity, transport numbers, and viscosity vary with concentration of the sodium chloride solution, but this dependence has an insignificant effect on the limiting current density estimation for brackish water concentrations (<~5000 mg/L or ~0.1 mol/L). Therefore, they are treated as constants in this study. It follows then that once the linear flow velocity has been set on a given ED stack, the limiting current density only varies as a linear function of the time-varying diluate concentration.

ii. Applied Current Density

Figure 32:
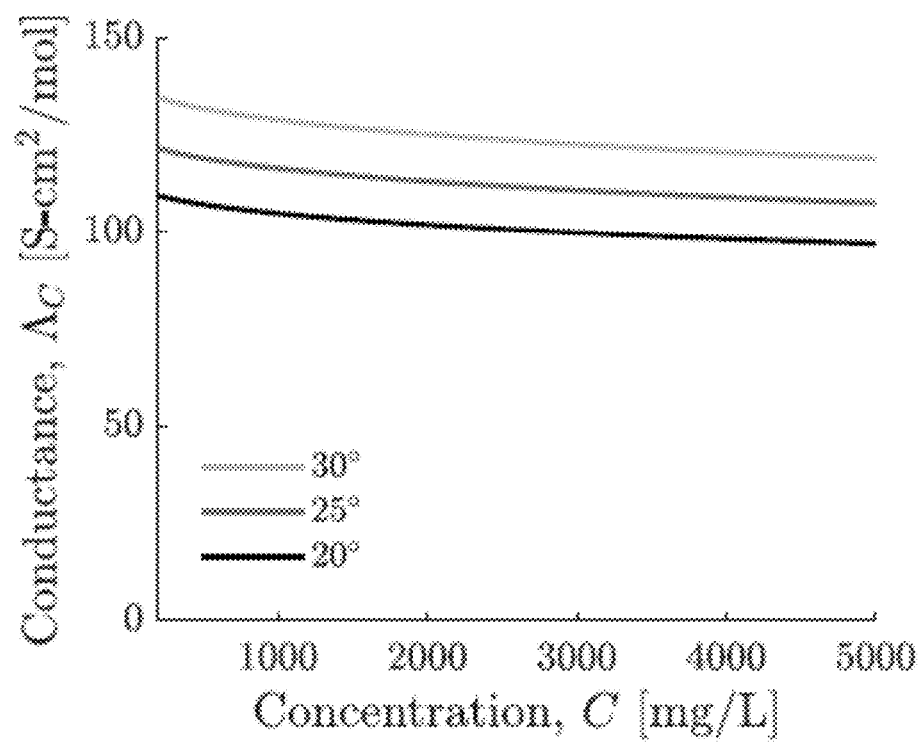
FIG. 32 is a graph showing the conductance as a function of concentration at 20, 25, and 30° C. Equivalent conductance of NaCl solution at varying temperatures, calculated as a function of concentration using the Onsager/Falkenhagen equation with empirical coefficients.

The objective in this investigation was to maximize the duration of the batch cycle where a high current ratio $r_i$, defined as $$r_i = \frac{i}{i_{lim}},$$

is maintained. Once the limiting current density is computed, the voltage V applied to the ED stack to produce the desired current density i is:

$$V = E_{el} + N[E_{mem} + i(R_d + R_c + R^{AEM} + R^{CEM})], \quad (10)$$

where $E_{el}$ is the potential drop of approximately 1.4 V due to redox reactions at the electrodes, $E_{mem}$ is the membrane potential, and $R^{AEM}$ and $R^{CEM}$ are the anion (AEM) and cation (CEM) exchange membrane resistances, respectively. The resistances of the diluate and concentrate channels, $R_d$ and $R_c$, are related to the concentrations of the respective bulk flows, $C_d^b$ and $C_c^b$, by:

$$R_{d/c} = \frac{h}{\Lambda_C C_{d/c}^b}, \quad (11)$$

where the equivalent conductance $\Lambda_C$ is a function of concentration and temperature (FIG. 32) and can be calculated using the Onsager/Falkenhagen equation with coefficients for NaCl. During operation, diluate conductivity ($\Lambda_C C_d^b$) is directly measured and used to estimate the diluate concentration.

Under approximations of equal diluate and concentrate channel flow rates and heights, perfectly ion-selective membranes, equal cation and anion transport numbers, and activity coefficients of 1, it can be shown that:

$$E_{mem} = \frac{2RT}{F} \ln\left(\frac{C_c^b(1+r_i)}{C_d^b(1-r_i)}\right), \quad (12)$$

where R is the gas constant (8.314 J/mol-K) and T is temperature. The bulk diluate and concentrate concentrations can be further related by the recovery ratio r and the feed concentration $C_{feed}$, using a mass-balance whereby:

$$C_{feed} = C_d^b r + C_c^b(1-r) \quad (13)$$

Note that once an ED system (h, $\epsilon$, N, $R^{AEM}$, $R^{CEM}$) and its operation (Q) are specified, Equations 10-13 can be used to compute the voltage V required to operate the stack at a desired current ratio $r_i$ based on diluate conductivity measurements alone. This feature of the model facilitated real-time calculation of the target voltage during the batch desalination experiments.

Experiments i. Experimental Setup

Figure 30:
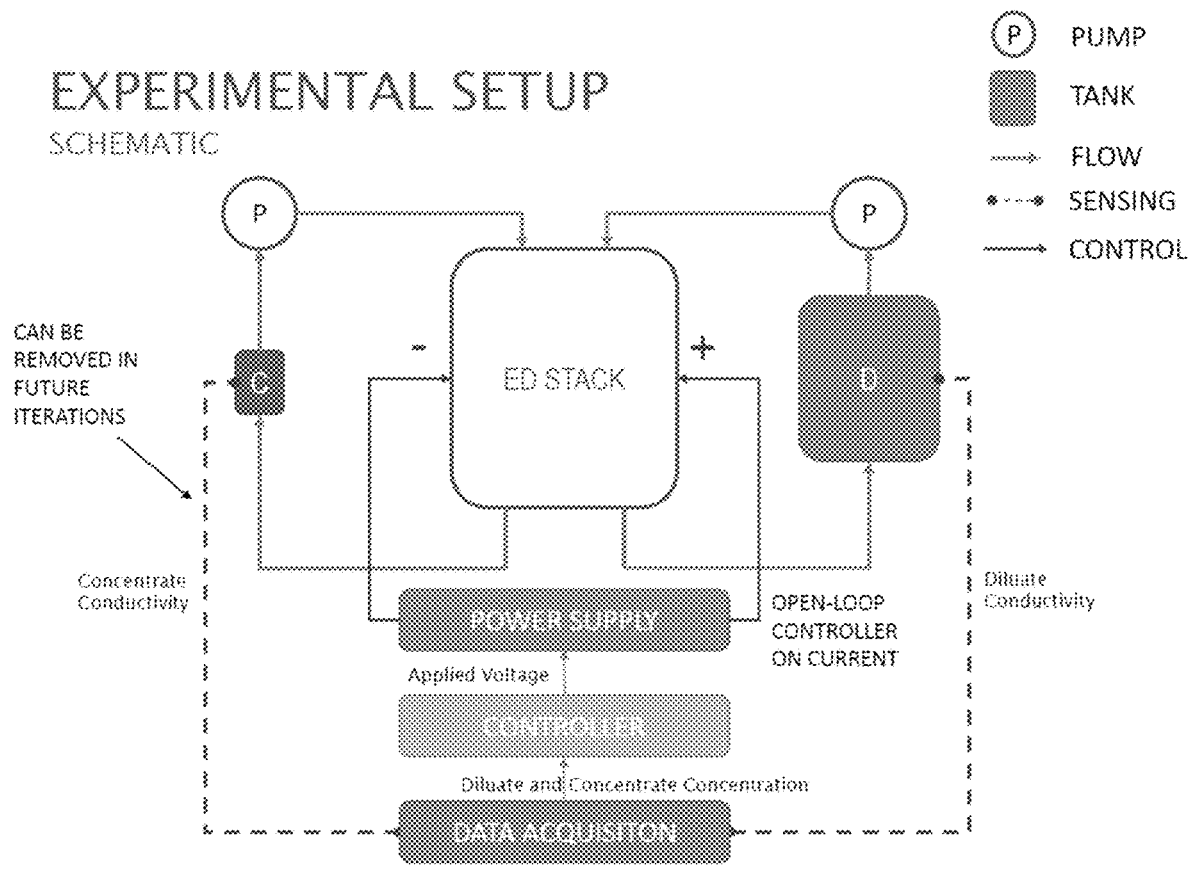
FIG. 30 is a schematic of an experimental set up including the voltage controller and data acquisition (receiving diluate and concentrate conductivity measurements).
Figure 31:
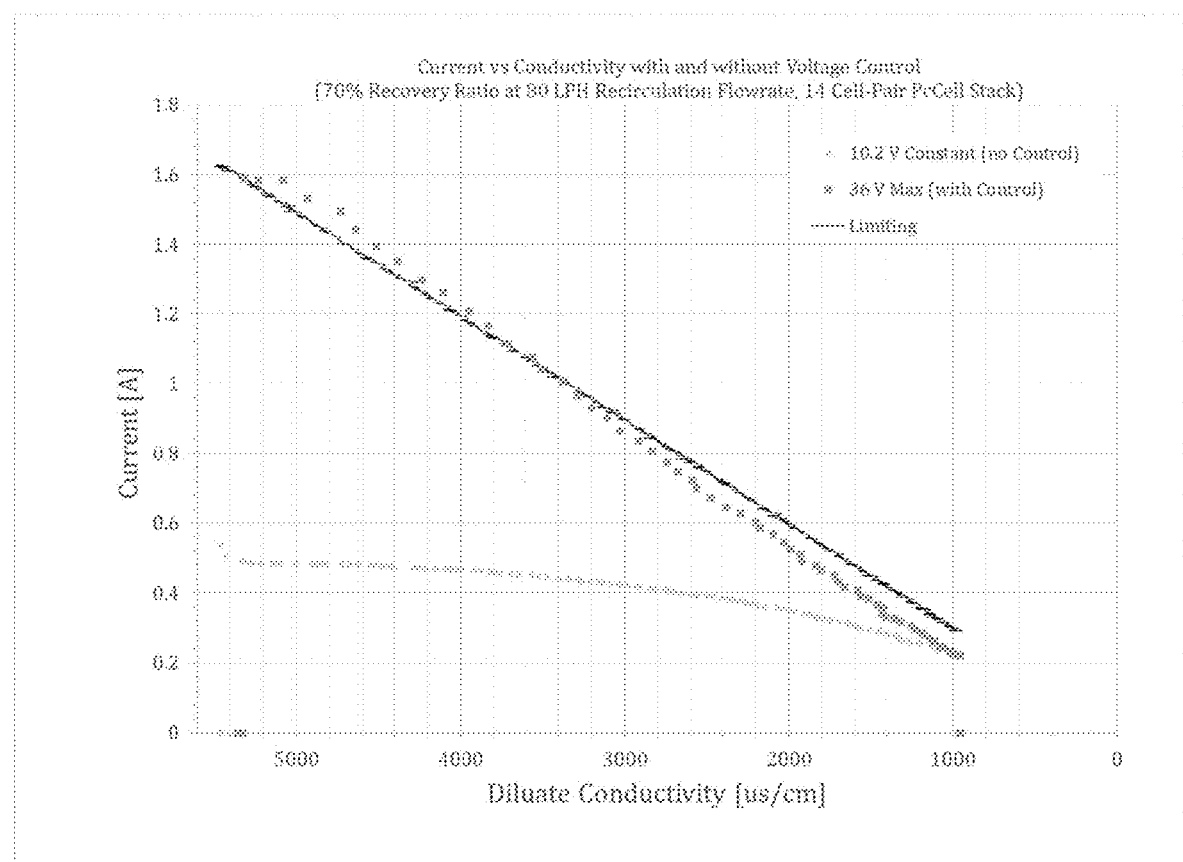
FIG. 31 is a graph of current (A) measured on a PCCell 64002 ED stack as a function of diluate conductivity (us/cm) for 10.2 V constant voltage operation, and with voltage control (up to 36 V maximum). The solid line shows the limiting current. With voltage control, the system was operated at higher current densities that are closer to the limiting current over the full batch duration.

The experimental setup (FIG. 30) was comprised of a prototype stack, with the geometry and construction outlined in the table below. Two SINGFLO 2402A diaphragm pumps were used to recirculate the diluate and concentrate through their irrespective circuits and into separate magnetically-stirred glass beakers; 2 L and 500 mL respectively. Flow rates were measured and controlled using two King Instrument 7430 Series glass tube flowmeters with valves (±6%). After leaving the cell-pairs, the concentrate was channeled through the electrode chambers to rinse the electrodes. The conductivity of the diluate and concentrate tanks were measured (±2%) at 1 Hz using Conductivity Instruments CDCE-90 conductivity probes, interfacing with CDCN-91 conductivity controllers, with cell constants of K=1/cm and K=10/cm, respectively. Conductivity measurements were collected using a National Instruments NI9203 data acquisition module and processed by LABVIEW to calculate, in real-time, the target voltage for the voltage-controlled experiments. The computed voltage was then applied to the stack using an Agilent Technologies N8760A power supply at a frequency of 0.1 Hz, which was also used to measure current draw.

Feedwater for the experiments was prepared by adding NaCl to deionized water. The pH of the diluate tank was measured using a Symphony H10P pH sensor before and after each test to ensure that the limiting current density was not exceeded. Recall that if the limiting current density is exceeded, water-splitting would occur, causing a large decrease in the pH of the produced water.

TABLE 3-1

Prototype Stack Geometry and Construction

| Parameter | Value and/or Details |
| --- | --- |
| Width of Active Area | 5 cm |
| Length of Active Area | 13 cm |
| Channel Thickness | 0.30 mm |
| Flow-Rates | 132 L/hr |
| Number of Cell-Pairs | 20 |
| Membranes | Manufacturer: Membranes International CMI-7000 (Cation Exchange Membrane) and AMI-7000 (Anion Exchange Membrane) | ii. Controller

Figure 35:
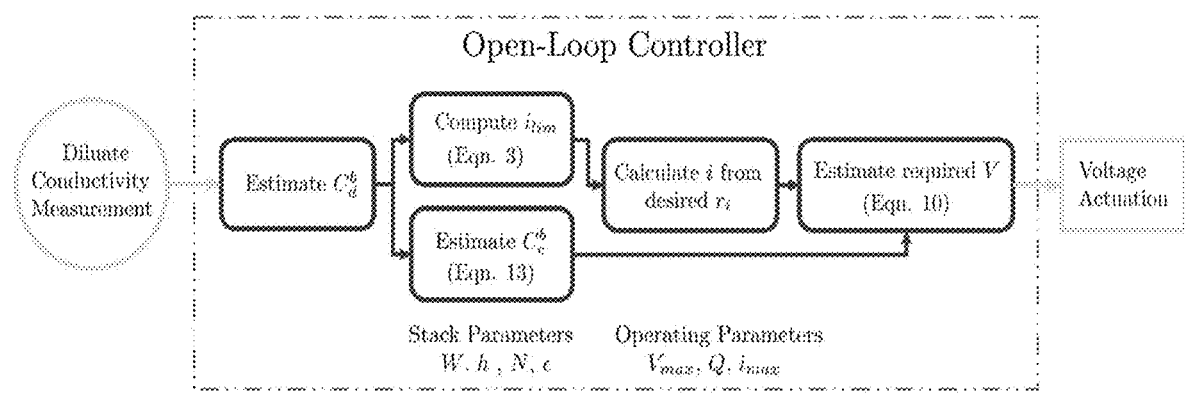
FIG. 35 is a schematic showing the controller logic that was implemented in LABVIEW in Example 3, and indicates the equations that were used.

FIG. 35 describes the controller logic that was implemented in LABVIEW for these experiments, and indicates the equations that were used. This is the simplest configuration of a controller that can be used for voltage-control purposes. It is an open-loop controller that calculates the voltage based on diluate conductivity measurements. A more robust approach can be taken, that relies on feedback control using measurements of the current drawn by the stack. In addition, rather than relying on a separate conductivity sensor to provide diluate conductivity measurements, the ED stack can also be used to estimate the diluate concentration. With known membrane resistances, the conductivity of the diluate flow in the channels can be derived from the measurements of the current drawn by the stack.

iii. Tests Performed

The table below indicates the batch desalination tests that were performed. In all cases, the diluate tank and concentrate tank volumes were set at 1.8 L and 0.3 L, respectively, thereby providing a recovery ratio of 86%. In tests 1-4, a 1000 mg/L feed was desalinated to 100 mg/L, and for tests 5-7, a 2000 mg/L was desalinated to 200 mg/L.

A maximum voltage of 48 V was set for the voltage-controlled experiments (VC), while the maximum voltage listed for the constant voltage (CV) experiments was held constant throughout the batch cycle. The voltage selected for the constant voltage experiment corresponded to the voltage that corresponded to 60% of the limiting current density at the product water concentration for Test 1, and 70% of the limiting current density at the product water concentration for Test 5.

TABLE 3-2

Summary of Tests Performed

| Test No. | Operation Mode | Feed Concentration [mg/L] | Product Concentration [mg/L] | Maximum Voltage [V] | Target Current Ratio for Voltage Control, $r_i$ |
| --- | --- | --- | --- | --- | --- |
| 1 | CV | 1000 | 100 | 13.2 | — |
| 2 | VC | 1000 | 100 | 48 | 0.9 |
| 3 | VC | 1000 | 100 | 48 | 0.8 |
| 4 | VC | 1000 | 100 | 48 | 0.6 |
| 5 | CV | 2000 | 200 | 20.5 | — |
| 6 | VC | 2000 | 200 | 48 | 0.8 |
| 7 | VC | 2000 | 200 | 48 | 0.7 |

Results and Discussion

Figure 26A:
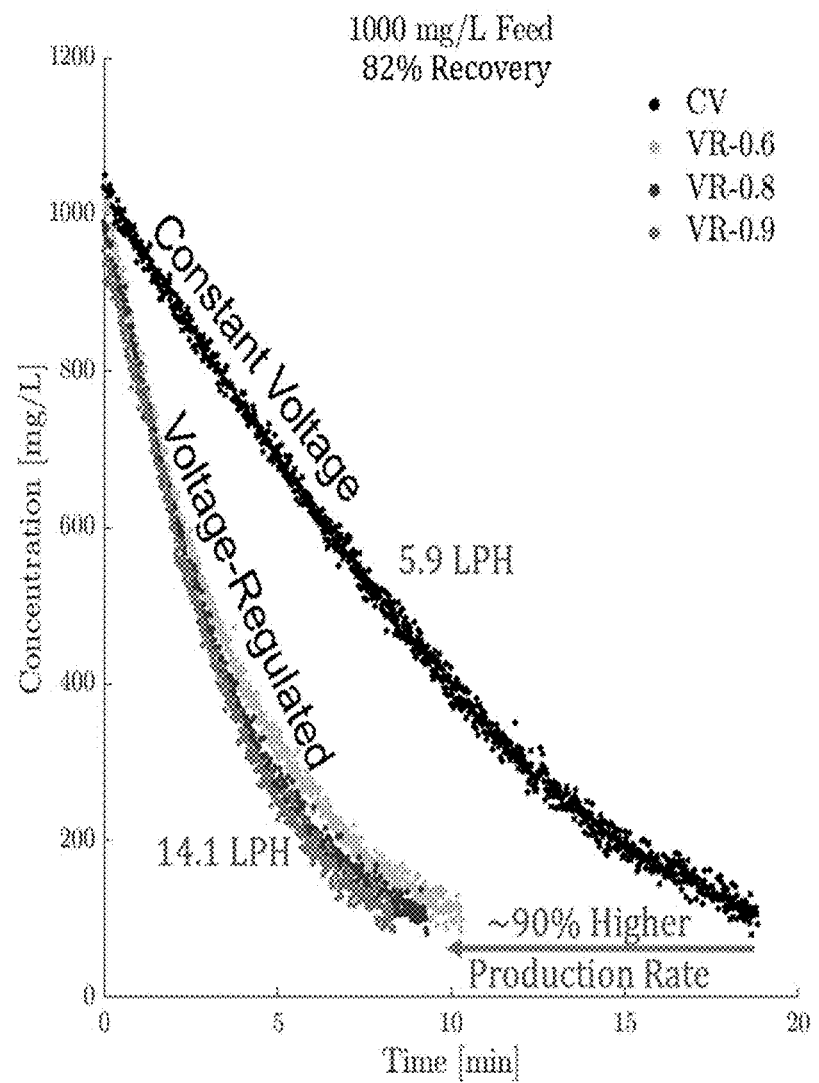
FIGS. 26A and 26B are graphs of concentration (mg/L) as a function of time for 1000 and 2000 mg/L feed, respectively. CV represents constant voltage. VR-0.6, VR-0.8, and VR-0.9 represent the cases where voltage was regulated to achieve 60%, 80%, and 90% of the limiting current density, respectively.
Figure 26B:
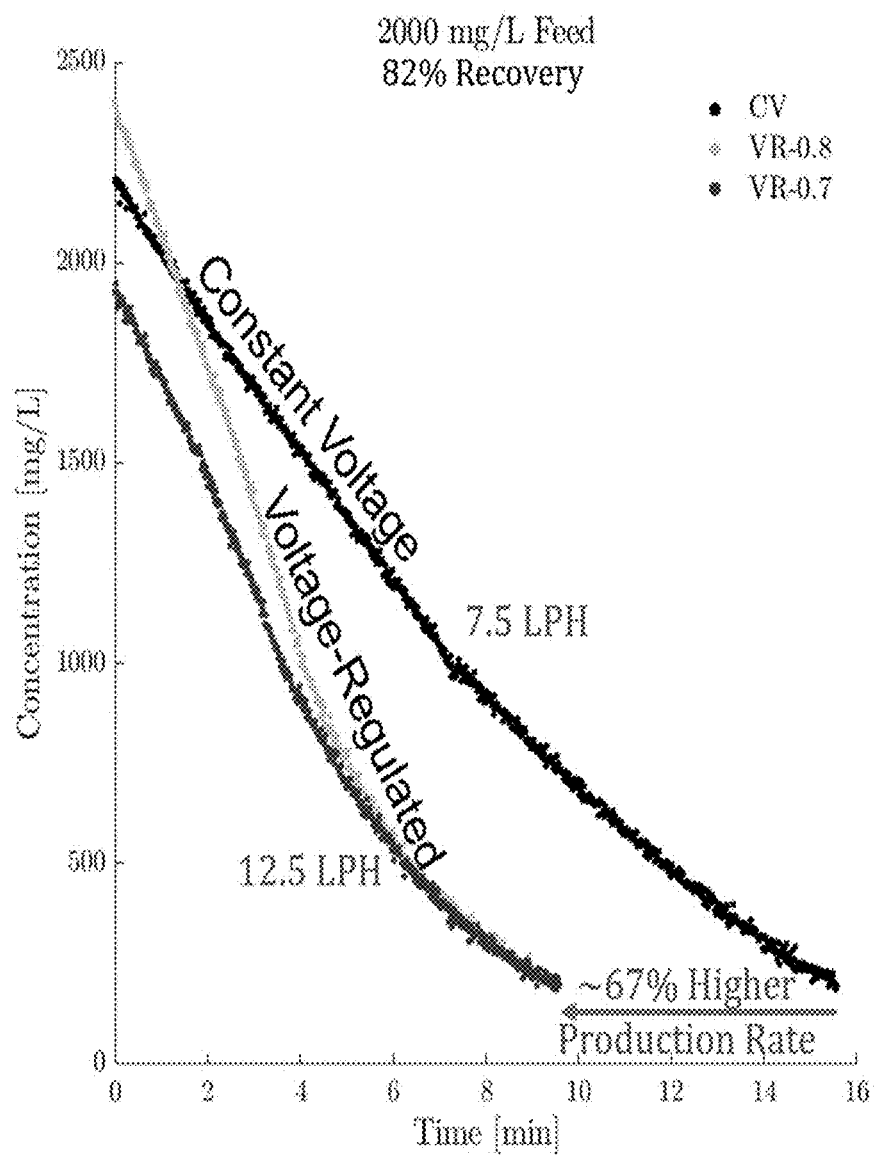

FIG. 26 plots the diluate concentration [mg/L], computed from the measured diluate conductivity, against time [min]. A 90% higher production rate was observed for the 1000 mg/L feed using voltage-controlled operation, at 60% of the limiting current density up to a maximum of 48 V, versus conventional constant voltage operation where the voltage was set to provide 60% of limiting current density at the product water concentration (FIG. 26A). For the 2000 mg/L experiment, the measured increase in production rate was 67% (FIG. 26B). Here, we define the production rate as the volume of the diluate tank divided by the time required to desalinate it to the target concentration.

Figure 36:
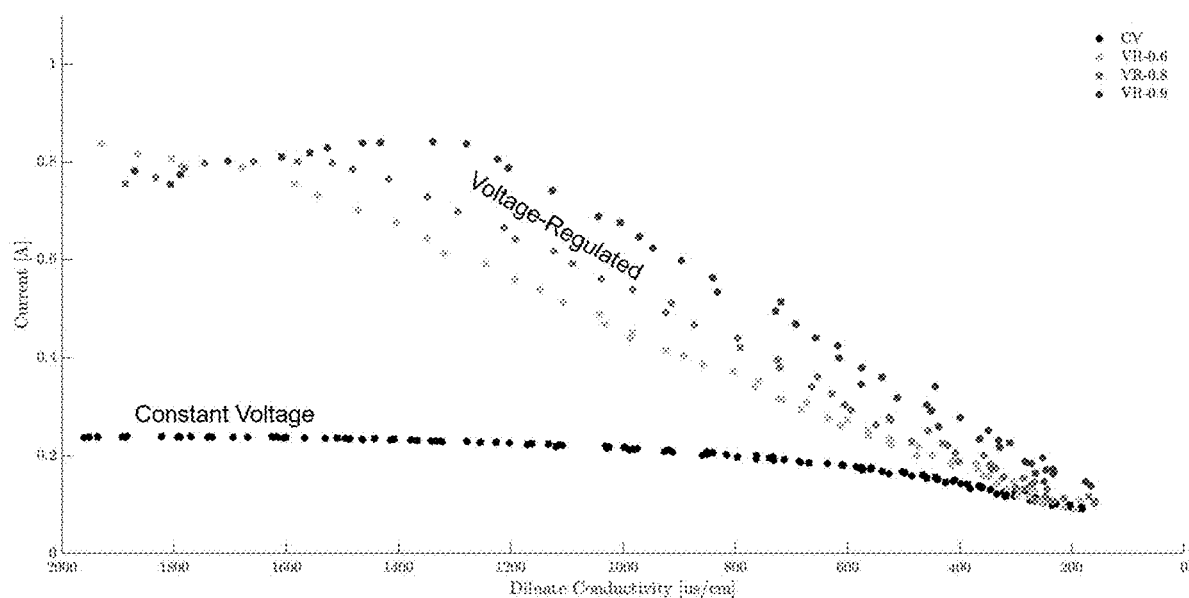
FIG. 36 is a graph showing the measured current [A], against time [min] for 1000 mg/L.
Figure 37:
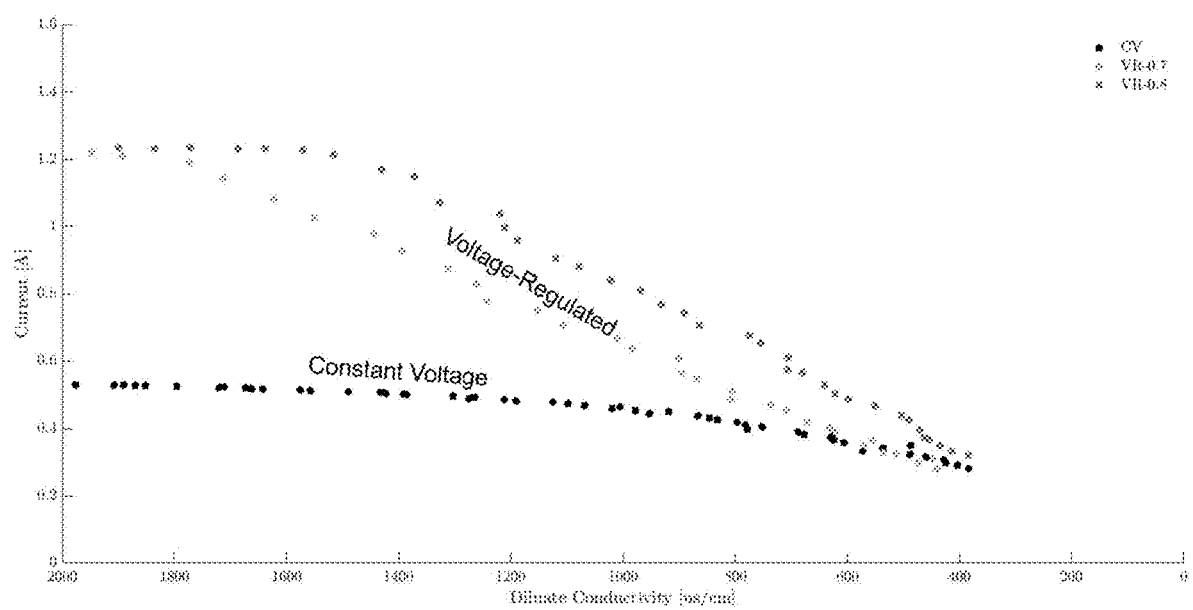
FIG. 37 is a graph showing the measured current [A], against time [min] for 2000 mg/L.

The measured current [A], against time [min] for the same 1000 mg/L (FIGS. 36) and 2000 mg/L (FIG. 37) tests. It was observed that the voltage-controlled tests operate at a higher current than the constant-voltage tests. As expected, a higher current was also measured when the controller was set to operate at higher fractions of the limiting current density. At the start of the batch process, a plateau is observed in the measured current due to the maximum limit of 48 V set on the voltage.

The pH change between the voltage-controlled experiments and the constant-voltage tests was comparable (TABLE 4-3), and can be attributed to the removal of ions that were initially present in the tap-water. This result indicates that voltage-control strategy implemented in this work was successful, such that water-splitting was avoided.

TABLE 3-3

Summary of pH Measurements before and after desalination

| Test No. | Start pH | End pH | pH Change |
| --- | --- | --- | --- |
| 1 | 8.97 | 8.2 | 0.77 |
| 2 | 8.93 | 8.49 | 0.44 |
| 3 | 8.9 | 8.9 | 0 |
| 4 | 9.1 | 8.37 | 0.73 |
| 5 | 9.19 | 8.46 | 0.73 |
| 6 | 9.22 | 8.55 | 0.67 |
| 7 | 9.19 | 8.39 | 0.8 |

Conclusions

In this study, we have conceptually detailed the how implementing voltage control to operate a batch ED system close to the limiting current density can increase the rate at which desalination occurs, compared to conventional constant-voltage operation. In addition, we have provided a simple model that can be implemented in an open-loop controller, and experimentally demonstrated its implementation on a prototype ED system. For desalination experiments from 1000 mg/L and 2000 mg/L feedwater to 100 mg/L and 200 mg/L product water, respectively, the proposed voltage control strategy increased production rates by at least 90% and 67% respectively.

Example 3 References

[1] Y. Tanaka, "A computer simulation of batch ion exchange membrane electrodialysis for desalination of saline water," Desalination, vol. 249, no. 3, pp. 1039-1047, 2009.
[2] J. Uche, F. Cirez, A. A. Bayod, and A. Martinez, Energy, vol. 57, pp. 44-54, 2013.
[3] L. J. Banasiak, T. W. Kruttschnitt, and A. I. Schafer, "Desalination using electrodialysis as a function of voltage and salt concentration," Desalination, vol. 205, no. 1-3, pp. 38-46, 2007.
[4] J. M. Ortiz, J. A. Sotoca, E. Exposito, F. Gallud, V. Garcia-Garcia, V. Montiel, and A. Aldaz, "Brackish water desalination by electrodialysis: Batch recirculation operation modeling," Journal of Membrane Science, vol. 252, no. 1-2, pp. 65-75, 2005.
[5] M. S. Isaacson and A. A. Sonin, "Sherwood Number and Friction Factor Correlations for Electrodialysis Systems, with Application to Process Optimization," Industrial & Engineering Chemistry Process Design and Development, vol. 15, pp. 313{321, 1976.
[6] N. C. Wright, S. R. Shah, S. E. Amrose, and A. G. Winter V, "A Robust Model of Brackish Water Electrodialysis Desalination with Experimental Comparison at Different Size Scales," Desalination, In Review.
[7] S. Pawlowski, J. G. Crespo, and S. Velizarov,"Pressure drop in reverse electrodialysis: Experimental and modeling studies for stacks with variable number of cell pairs," Journal of Membrane Science, vol. 462, pp. 96-111, 2014.
[8] V. Geraldes and M. D. Afonso, \Limiting current density in the electrodialysis of multi-ionic solutions, "Journal of Membrane Science, vol. 360, no. 1, pp. 499-508, 2010.
[9] S. Pawlowski, P. Sistat, J. G. Crespo, and S. Velizarov, "Mass transfer in reverse electrodialysis: Flow entrance effects and diffusion boundary layer thickness," Journal of Membrane Science, vol. 471, pp. 72-83, 2014.
[10] G. Kortum, Treatise on Electrochemistry. Elsevier Publishing Company, 1965.

While this invention has been particularly shown and described with references to preferred embodiments thereof, it will be understood by those skilled in the art that various changes in form and details may be made therein without departing from the scope of the invention encompassed by the appended claims. Unless otherwise indicated, all numbers, for example, expressing quantities and so forth, as used in this specification and the claims are to be understood as being modified in all instances by the term "about."

What is claimed is:

1. A method of desalinating feedwater with an electrodialysis (ED)-based desalination system comprising:
   a. an ED stack, wherein the stack comprises:
      i. a pair of electrodes;
      ii. a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device such that the AEMs and the CEMs alternate;
      iii. a plurality of diluate channels, wherein each diluate channel is formed between the CEM and the AEM of each ion exchange membrane pair, and wherein each diluate channel comprises a diluate channel inlet and a diluate channel outlet; and
      iv. a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet; and
   b. a diluate tank fluidly connected to the diluate channel outlets and the diluate channel inlets;
   c. a concentrate tank fluidly connected to the concentrate channel outlets and the concentrate channel outlets;
   d. a diluate pump fluidly connected to and disposed between the diluate tank and the diluate channels; and
   e. a concentrate pump fluidly connected to and disposed between the concentrate tank and the concentrate channels;
   f. a power supply connected to the pair of electrodes;
   g. an optional conductivity sensing unit configured to measure the conductivity of the diluate; and
   h. a voltage regulator that is configured to control the current density across the membranes;
   wherein the method comprises:
      i. circulating a water stream comprising ions through the electrodialysis stack thereby creating a diluate and a concentrate;
      ii. optionally measuring the conductivity of the diluate; and
      iii. regulating voltage to maintain a current density less than the limiting current density for the diluate, wherein regulating the voltage comprises decreasing the voltage over time.

2. The method of claim 1, wherein decreasing the voltage comprises:
   iii-1. applying a first voltage that achieves a first current density in a diluate stream having a first diluate concentration thereby removing ions from the diluate stream, wherein said first voltage is less than that which would exceed the limiting current density of the diluate stream;
   iii-2. applying a second voltage that achieves a second current density in the diluate stream having a second diluate concentration, wherein said second voltage and current density are less than the first voltage and current density, and wherein the second diluate concentration is less than the first diluate concentration, thereby removing ions from the diluate stream, wherein the second voltage is less than that which would exceed the limiting current of the diluate stream; and
   iii-3. optionally repeating step iii-2 one or more times, wherein each subsequent voltage and current density is less than the prior applied voltage and current density, and wherein each subsequent voltage is less than that which would exceed the limiting current density of the diluate stream.

3. The method of claim 2, wherein step iii-2 is repeated one or more times until the product water achieves the desired salt concentration.

4. The method of claim 1, wherein the voltage is decreased continuously.

5. The method of claim 1, wherein the voltage is decreased in a stepwise manner.

6. The method of claim 5, comprising:
   iii-1a. a first interval of applying a first voltage that achieves a first current density in a diluate stream having a first diluate concentration thereby removing ions from the diluate stream, wherein said first interval is terminated prior to reaching the limiting current density of the diluate stream;

iii-2b. a second interval of applying a second voltage that achieves a second current density in the diluate stream having a second diluate concentration, wherein said second voltage and current density are less than the first voltage and current density, and wherein the second diluate concentration is less than the first diluate concentration, thereby removing ions from the diluate stream, wherein the second interval is terminated prior to reaching the limiting current of the diluate stream; and iii-3c. optionally repeating step iii-2b one or more times, wherein each subsequent interval comprises applying a voltage that achieves a current density in the diluate stream that is less than the voltage and current density of the prior interval, and wherein each subsequent interval is terminated prior to reaching the limiting current density of the diluate stream.

7. The method of claim 1, wherein the ED stack further comprises a plurality of spacers placed between each of the ion exchange membranes.

8. The method of claim 1, wherein the ED system is a batch system.

9. The method of claim 8, comprising introducing the feedwater into the diluate tank and the concentrate tank at the start of a batch process.

10. The method of claim 1, wherein the product water has a TDS concentration of 300 ppm or less.

11. The method of claim 10, wherein the product water has a TDS concentration of 100 ppm or less.

12. The method of claim 1, wherein the voltage regulator is controlled by a computer or wherein the voltage regulator is a computer.

13. The method of claim 1, wherein the system comprises a conductivity sensing unit configured to measure the conductivity of the diluate.

14. The method of claim 13, wherein the conductivity of the diluate in a diluate channel or in the diluate tank is measured.

15. The method of claim 13, wherein the conductivity sensing unit measures the conductivity of the diluate in the diluate tank.

16. The method of claim 13, wherein the conductivity of the diluate stream is measured and the voltage regulator adjusts the voltage based on that measurement.

17. The method of claim 1, wherein the voltage is regulated to maintain a current density that is within about 60% of the limiting current density of the diluate stream.

18. The method of claim 1, wherein the feedwater has a TDS concentration of about 3000 mg/L or less.

19. The method of claim 1, wherein the product recovery ratio is at least about 60%.

20. A electrodialysis (ED)-based desalination system comprising:
   a. an ED stack, wherein the stack comprises:
      i. a pair of electrodes
      ii. a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device such that the AEMs and the CEMs alternate;
      iii. a plurality of diluate channels, wherein each diluate channel is formed between the CEM and the AEM of each ion exchange membrane pair, and wherein each diluate channel comprises a diluate channel inlet and a diluate channel outlet; and
      iv. a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet; and
   b. a diluate tank fluidly connected to the diluate channel outlets and the diluate channel inlets;
   c. a concentrate tank fluidly connected to the concentrate channel outlets and the concentrate channel outlets;
   d. a diluate pump fluidly connected to and disposed between the diluate tank and the diluate channels; and
   e. a concentrate pump fluidly connected to and disposed between the concentrate tank and the concentrate channels;
   f. a power supply connected to the pair of electrodes;
   g. an optional conductivity sensing unit configured to measure the conductivity of the diluate;
   h. a voltage regulator that is configured to control the current density across the membranes; wherein a computer system is configured to control the voltage regulator, or wherein the voltage regulator is a computer, and wherein said computer maintains a current density less than the limiting current density for the diluate and to decrease the voltage over time.

21. A electrodialysis (ED)-based desalination system comprising:
   a. an ED stack, wherein the stack comprises:
      i. a pair of electrodes
      ii. a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device such that the AEMs and the CEMs alternate;
      iii. a plurality of diluate channels, wherein each diluate channel is formed between the CEM and the AEM of each ion exchange membrane pair, and wherein each diluate channel comprises a diluate channel inlet and a diluate channel outlet; and
      iv. a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet; and
   wherein the ratio of length to width for each ion exchange membrane is between about 3.5 and 6; and/or wherein the height of each channel is between about 0.3 to about 0.33 mm;
   b. a diluate tank fluidly connected to the diluate channel outlets and the diluate channel inlets;
   c. a concentrate tank fluidly connected to the concentrate channel outlets and the concentrate channel outlets;
   d. a diluate pump fluidly connected to and disposed between the diluate tank and the diluate channels; and
   e. a concentrate pump fluidly connected to and disposed between the concentrate tank and the concentrate channels; and
   a power supply connected to the pair of electrodes.

22. The system of claim 21, further comprising a storage tank fluidly connected to the diluate tank.

23. The system of claim 21, wherein the ED stack further comprises a plurality of spacers placed between each of the ion exchange membranes.

24. The system of claim 21, wherein the storage tank stores potable water.

25. The system of claim 21, further comprising a voltage regulator and optionally further comprising a conductivity sensor.

26. The system of claim 21, further comprising one or more filtrations system for removing pathogenic organisms.

27. A method of desalinating feedwater, the method comprising introducing feedwater into the system of claim 21 and applying an electrical potential across the ion exchange membrane pairs.

28. A electrodialysis (ED)-based desalination system comprising:
 a. an ED stack, wherein the stack comprises:
  i. a pair of electrodes
  ii. a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device such that the AEMs and the CEMs alternate;
  iii. a plurality of diluate channels, wherein each diluate channel is formed between the CEM and the AEM of each ion exchange membrane pair, and wherein each diluate channel comprises a diluate channel inlet and a diluate channel outlet; and
  iv. a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet; and
 b. a diluate tank fluidly connected to the diluate channel outlets and the diluate channel inlets;
 c. a concentrate tank fluidly connected to the concentrate channel outlets and the concentrate channel outlets;
 d. a diluate pump fluidly connected to and disposed between the diluate tank and the diluate channels; and
 e. a concentrate pump fluidly connected to and disposed between the concentrate tank and the concentrate channels; and
 f. a power supply connected to the pair of electrodes;
 wherein the improvement is that the product recovery ratio is at least about 60% and the system is suitable for in home use.

* * * * *